(12) United States Patent
Kothari

(10) Patent No.: US 9,202,205 B2
(45) Date of Patent: *Dec. 1, 2015

(54) ASSIGN PHOTOGRAPHERS ON AN EVENT INVITE AND AUTOMATE REQUESTING, UPLOADING, AND SHARING OF PHOTOS AND VIDEOS FOR AN EVENT

(71) Applicant: Ankit Dilip Kothari, Henrico, VA (US)

(72) Inventor: Ankit Dilip Kothari, Henrico, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,942

(22) Filed: Apr. 15, 2015

(65) Prior Publication Data

US 2015/0278770 A1    Oct. 1, 2015

Related U.S. Application Data

(63) Continuation of application No. 14/604,248, filed on Jan. 23, 2015, which is a continuation of application No. 14/447,424, filed on Jul. 30, 2014, now Pat. No. 8,943,140.

(60) Provisional application No. 61/970,386, filed on Mar. 26, 2014.

(51) Int. Cl.
*G06F 15/16* (2006.01)
*G06Q 10/10* (2012.01)
*H04L 29/06* (2006.01)
*H04L 29/08* (2006.01)
*H04N 21/2743* (2011.01)
*H04N 21/414* (2011.01)
*H04N 21/4223* (2011.01)

(52) U.S. Cl.
CPC .......... *G06Q 10/1095* (2013.01); *G06Q 10/103* (2013.01); *H04L 65/403* (2013.01); *H04L 67/10* (2013.01); *H04N 21/2743* (2013.01); *H04N 21/41407* (2013.01); *H04N 21/4223* (2013.01)

(58) Field of Classification Search
USPC .................. 709/204, 217; 707/708, 736, 737; 713/171; 715/738
See application file for complete search history.

(56) References Cited

U.S. PATENT DOCUMENTS

| | | | |
|---|---|---|---|
| 7,996,566 B1 * | 8/2011 | Sylvain et al. ................. | 709/217 |
| 8,842,841 B2 * | 9/2014 | Hook et al. .................... | 713/171 |
| 2011/0283196 A1 * | 11/2011 | Berger et al. ................. | 715/738 |
| 2012/0324002 A1 * | 12/2012 | Chen ............................. | 709/204 |
| 2013/0151523 A1 * | 6/2013 | Hsi ................... | G06F 17/30268 707/737 |
| 2014/0280561 A1 * | 9/2014 | DuBois ......................... | 709/204 |
| 2015/0019523 A1 * | 1/2015 | Lior et al. ..................... | 707/708 |
| 2015/0106372 A1 * | 4/2015 | Hsi ................... | G06F 17/30268 707/736 |

* cited by examiner

*Primary Examiner* — Quang N Nguyen
(74) *Attorney, Agent, or Firm* — James M. Smedley LLC; James Michael Smedley, Esq.; Daniel Eisenberg, Esq.

(57) ABSTRACT

Methods, program products and systems to assign photographers on an event invite and automate requesting, uploading and sharing of the event's photos/videos are described here. The solution would allow to assign photographers for an event using the event's invite itself, indirectly triggering the auto-creation of a new photo/video album and allowing the photographer invitees to upload their photos/videos for the event, either real-time or manually at a later time. Thereafter, once an event is complete, the event's photo/video album would be either automatically or manually shared with the event's guests depending upon the preferences set by the event's owner.

21 Claims, 39 Drawing Sheets

1300b

Sample e-mail format for sharing an event's photo/video album with guests
From: EventOwner's Email Address
To:
BCC: EventGuests' Email Addresses

Subject: Event album for 'John's Birthday' event

Content:
Event owner for the event – "John's Birthday" would like to share the event's photo/video album with you. Please visit the below link to access the album's public website --

Link to Event Album

Thanks!

FIG. 13B

ASSIGN PHOTOGRAPHERS ON AN EVENT INVITE AND AUTOMATE REQUESTING, UPLOADING, AND SHARING OF PHOTOS AND VIDEOS FOR AN EVENT

FIELD OF THE INVENTION

The present invention generally relates to requesting, uploading, and sharing photos and videos taken using a mobile device. Specifically, embodiments of the present invention provide for integrating a calendar and photo sharing function of a mobile device to allow requesting, taking, sharing, and managing, photos or videos tied to the event.

CROSS-REFERENCE TO RELATED APPLICATION

The present application is a continuation of and claims priority from non-provisional patent application Ser. No. 14/447,424 entitled "Assign Photographers on an Event Invite and Automate Requesting, Uploading, and Sharing of Photos and Videos for an Event" filed on Jul. 30, 2014 which has issued as U.S. Pat. No. 8,943,140 on Jan. 27, 2015, which, in turn, claims priority from provisional application 61/970,386 entitled "Assign photographers on an event invite and automate requesting, uploading and sharing of photos/videos for an event" filed on Mar. 26, 2014 the contents of which are hereby incorporated by reference into this application.

BACKGROUND OF THE INVENTION

When an event owner sets up a new event invite and wants to capture the precious moments i.e. photo/videos for that event, then currently they would usually contact some of the invitees individually and request them to take and share (using their own method of sharing) the photos/videos for the event. It can often be time consuming to individually reach out to such invitees and to get their final confirmation for taking and sharing of the event's photos/videos. Nevertheless, it might even require multiple reminders to be sent to such photographers, informing them about the event's start/end time, in order to make sure that all special moments are captured for the event. On a side note, if an event owner also wants to collect photos/videos for before (pre-event activities of an event) and/or after (post event activities of an event), then they also have to remember currently to notify the photographers about those additional requests, which can further add to the existing complexity.

In addition, it can also be a lot of hassles if the photographers who took the photos/videos during the event either don't share those with the event owner in a timely manner, or they do share those photos/videos but using distinct sharing methods (email, photo/video messaging, etc), leading to unnecessary complications as well as delays in aggregation. Under this situation, an event owner often ends up spending a lot of time either reminding those photographer invitees to send their photos/videos for the event or gathering the event's photos/videos at a central location. This indirectly even leads to delays in the sharing of the event's album (photos/videos) with the event's guests. In fact, in some cases an event album might even be shared months and months after an event has already completed, reducing the level of overall enthusiasm and relevance to the actual situation/occasion.

In short, the current process mentioned above is not only time-consuming but also requires a lot of coordination between both an event owner and the photographer invitees. In addition, it's quite a challenging task to gather all the photos/videos taken by different event invitees to a central location, and thereafter, even share those with everyone. Overall, starting from requesting of photos/videos for an event, to the collecting/uploading of those photos/videos at a centralized location, to the sharing of those photos/videos with guests, the current process isn't quite streamlined and has a lot of manual steps in addition to inconvenience as well as associated delays.

SUMMARY OF THE INVENTION

Accordingly, it is an object of the present invention to provide a system and method for integrating a calendar function and a photo and video sharing function of a mobile device to allow invitations and photo/video sharing requests to be sent and managed, and allow photos and videos to be shared in a unified manner, reducing time and effort expended in gathering, sharing, and managing photos and videos related to an event.

According to an embodiment of the present invention, a computer implemented method for sharing photos and/or videos related to an event comprising: creating a scheduled event owned by an event owner; sending invitations for event to one or more invitees; assigning event owner and/or one or more of invitees as photographers; sending to photographers a request to share photos and/or videos taken during the event.

According to an embodiment of the present invention, the computer implemented method further comprising the step of receiving from photographers a photographer response to request to share.

According to an embodiment of the present invention, the computer implemented method further comprising the step of displaying a list of photographers, and each of photographer's photographer response.

According to an embodiment of the present invention, the computer implemented method further comprising the steps of: creating a digital album for collecting photos and/or videos corresponding to event; uploading to a central location photos and/or videos taken during event; displaying a visual indicator on the screen of device to visually indicate to photographer that photos and/or videos taken during event will be uploaded.

According to an embodiment of the present invention, the computer implemented method wherein visual indicator is a border frame, or an indicator icon, or a screen filter, or some other sort of indicator displayed on the screen of device.

According to an embodiment of the present invention, the computer implemented method further comprising the step of limiting photos and/or videos which are uploaded to only those produced by photographer's photo or video device during a defined time period.

According to an embodiment of the present invention, the computer implemented method further comprising the step of uploading from a supported device photos and/or videos which were been taken using an unsupported photo or video taking device and caused to be moved to supported device.

According to an embodiment of the present invention, the computer implemented method further comprising the step of providing event owner with the option to share digital album at time T with a group of persons selected from the group comprising: (a) all event invitees; (b) event attendees only; or (c) nobody.

According to an embodiment of the present invention, the computer implemented method further comprising the step of sharing digital album before the end of event.

According to an embodiment of the present invention, the computer implemented method wherein at least one of (a)

creating an event, (b) creating a digital album, or (c) taking photos and/or videos is accomplished, at least in part, by integrating with a separately installed program on device.

According to an embodiment of the present invention, the computer implemented method further comprising the steps of: providing photographers an upload option for identifying an upload preference to upload photos and/or videos to central location, wherein upload option is selected from the group comprising (a) automatically, (b) manually, or (c) by confirmation; providing photographers the option to change upload preference at a later time.

According to an embodiment of the present invention, the computer implemented method further comprising the step of converting request to share into an invitation to event when request to share is forwarded to another person.

According to an embodiment of the present invention, the computer implemented method further comprising the step of defining a pre-event duration and/or post-event duration during which additional photos and/or videos corresponding to pre-event and/or post-event activities can be taken.

According to an embodiment of the present invention, the computer implemented method further comprising the step of defining a manual upload duration during which photographers may continue to manually upload photos and/or videos after an event, but before the digital album is shared.

According to an embodiment of the present invention, the computer implemented method further comprising the step of generating recurring event invitations, including requests to share, for recurring events.

According to an embodiment of the present invention, a computer implemented method for sharing photos and/or videos related to an event comprising entering a sharing mode on a user device wherein photos or videos taken while in sharing mode are uploaded to a central location; displaying a visual indicator on the screen of user device to visually indicate to a user that photos and/or videos taken during event will be uploaded.

According to an embodiment of the present invention, the computer implemented method wherein visual indicator is a border frame, or an indicator icon, or a screen filter, or some other sort of indicator displayed on the screen of device.

According to an embodiment of the present invention, the computer implemented method wherein sharing mode is entered at a predetermined time according to a scheduled event.

According to an embodiment of the present invention, a computer implemented method for sharing photos and/or videos related to an event comprising creating a digital album for collecting photos and/or videos corresponding to event; providing an option to upload files either automatically without individual confirmation, or automatically upon individual confirmation; uploading to central location photos and/or videos taken during event.

According to an embodiment of the present invention, the computer implemented method further comprising the step of providing an option to upload files by manual selection.

According to an embodiment of the present invention, a computer implemented method for sharing photos and/or videos related to an event comprising creating a calendar event; attaching to event a request directed to one or more event invitees to take photos and/or videos during event; notify one or more of event invitees of event.

According to an embodiment of the present invention, the computer implemented method further comprises: integrating calendar, camera and photo album applications in order to request, take, upload and share photos and/or videos for said event.

According to an embodiment of the present invention, the computer implemented method further comprising the steps of uploading to a central location photos and/or videos taken during event; providing, through a network, remote access to photos and/or videos taken during event.

BRIEF DESCRIPTION OF THE DRAWINGS

FIG. 13B illustrates an exemplary email, which would be sent to those event invitees that were selected by an event owner for sharing of the event's album, however, those invitees don't have the same operating system on their devices as an event owner. Purpose of this email is to inform the recipients that the event owner would like to share the event's album with them via a public website, which can be accessed at any time.

DEFINITIONS

Figure 1A:
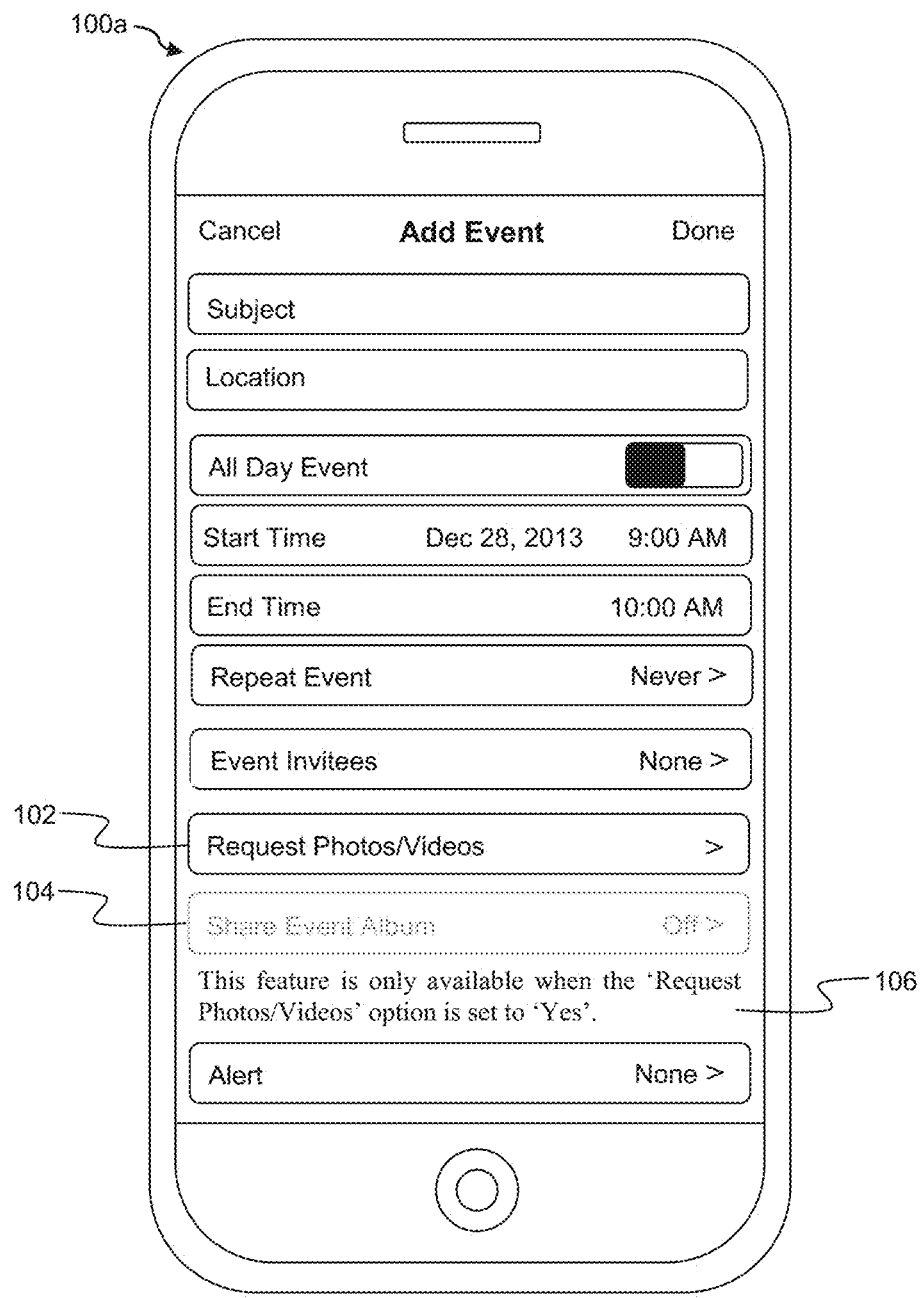
FIG. 1A illustrates an exemplary user interface of the main screen of a calendar event, as seen by an event owner, displaying the following additional photo/video sharing related options/sub-options on the screen—'Request Photos/Videos' and 'Share Event Album'.

Event owner—an individual who sets up the event invitation and sends the request to the invitees for attending the event. According to the software functionality mentioned in this document, an event owner is also the one who can assign/request some invitees on the event invitation to take and upload photos/videos for the event to a centralized photo/video album. In addition, an event owner can also specify their preferences on the event invitation regarding the sharing of the event's photo/video album with the event's invitees once that event is complete.

Event invitees—all individuals that receive the event invitation sent by the event owner for attending an event. Event invitees may also be called invitees, regular invitees, or event guests.

Photographer invitees—any individuals that not only receive the event invitation for attending an event but also receive the photo/video sharing request from the event owner for taking photos/videos for the event and uploading them to a centralized photo/video album.

Event attendees—any of the event invitees that respond with either 'Accept' or 'Maybe' to the event invitation. In other words, it's all those people who actually attend or might have intended to attend the event.

Event album—a centralized photo/video album that gets automatically created when an event owner selects 'Yes' for photo/video sharing i.e. requests event's photos/videos on an event invitation.

Album's regular participants—an album's regular participants are those individuals that are directly added to the event album using the options available on the album itself. Such regular album participants are able to manually view, add or delete photos/videos on that album, but aren't able to participate in any automated photo/video sharing during the event since they weren't originally assigned as photographers on the calendar invite. (Note: While looking at the album's participant list, the regular participants are displayed without bold and also don't have (P) next to their name in the suffix, which helps to distinguish them from the album's photographer participants.)

Album's photographer participants—an album's photographer participants are those individuals that are automatically added to the event's album because of their assignment/acceptance as photographer invitees on the associated event invite. Such photographer participants are not only able to manually view, add or delete photos/videos on an album, but are also able to participate in automated photo/video sharing during the event since they were originally assigned as photographers on the event invite. (Note: While looking at the album's participant list, the photographer participants are displayed in bold and also have (P) next to their name in the suffix, which helps to distinguish them from the album's regular participants.)

Pre-event Duration—the amount of time (in hours) before the start of the actual event. An event owner can specify the 'Pre-event Duration' value while setting up an event's invite as long as the photo/video sharing is enabled for that event. During the 'Pre-event Duration', the photographer invitees would take and upload photos/videos to the event's centralized album similar to what they would do during the actual event itself.

Post-event Duration—the amount of time (in hours) after an actual event has completed. An event owner can specify the 'Post-event Duration' value while setting up an event's invite as long as the photo/video sharing is enabled for that event. During the 'Post-event Duration', the photographer invitees would take and upload photos/videos to the event's album similar to what they would do during the actual event itself.

Manual Upload Duration—the amount of time (in hours) after the 'Post-event Duration' is complete for an event. An event owner can specify the 'Manual Upload Duration' value while setting up an event's invite as long as the photo/video sharing is enabled for that event. During the 'Manual Upload Duration', any of the event's photographer invitees can manually upload their event's photos/videos. (Note: Photographer invitees can also manually upload their photos/videos either before or after the 'Manual Upload Duration', however, the significance of the 'Manual Upload Duration' is that it provides a time-bound set opportunity for the photographer invitees to manually upload any outstanding photos/videos before the event album might get shared with the event's invitees/attendees.

DETAILED SPECIFICATION

The present invention generally relates to requesting, uploading, and sharing photos and videos taken using a mobile device. Specifically, embodiments of the present invention provide for integrating a calendar and photo sharing function of a mobile device to allow requesting, taking, sharing, and managing, photos or videos tied to the event.

Here are the high-level details about the proposed solution. It would begin with an event owner assigning the photographers on their event invite itself i.e. requesting photos/videos for an event from some of the invitees, which would indirectly trigger the auto-creation of a new photo/video album for the event. Once such an invite, including the photo/video sharing request, is received by the photographer invitees, then they would not only be able to accept that request using the options on their event invite but would also be able to set their preferences for either automatic (real-time) or manual upload of the photos/videos for the event's duration. Thereafter, on the day of the event, the photographer invitees would receive a reminder about their acceptance of the event's photo/video sharing request, and henceforth, would be allowed to upload (real-time or manual) any photos/videos that they take during the event, including the pre-event activities and the post-event activities, to the event's centralized album. Finally, once an event is complete and the photographer invitees have also uploaded any of their remaining photos/videos during the 'Manual Upload Duration' timeframe set by an event owner, then the event's album (all uploaded photos/videos) would be allowed to be automatically shared with either all invitees or just the event attendees, depending upon the preferences set by an event owner. (Note: even if an event owner wants to manually share or potentially not even share the event's photo/video album with the event invitees, then they would also be able to do so by making an appropriate selection on the album sharing options available on their event invite.) Therefore, starting from requesting of photos/videos for an event, to the collecting/uploading of those photos/videos to a centralized location, to the sharing of those photos/videos with guests, this would provide an end-to-end solution, streamlining and automating the entire process from beginning to end.

Here is the main functionality associated with this software solution—An event owner, either while setting up the initial event invite or later while updating an event invite, would be able to assign one or more invitees as photographers (request photos/videos) for the event.

A new photo/video album would be auto-generated and associated with the event when the event's owner selects 'Yes' to request photos/videos for the event from some of the event invitees.

If an event owner also wishes to capture the activities/moments that occur either before or after an event, this solution would allow them to set the values for 'Pre-event Duration' and the 'Post-event Duration' on the event's invite itself. These fields would help to inform the photographer invitees that photos/videos are also being requested for the pre and/or post event activities in addition to the actual event's duration.

In order to accommodate those photographer invitees who prefer to manually upload their photos/videos after an event is complete, this solution would also give event owner an option to set the value for 'Manual Upload Duration' field on the event invite itself. This field would indicate the photographer invitees that they have been allocated some additional time to manually upload any of their remaining photos/videos once an event, including its 'Post-event Duration', is complete.

All photographer invitees, including an event owner, would be able to specify their photos/videos upload preference for the event. Here are the three options that would be available for selection—'Auto', 'Double-check', 'Manual'. If 'Auto' option is selected, all photos/videos taken by the photographer invitee during the event would be uploaded to the event album immediately in real-time. On the other hand, if 'Double-check' option is selected, all photos/videos taken during the event would still be uploaded real-time similar to the 'Auto' option, however, the photographer invitee would be polled after each photo/video to verify if they would like to upload that photo/video to the centralized event album or not. Lastly, if 'Manual' option is selected, it would be up to the photographer invitee to manually go to the event album and upload any photos/videos that they took during the event.

Any photographer invitees that might have accepted the photo/video sharing request for the event would receive a reminder/notification before the start of the event. Purpose of this reminder would be to inform the photographer invitees about their previous acceptance of photo/video sharing request for the event, and would also give them an opportunity to change their response if needed. In addition, the photographer invitees would also be allowed to change their photo/video upload preference in case if their originally selected preference no longer works for them.

Depending upon the 'photo/video upload preference' selected by the photographer invitees, they would be able to take photos/videos during the event, including its 'Pre-event Duration' and 'Post-event Duration' (if present), and share those photos/videos with the event owner by uploading them on the event's centralized album, either real-time or later manually.

Once an event is complete and the photographer invitees have also uploaded any of their remaining photos/videos during the 'Manual Upload Duration' timeframe set by an event owner, then the event's album (all uploaded photos/videos) would be allowed to be automatically shared with either all invitees or just the event attendees, depending upon the preferences set by an event owner. (Note: even if an event owner wants to manually share or potentially not even share the event's photo/video album with the event invitees, then they would also be able to do so by making an appropriate selection on the album sharing options available on their event invite.)

Using this solution, even for the recurring event invites, an event owner would be able to assign photographers (request photos/videos for those recurring events).

Whether it's the event owner or any of the photographer invitees, they would be allowed to make changes to their original selections on the event invite related to photo/video sharing, providing flexibility as well as ease of use.

Where can this Solution be Used and its Associated Impact

This proposed solution can either be integrated directly with the core apps, which are available as part of the operating system/mobile operating system, or it can also be integrated/individually developed as a standalone 'app', 'mobile app' or a computer 'application' (app) that might exist on a single operating system or might even co-exist on multiple operating systems. For example: this solution can be easily integrated with the existing applications like the 'calendar', 'camera' and 'photo album' applications of a smart device like smartphone, smartwatch, tablet, etc or it can also be integrated/developed as a stand-alone application. However, note that this solution isn't just limited to smart devices, and can be used with any devices/applications that can assign photographers and/or store photos/videos. This solution can also be integrated with any traditional calendar and/or photo applications on a personal computer or over the cloud. This solution can also be integrated with the core app of an operating system, or integrated with an existing standalone app, or developed as a new application that's supported on either single or multiple operating systems. Using the solution, an event owner and the photographer invitees would be able to use any devices with one of those supported operating systems and would still be able to automate the requesting, uploading and sharing of photos/videos for an event.

Proposed Solution Details

For the purpose of this explanation (software functionality mentioned below), it's assumed that the event owner and the photographer invitees have similar operating system on their devices. Also, it's assumed that the suggested software solution is integrated with the existing 'calendar', 'camera' and 'photo album' applications of a smartphone or a tablet, which would make it easy to explain the details of this solution. However, as mentioned earlier, please note that this solution isn't just limited to smart devices like a smartphone, smartwatch or a tablet, or even a particular operating system. Here are the details of the solution—

Figure 1B:
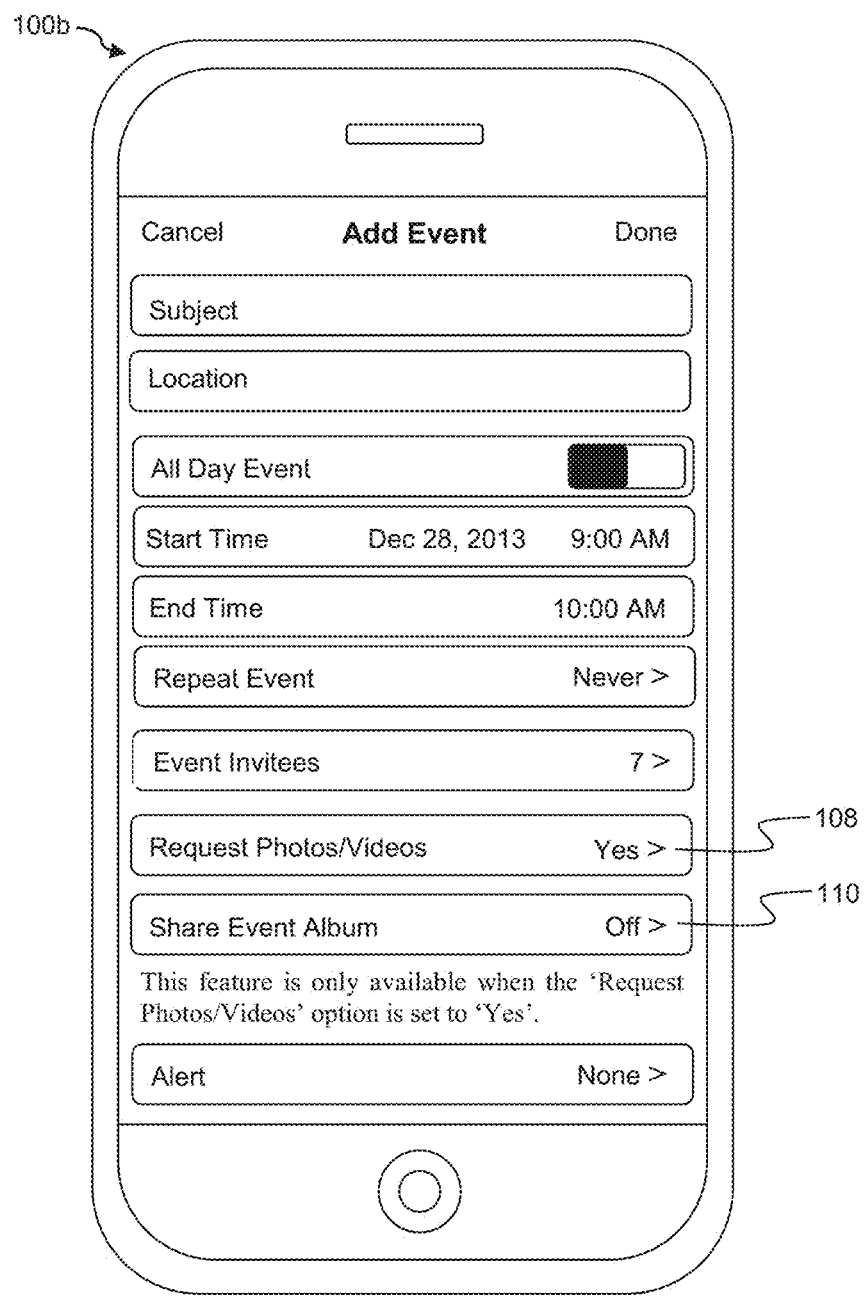
FIG. 1B illustrates an exemplary user interface of the main screen of a calendar event, as seen by an event owner, displaying how the 'Share Event Album' option/sub-options instantly become enabled when 'Request Photos/Videos' option is changed to 'Yes' by an event owner.
Figure 1C:
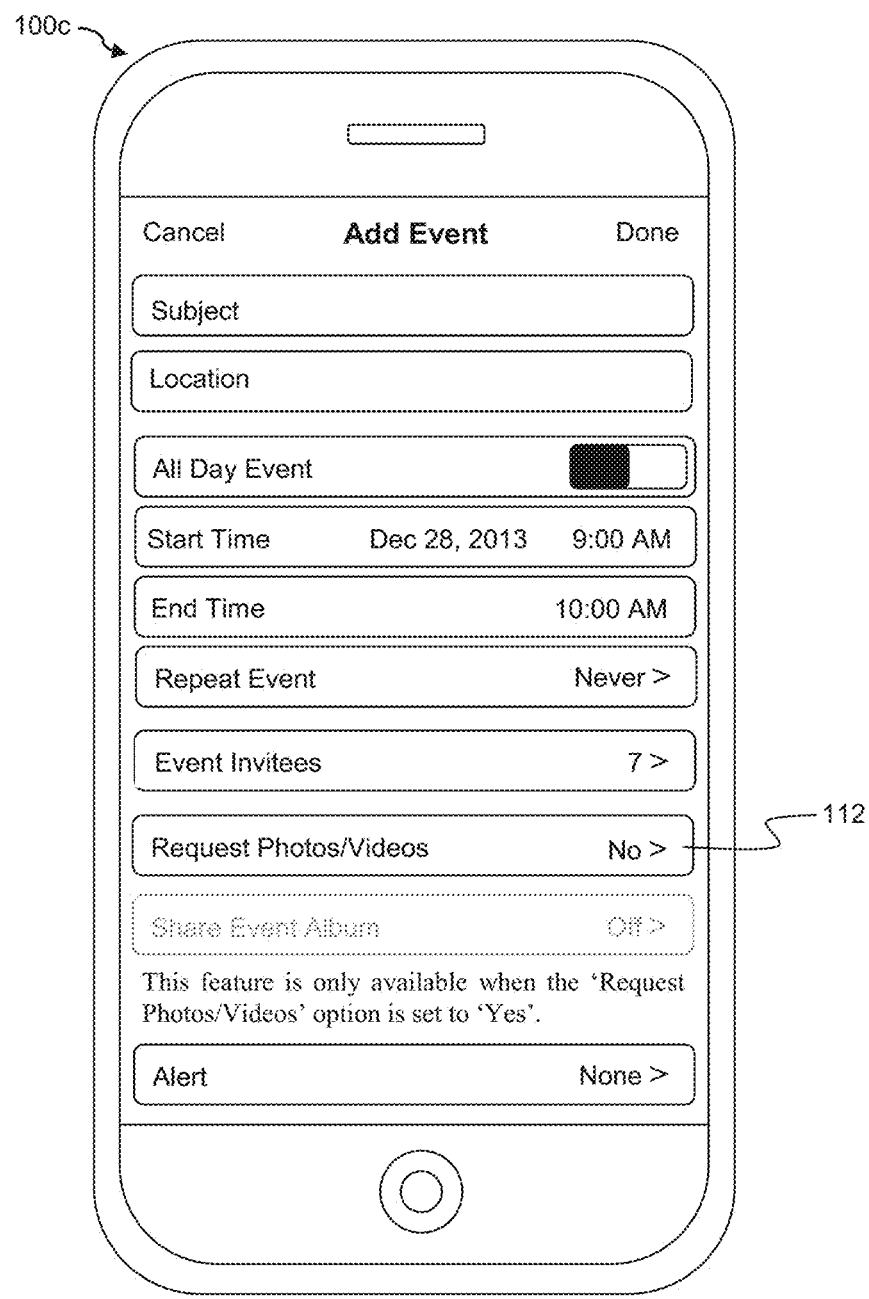
FIG. 1C illustrates an exemplary user interface of the main screen of a calendar event, as seen by an event owner, displaying how the 'Share Event Album' option/sub-options instantly become disabled (grayed out) when 'Request Photos/Videos' option is changed to 'No'.

Photo/Video Sharing Related Options on the Main Screen of the Event Owner's Event Invite According to an embodiment of the present invention, as seen in FIG. 1A-1C, the following additional option(s) would be available on the main screen of the event owner's calendar invite (Note: even if the event is set up as a recurring event, the below options would remain the same on the event owner's screen)—

'Request Photos/Videos' option 102—Event owner, while creating an event invite, would be able to use this option and request certain invitees to be the photographers for the event and ask them to upload (automatically/manually) any photos/videos that they take during the event to the centralized photo/video album.

If the event owner hasn't yet made a selection on the 'Request Photos/Videos' option, then no value would displayed to the right of the 'Request Photos/Videos' option on the main screen of the calendar event. However, if the event owner had previously selected a value on the 'Request Photos/Videos' option i.e. either 'Yes' or 'No', then that previously selected value would be displayed to the right of the 'Request Photos/Videos' option on the main screen of the calendar event.

'Share Event Album' option 104—This 'Share Event Album' option and its sub-options would be initially disabled (grayed out) until an event owner selects 'Yes' on the 'Request Photos/Videos' option. However, as seen in FIG. 1B, note that as soon as the 'Request Photos/Videos' is changed to 'Yes' 108, the 'Share Event Album' option/sub-options would be immediately enabled without even requiring the save of the calendar event. Similarly, as seen in FIG. 1C, if the 'Request Photos/Videos' option is again changed back to 'No' 112, then the 'Share Event Album' option/sub-options would be immediately disabled without even requiring the save of the calendar event.

According to an embodiment of the present invention, using the 'Share Event Album' option 104, an event owner would be able to specify if they wish to share the event's photos/videos (album) with the guests once the event is complete, and if yes, then they can also specify if they wish to share those automatically or manually. In addition, an event owner can also specify with which guests (all guests or just the event attendees) the event album would be shared.

If the event owner hasn't yet made a selection on the 'Share Event Album' screen for the 'Share Album after Event' field, then 'Off' value 110 would be displayed to the right of the 'Share Event Album' option on the main screen of the calendar event. However, if the event owner had previously selected a value on the 'Share Album after Event' field on the 'Share Event Album' screen i.e. either 'Auto', 'Manual' or 'Off', then that previously selected value would be displayed to the right of the 'Share Event Album' option on the main screen of the calendar event.

According to an embodiment of the present invention, as seen in FIG. 1A, the following note would constantly display below the "Share Event Album" option on the main screen of the calendar event—"This feature is only available when the 'Request Photos/Videos' option is set to 'Yes'." 106

Figure 2A:
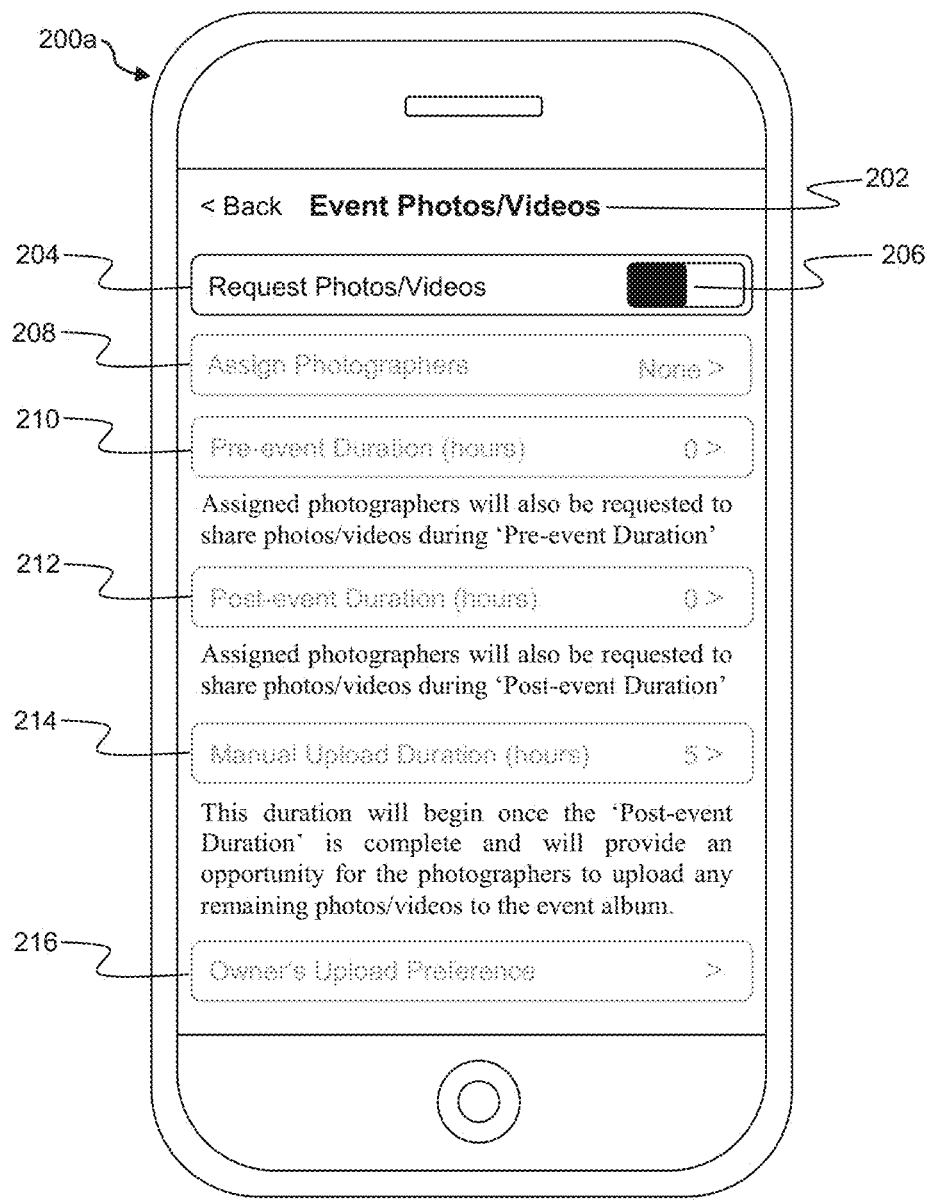
FIG. 2A illustrates an exemplary user interface of the 'Event Photos/Videos' screen of a calendar event, as seen by an event owner. Using this screen, an event owner would be able to indicate if they wish to request sharing of photos/videos from certain invitees for the event.

'Request Photos/Videos' Option and its Sub-Options on the Event Owner's Event Invite According to an embodiment of the present invention, as seen in FIG. 1A and FIG. 2A, when the 'Request Photos/Videos' option 102 is selected, a new window 'Event Photos/Videos' 200a will open up with the title 'Event Photos/Videos' 202. On the 'Event Photos/Videos' screen, the following options will be available (Note: even if the event is set up as a recurring event, the below options would remain the same on the event owner's screen)—

'Request Photos/Videos' field 204 with 'Yes' and 'No' options. 'No' 206 would be the default value for this field. (Note: All other fields 208, 210, 212, 214, 216 on the 'Event Photos/Videos' screen would remain grayed out until the 'Request Photos/Videos' field is changed by the event owner to 'Yes')

Figure 2B:
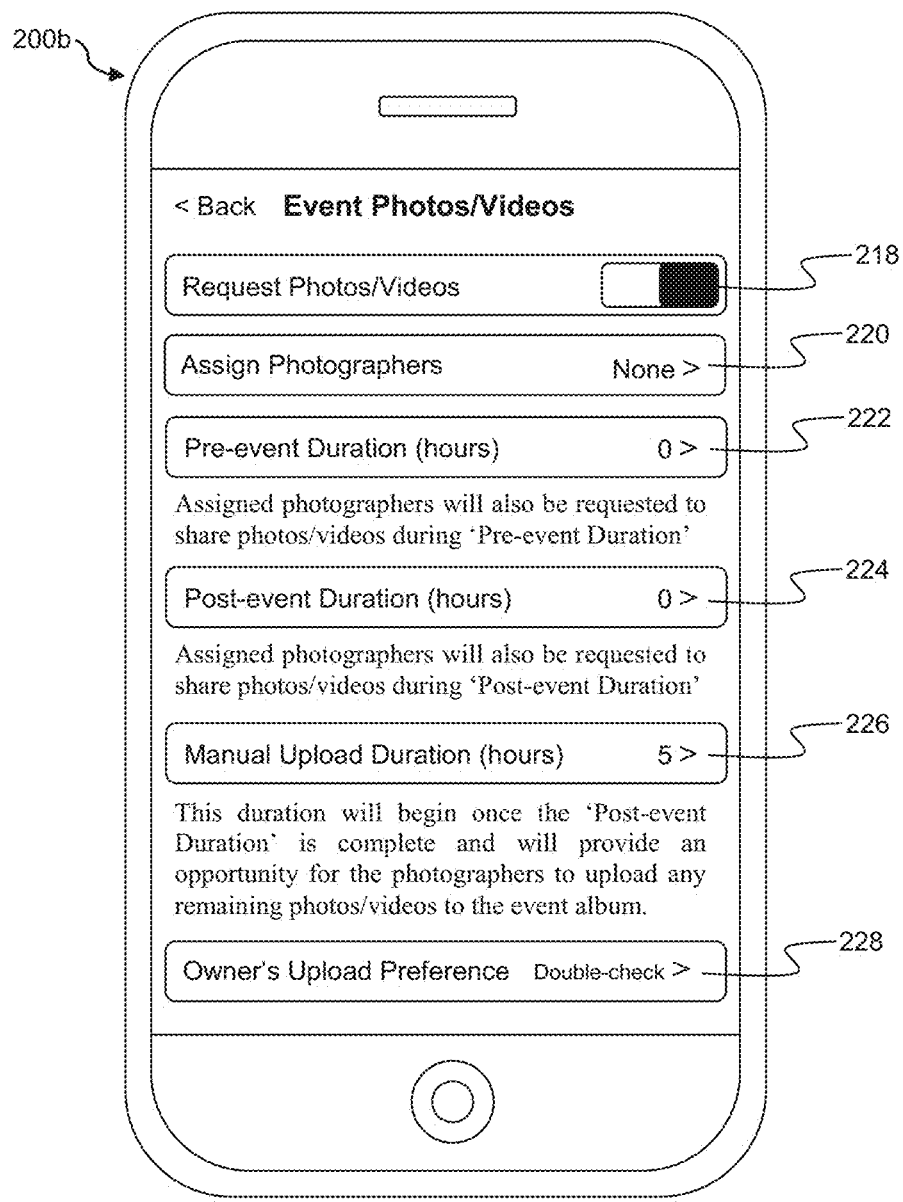
FIG. 2B illustrates an exemplary user interface of the 'Event Photos/Videos' screen of a calendar event, as seen by an event owner, displaying how all the fields on the screen are instantly enabled when the 'Request Photos/Videos' field is changed to 'Yes' by an event owner.

As seen in FIG. 2B, when the 'Request Photos/Videos' field is changed to 'Yes' 218, the following changes would occur immediately i.e. it wouldn't require saving of calendar event—

As seen in FIG. 2B, all the other fields on the 'Event Photos/Videos' screen would become enabled (would no longer be grayed out). As seen in FIG. 1B, the 'Share Event Album' option on the main page of the calendar invite would become visible/enabled and would automatically get highlighted to give a reminder to the event owner that since they are already collecting photos/videos, they might also want to make their selection for the sharing of that event album for when the event is complete.

Note: If the 'Request Photos/Videos' field on the 'Event Photos/Videos' screen was changed to 'Yes' (photo/video sharing requested for the first time) by the event owner and thereafter the entire event was saved, then the following would occur upon save—

Figure 14:
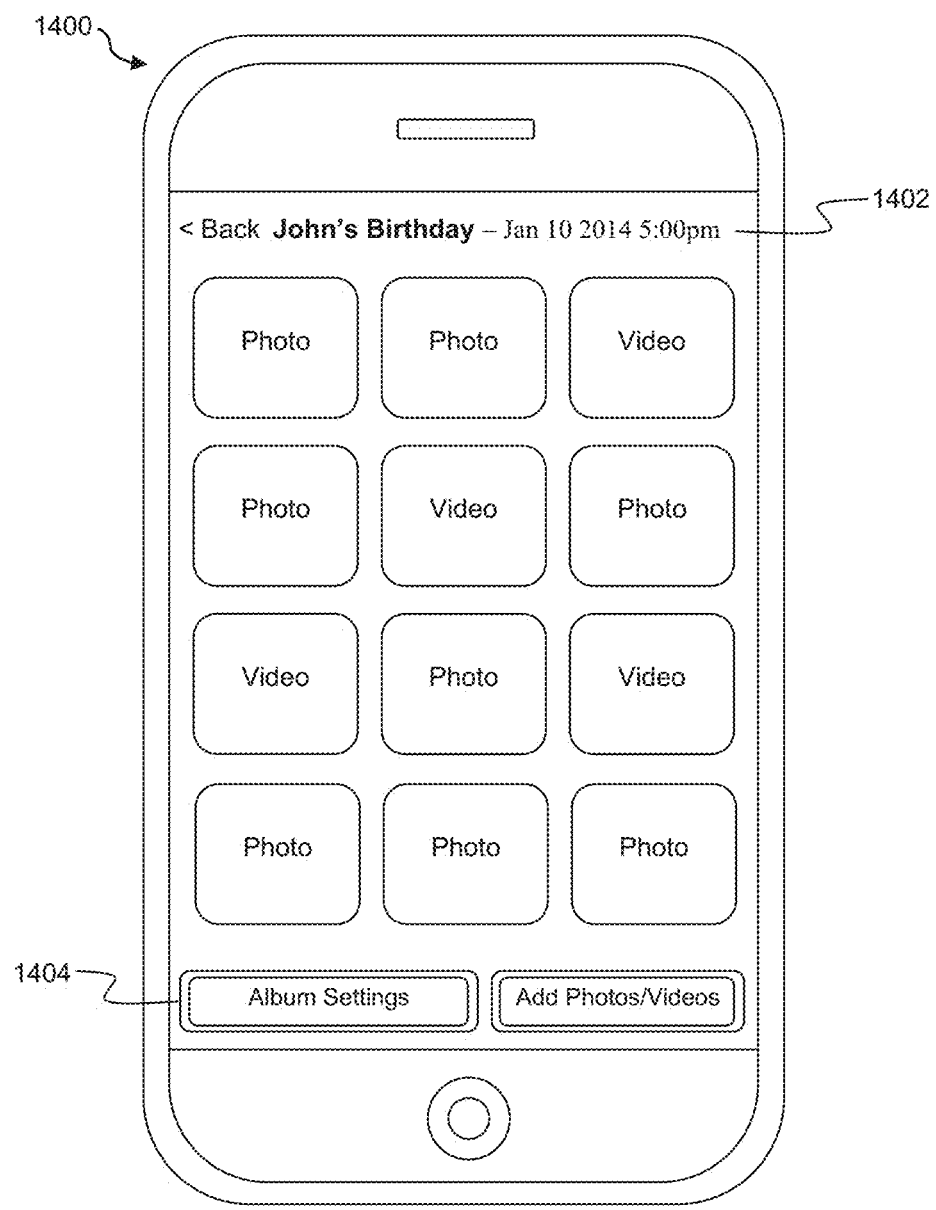
FIG. 14 illustrates an exemplary user interface of an event album, which is associated with a calendar event.

According to an embodiment of the present invention, as seen in FIG. 14, a new centralized photo/video album would be automatically created. Name for such photo/video album will be same as the event title/subject along with the event start date/time (including hours and minutes) in the suffix of the name 1402. For example: 'Anniversary Invitation—Jan. 10, 2014 5:00 pm' (Note: Event start date/time in the album name will help to distinguish between different recurring events.) Note: In case if the calendar event, which has a photo/video sharing request included, is saved without anything in the 'Subject' field, then the associated event album would still be created, however, it would use the following naming format—'Event' text along with the event start date/time in the suffix (including hours and minutes) For example: 'Event—Jan. 10, 2014 5:00 pm'

Even if no photographers were invited for the event, centralized photo/video album would still be created since the event owner might themselves take the photos/videos and share those with the event guests. On the other hand, if the photos/videos were requested from others, however, those people decline to take or share photos/videos for the event, then even in that case, the centralized photo/video album would still be created because the event owner might themselves want to take event photos/videos and share those with the event guests.

'Assign Photographers' 208—According to an embodiment of the present invention, as seen in FIGS. 2B and 3A-3C, an event owner will be able to request photos/videos i.e. assign photographer(s) for the event from within the list of invitees already selected by the event owner previously. In addition, when this option is selected 220, it would also display the list of the already assigned photographer invitees for the event.

According to an embodiment of the present invention, when the event owner tries to assign the photographers using the 'Add' button 306 on the 'Photographers . . . ' 304 field of the 'Assign Photographers' screen 300a, the entire list of invitees that were previously selected for the event would be displayed to the event owner. However, only those invitees that use the same proprietary operating system on their device as the event owner would be enabled/bold on the list, whereas the other invitees would be grayed out. Note: An event owner will only be able to add those photographers that already exist on the event invitee list, and will not be able to add other people that don't yet exist on the event invitee list.

While setting up an event, in case if the event owner first tries to select/add the photographers, however if no invitees were added until that time, then the event owner would be prompted with the following error message along with the 'Ok' button—"You must first add the event invitees and then attempt to assign any photographers for the event." When the event owner selects 'Ok' on the prompted message, then they would be taken back to the main setup page of the event's invite.

If an event owner tries to assign a new photographer for the event, however, that person already existed on the event's photographer list 308, then that person would not be added twice on the list. Also, no new notification would be sent out to such a photographer invitee. Note: An event owner wouldn't need to manually add themselves to the 'Assign photographers' field. In other words, as long as the event's photo/video album is once created, then the event owner would be automatically assigned as one of the photographers for that event. In fact, an event owner would not be able to remove themselves from being one of the photographers for the event.

According to an embodiment of the present invention, if the event owner clicks on any of the added photographer invitee's name 312, then a new screen 'Photographer Info' 300c would open, comprising of the following fields—

'Name' field 316—This field would display the name of the photographer invitee, who was invited to act as one of the photographers for the event. Note: If the photographer invitee's name isn't available/known, then their email address or the phone number would just be repeated on this 'Name' field. This would be a read-only field.

'Email' field 318—This field would display the photographer invitee's email address (if available). This would be a read-only field.

'Phone' field 320—This field would display the photographer invitee's phone number (if available). This would be a read-only field.

'Photo/Video Sharing Response' field 322—This field would display the latest response 324 of the photographer invitee if they would share their photos/videos taken during the event or not. (Note: This field would only display the latest response even though a photographer invitee might have changed their response multiple times.). This would be a read-only field.

'Photo/Video Upload Preference' field 326—This field would only be visible if the above field 'Photo/Video Sharing Response' is 'Yes'. If the 'Photo/Video Upload Preference' field is visible, it would display the photographer invitee's latest selection 328 for photos/videos upload preference. (Note: This field would only display the latest photo/video upload preference even though a photographer invitee might have changed their photos/videos upload preference multiple times.) If visible, this would be a read-only field.

'Remove photographer' button 330—If an event owner clicks the 'Remove Photographer' button (either before an event completes or after an event ends) on the 'Photographer Info' screen, then regardless of the photographer invitee's current response for the photo/video sharing request, the following would occur—

When the 'Remove Photographer' button is clicked before an event ends, including its 'Post-event Duration' and the 'Manual Upload Duration', then there would be no notification/message prompt displayed to the event owner and all the actions mentioned later in this section for deleting a photographer invitee would be taken. However, if the 'Remove Photographer' button is clicked after an event ends and that photographer invitee had previously accepted the photo/video sharing request for the event, then in this situation the following message prompt along with the 'Yes/No' options would be displayed to the event owner—"Since the event has already ended, an event album might have already been shared with the event guests. If you remove this photographer, then they wouldn't have access to the event album until you manually share the album again with such deleted photographer invitees. Are you sure you would like to proceed with these changes?"

If the event owner selects 'No', then no changes would be made i.e. photographer invitee wouldn't be deleted and the event owner would be taken back to the 'Photographer Info' screen for that photographer invitee. If the event owner selects 'Yes', then all the actions mentioned below would be taken in order to delete that photographer invitee.

Note: Even though an event owner might click on the 'Remove Photographer' button and accept confirmation, however, that photographer invitee would only be removed when the event owner saves (selects 'Done') the entire event. Deleted photographer invitee would no longer remain on the photographer list of the event's calendar invite. Regardless of the deleted photographer invitee's previous response (Accepted, Declined, No Response) for photo/video sharing request for the event, they would be removed from the participant list of the event album. In other words, photographer invitee would lose their access to view, add, or delete any photo/videos on the event's album. A notification would be sent to the deleted photographer invitee that the event owner has removed their photographer (photo/video sharing) permissions for the event—[EventName] i.e. they no longer have photo/video sharing abilities for the event. Deleted photographer invitee would no longer see the 'Share Event Photos/Videos' option or any of its sub-options on their calendar invite. Note: An event owner would never be able to delete/remove themselves from the photographer list of an event. Note: Any of the deleted photographer invitees would still remain on the event's invitee list as regular event invitees.

'Back' button (An option to go back to the previous screen). When this 'Back' button is clicked, it would take the event owner back to the 'Assign Photographers' screen.

Figure 15A:
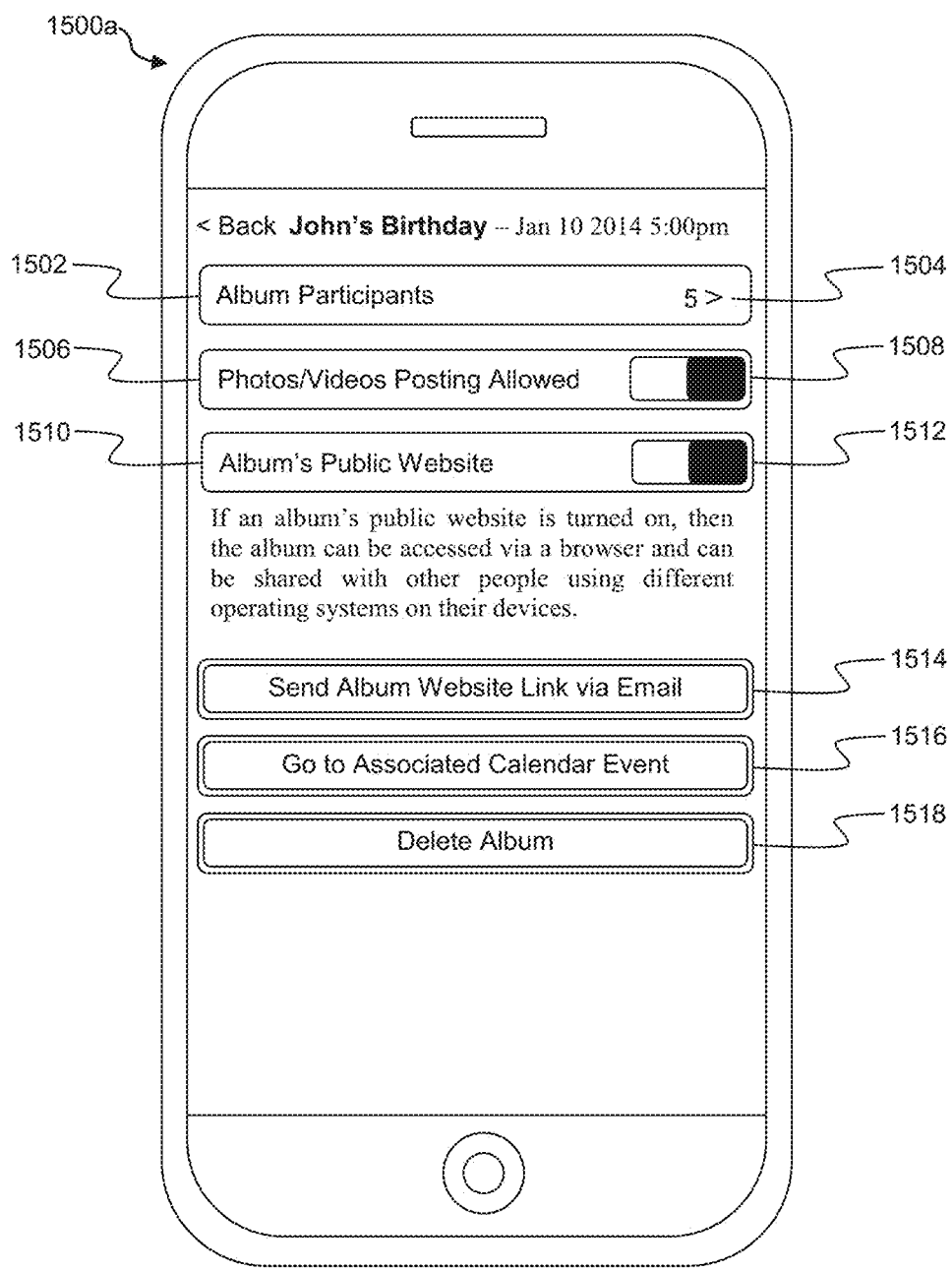
FIG. 15A illustrates an exemplary user interface of the settings/properties screen of an event album, as seen by an event owner. Using the options/sub-options available on this screen, an event owner would be able to add any new regular album participants, review the existing album participants' response, allow or disallow photo/video posting on the event's album, create or remove an album's public website, manually send the album's public website link via email to anyone, go back to the associated calendar event, or even delete that event's album.
Figure 15B:
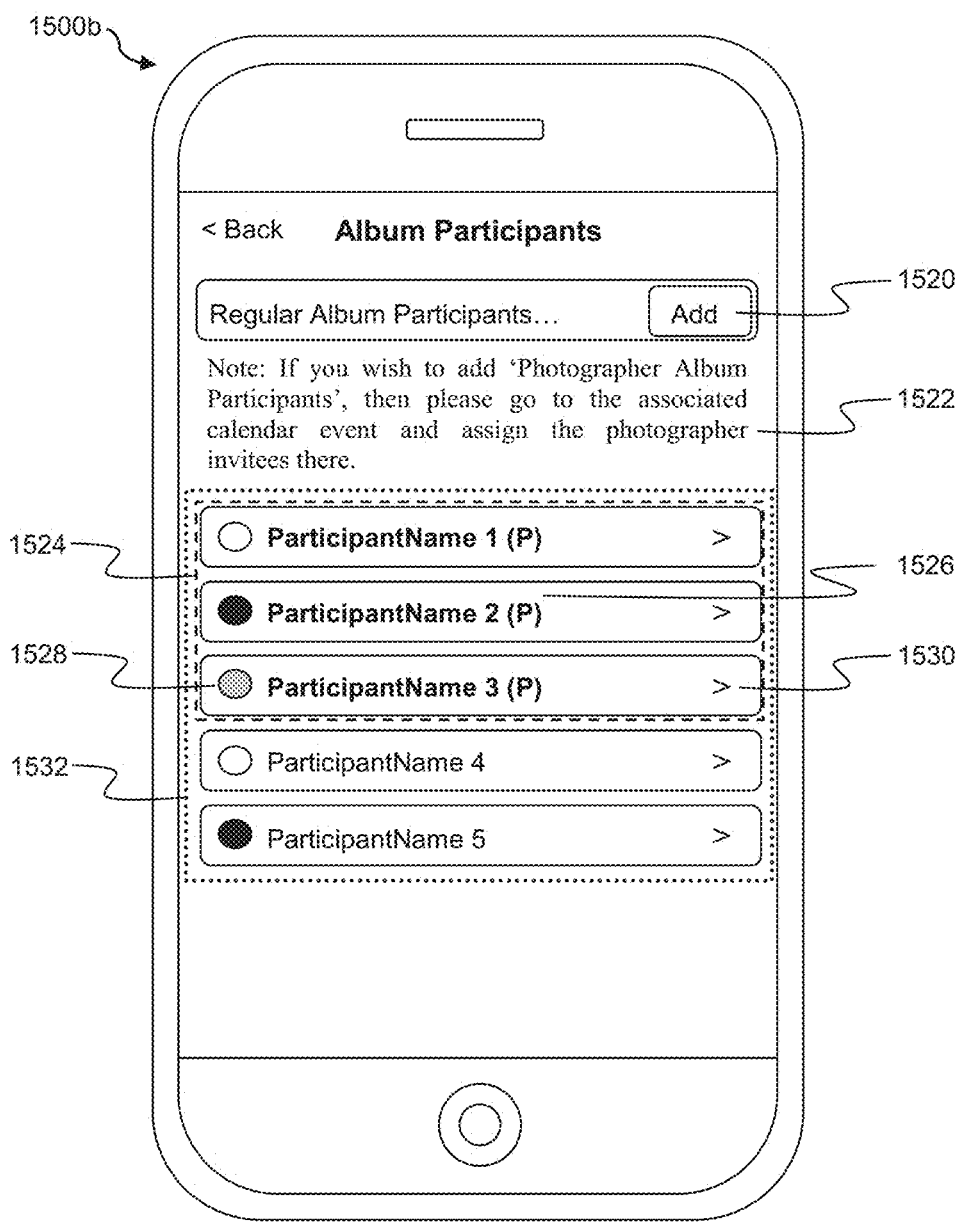
FIG. 15B illustrates an exemplary user interface of the 'Album Participants' screen of an event album, which not only provides an option to be able to add any new regular album participants, but also lists any of the already assigned album participants, including both the regular album participants (displayed in regular text) and the photographer album participants (displayed in bold along with '(P)' in the suffix), along with their photo/video sharing response.
Figure 16A:
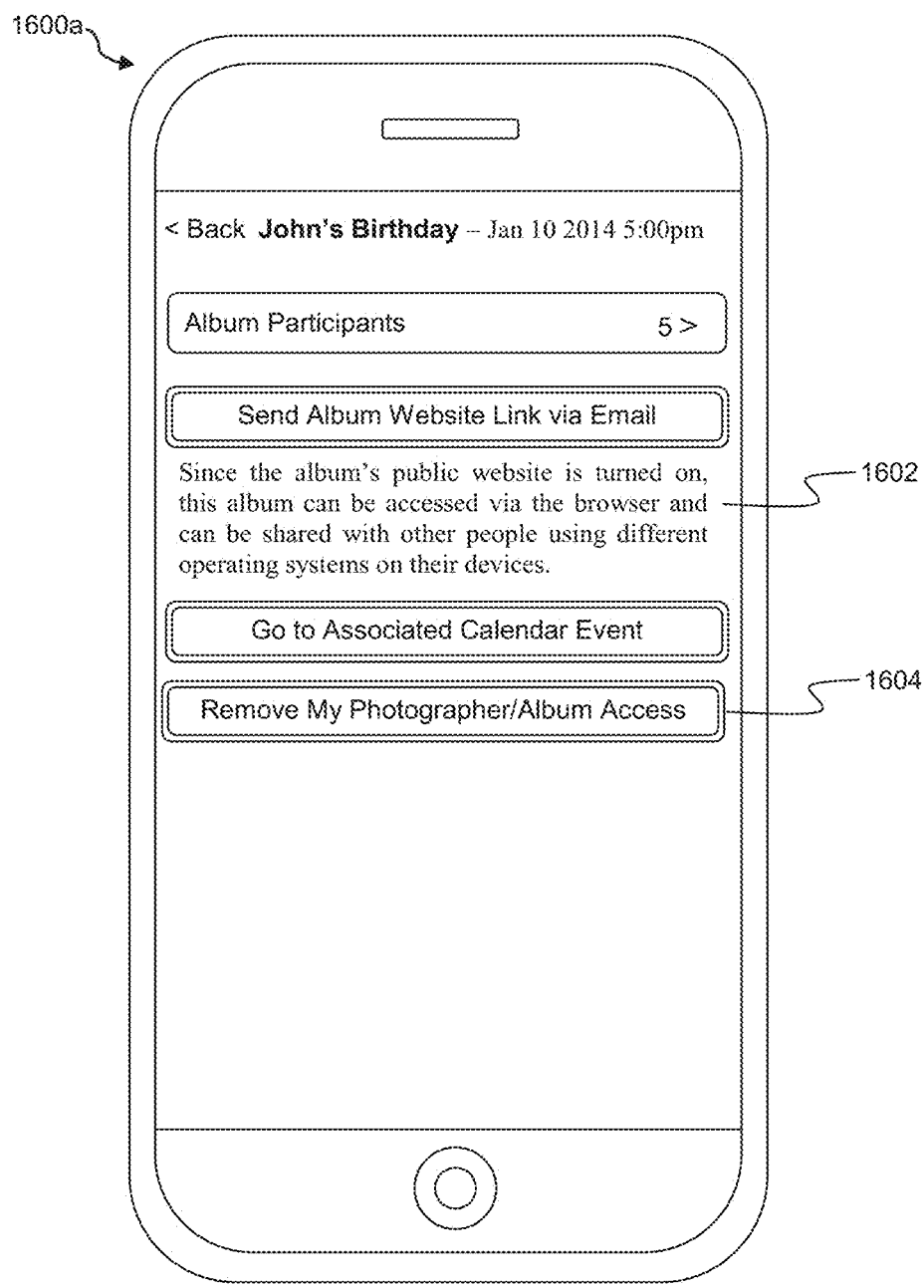
FIG. 16A illustrates an exemplary user interface of the settings/properties screen of an event album, as seen by a photographer album participant.
Figure 16B:
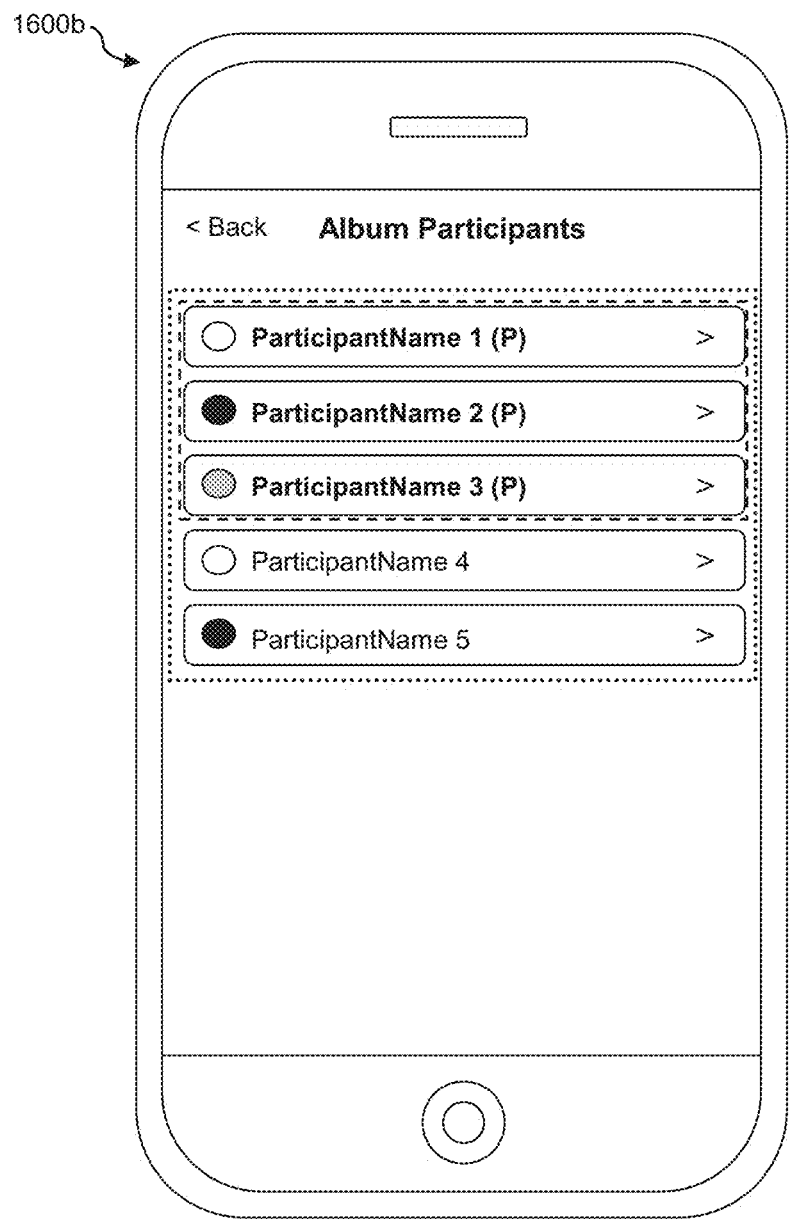
FIG. 16B illustrates an exemplary user interface of the 'Album Participants' screen of an event album, as seen by a photographer album participant, listing any of the already assigned album participants, including both the regular album participants (displayed in regular text) and the photographer album participants (displayed in bold text along with '(P)' added in the suffix), along with their photo/video sharing response.
Figure 16C:
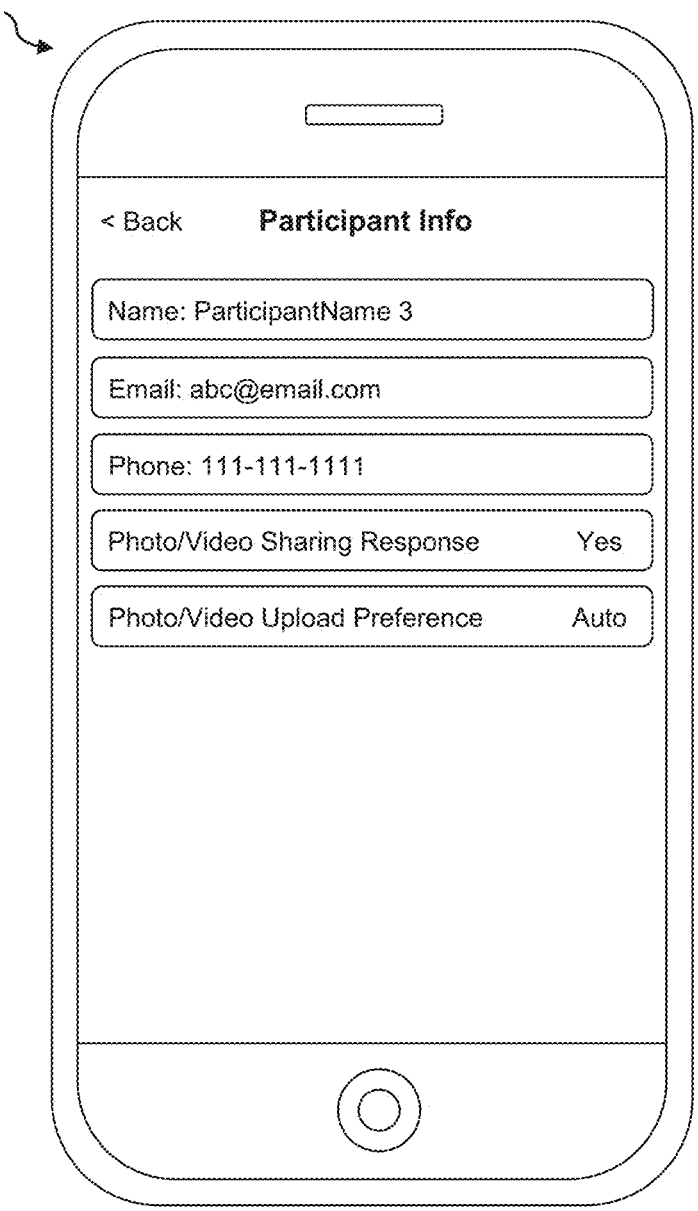
FIG. 16C illustrates an exemplary user interface of the 'Participant Info' screen of an event album, as seen by a photographer album participant, displaying not only the contact details (Name, Email, Phone) of the selected photographer album participant but also their photo/video sharing response as well as their photo/video upload preference for the event.
Figure 17A:
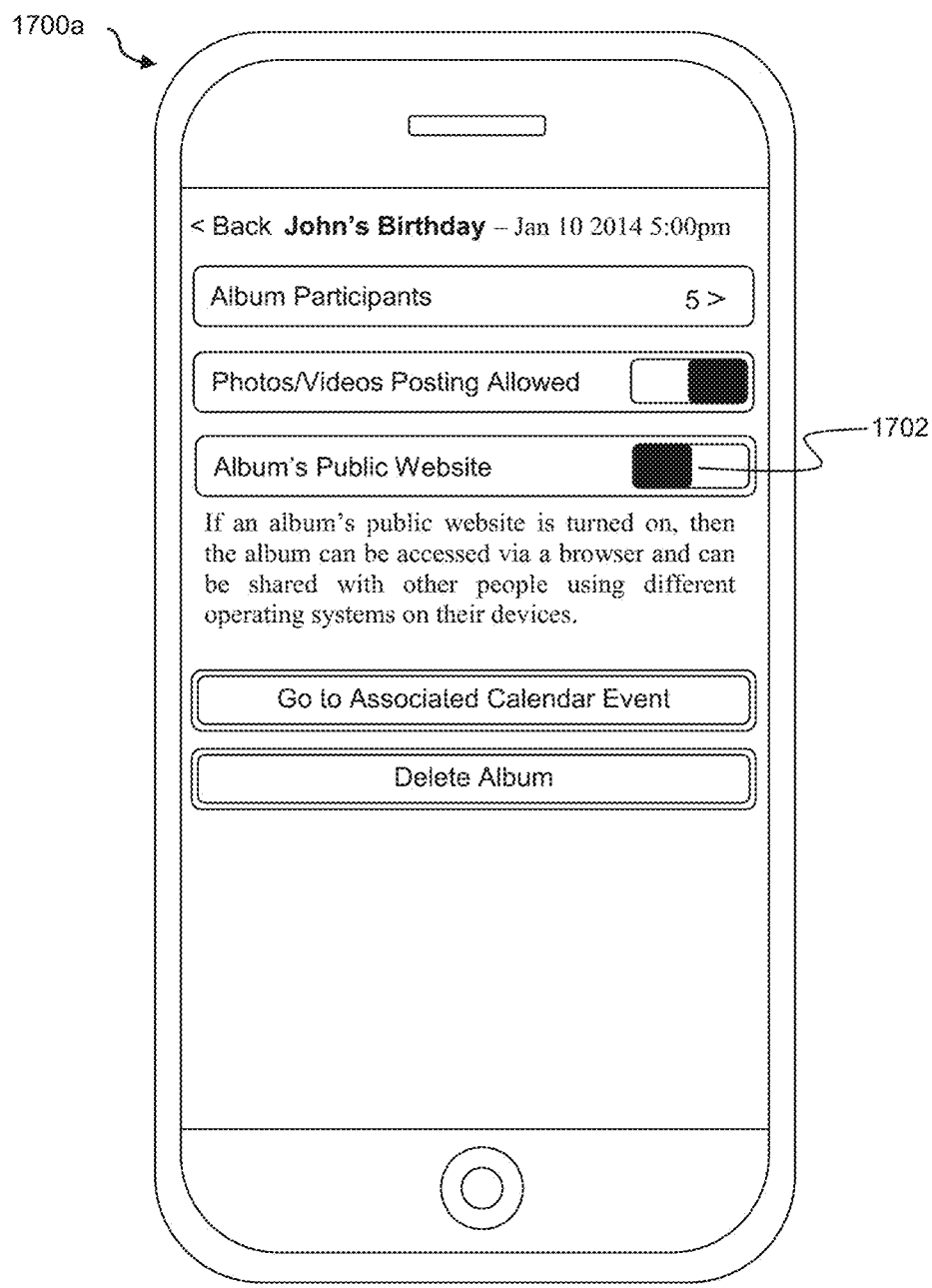
FIG. 17A illustrates an exemplary user interface of the settings/properties screen of an event album, as seen by an event owner, displaying how the 'Send Album Website Link via Email' button is instantly removed (no longer visible) when the 'Album's Public Website' field is changed from 'Yes' to 'No' by an event owner.
Figure 17B:
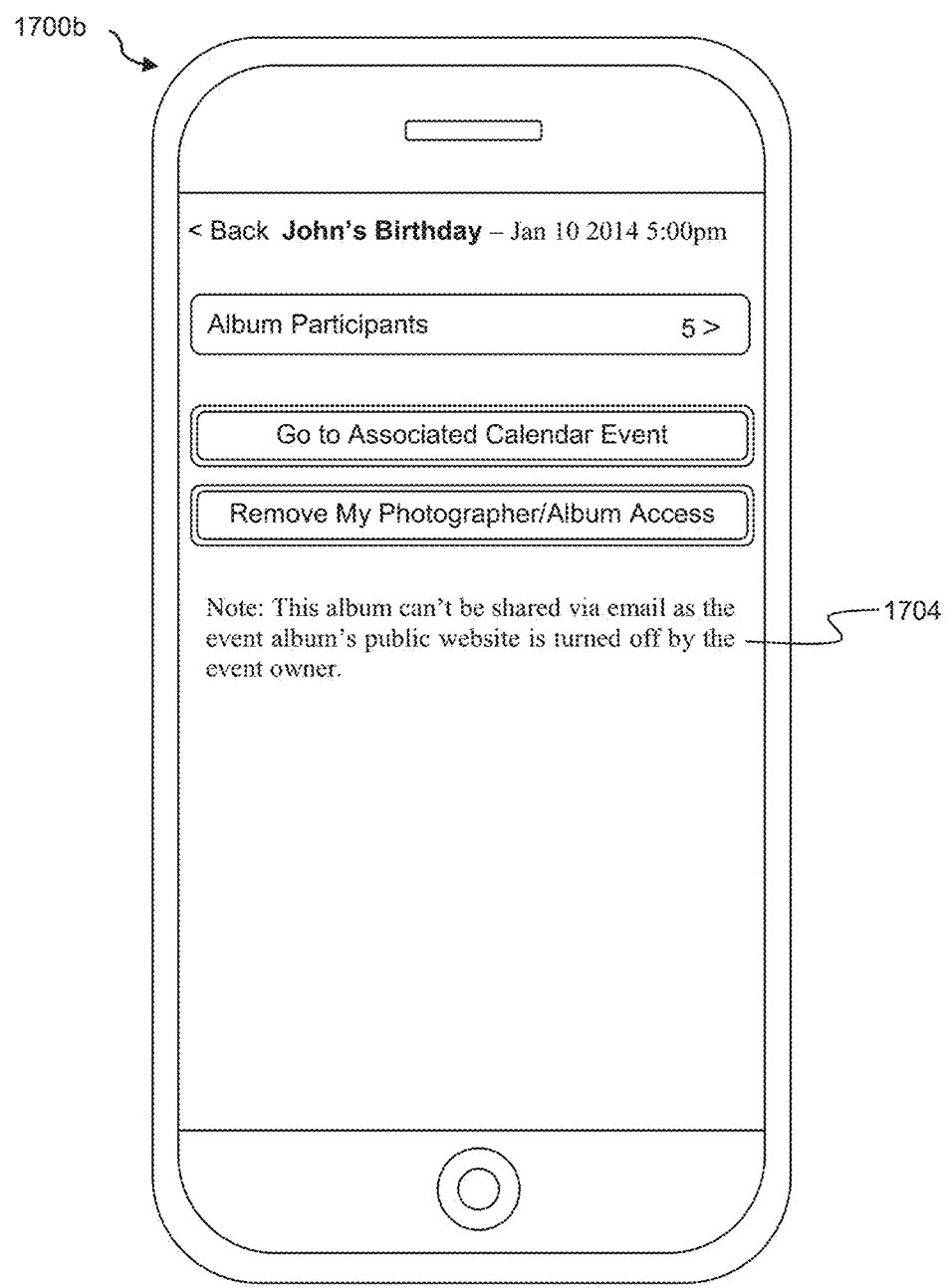
FIG. 17B illustrates an exemplary user interface of the settings/properties screen of an event album, as seen by a photographer album participant, when the 'Album's Public Website' is turned off ('No' selected) by an event owner.

According to an embodiment of the present invention, as seen in FIG. 15B and FIG. 16B, once an event invite is sent out (saved), if an event owner or a photographer invitee went to the event's album and looked for the participants with whom the event album had been shared, then any photographer invitees 1524 (regardless of their acceptance or decline of the photo/video sharing request) would be displayed in bold and would also have (P) 1526 next to their name in the suffix on that event album participant list 1532. This would make it easy to identify which people have been assigned as the photographers for the event via the calendar invite. In addition, depending upon the photographer invitees' photo/video sharing response, an indicator 1528 would be displayed next to the photographer invitees' names on the event album participant list, indicating if the photographer invitees have accepted (green circle), declined (red circle) or haven't yet responded (blank circle) to the event's photo/video sharing request.

Figure 3A:
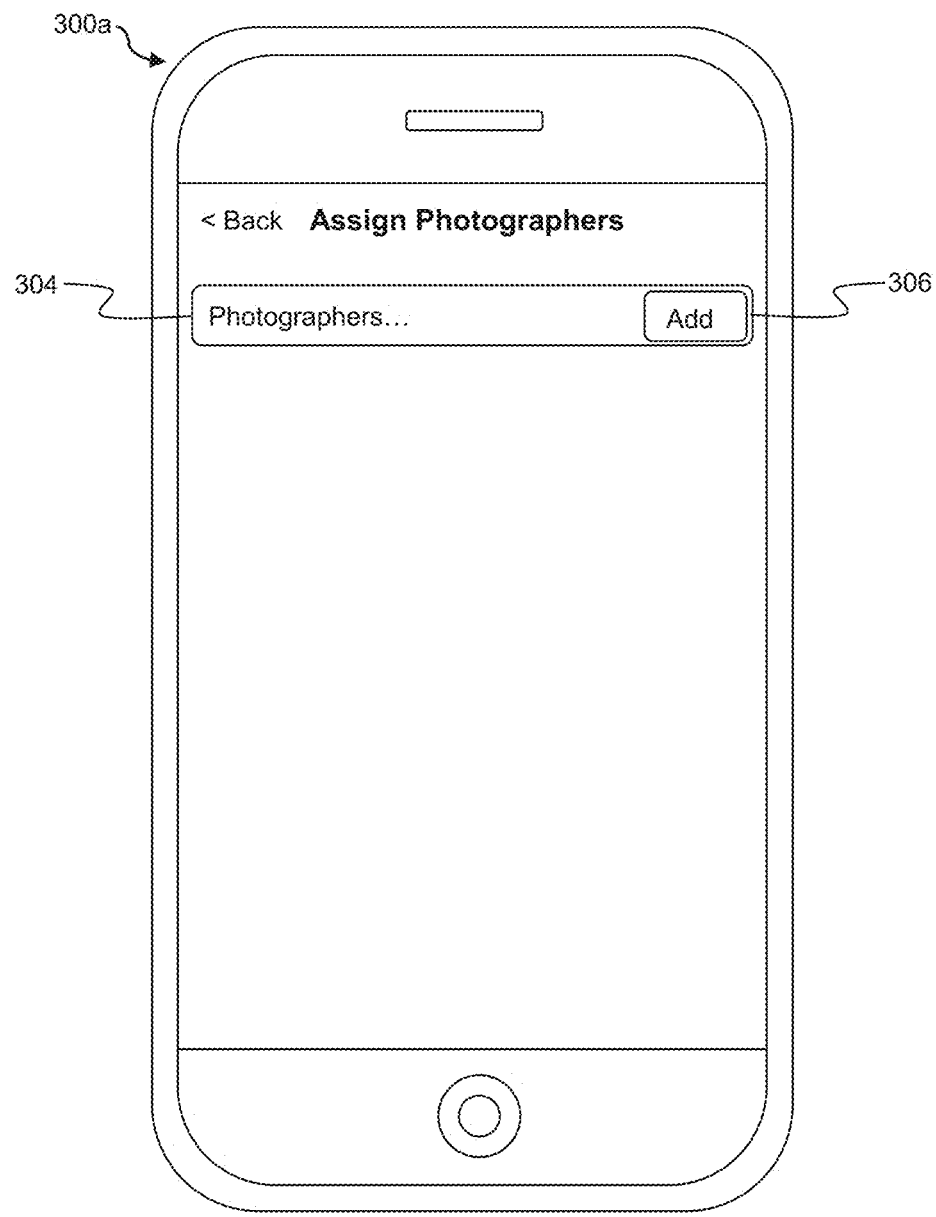
FIG. 3A illustrates an exemplary user interface of the 'Assign Photographers' screen of a calendar event, as seen by an event owner, having an 'Add' option to assign photographers.
Figure 3B:
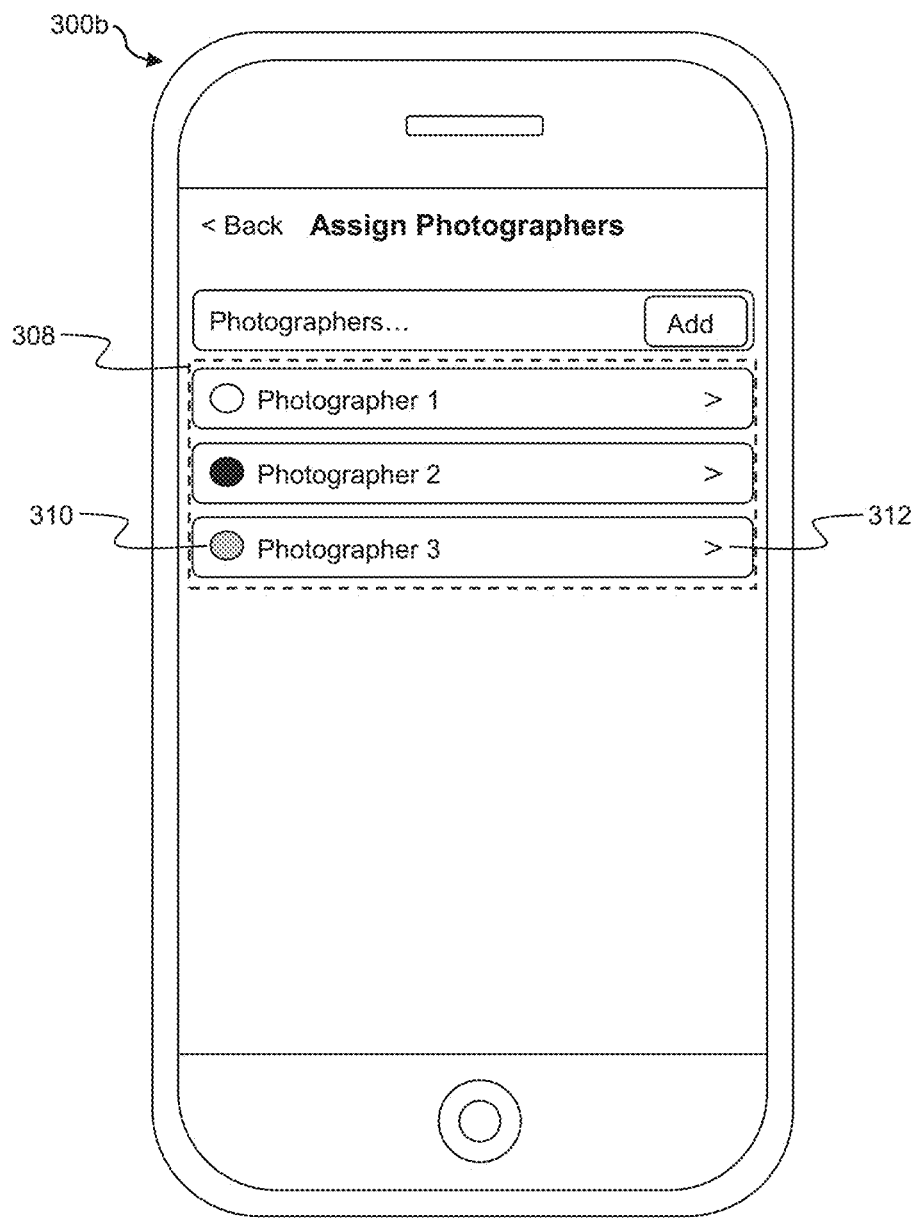
FIG. 3B illustrates an exemplary user interface of the 'Assign Photographers' screen of a calendar event, as seen by an event owner, which not only has an 'Add' option but also lists those photographer invitees that might have already been assigned earlier.
Figure 3C:
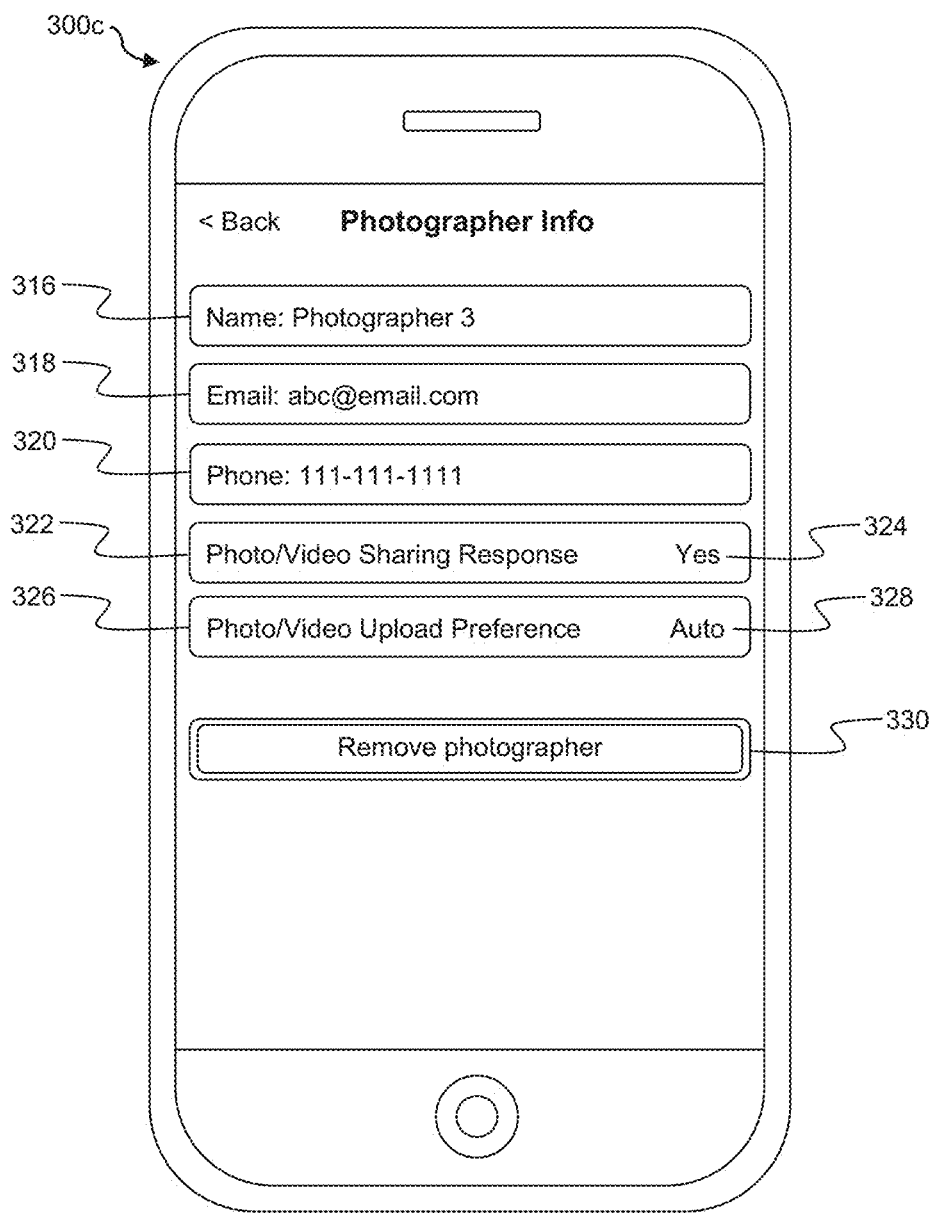
FIG. 3C illustrates an exemplary user interface of the 'Photographer Info' screen of a calendar event, as seen by an event owner, displaying not only the contact details (Name, Email, Phone) of the photographer invitee but also their photo/video sharing response as well as their photo/video upload preference for the event.
Figure 8A:
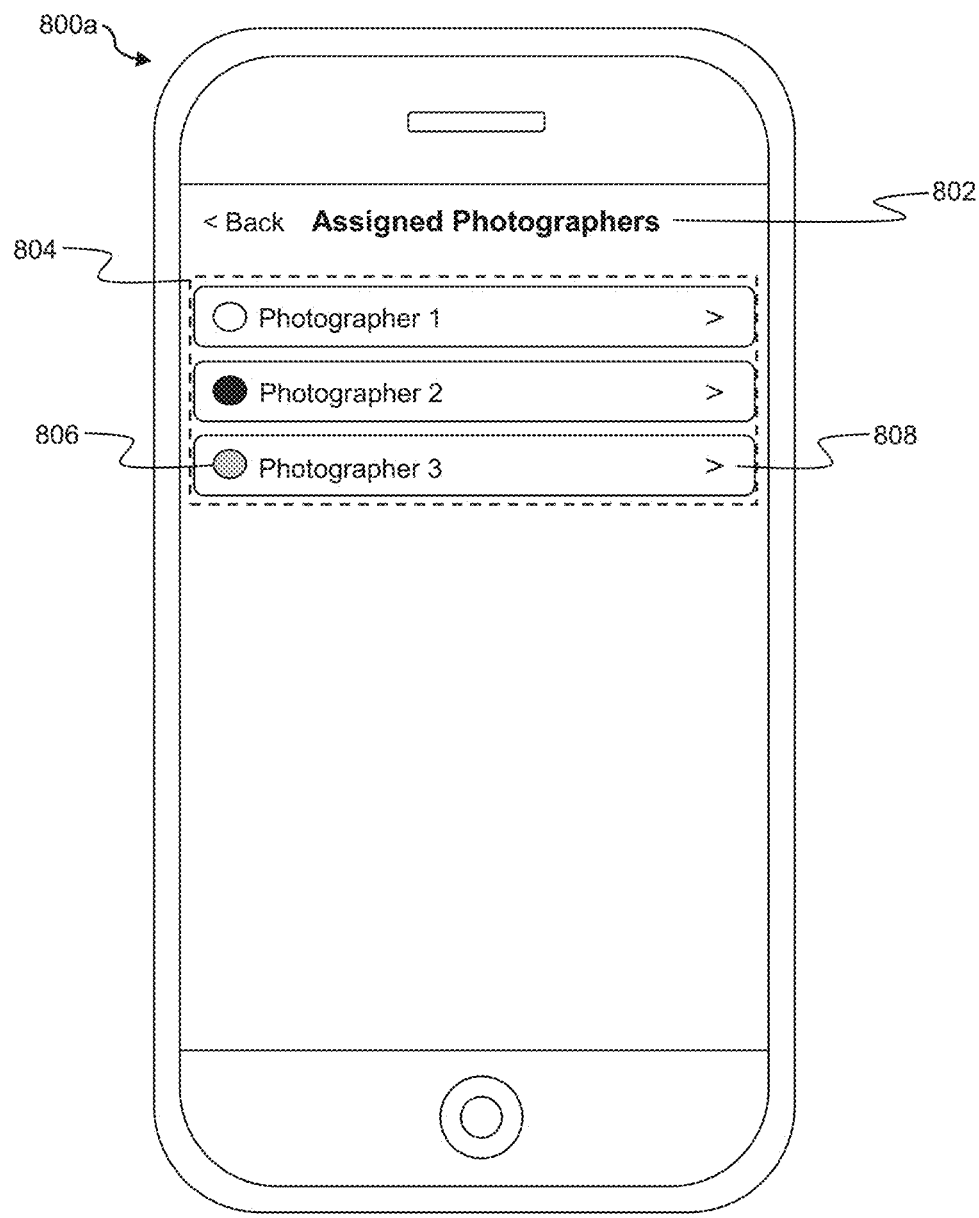
FIG. 8A illustrates an exemplary user interface of the 'Assigned Photographers' screen of a calendar event invite, as seen by a photographer invitee, listing all those photographer invitees that might be assigned to the event by an event owner along with each photographer invitee's photo/video sharing response.

According to an embodiment of the present invention, as seen in FIG. 3B and FIG. 8A, similar to the event album participant list, a photo/video sharing response indicator 310, 806 would also be displayed next to the photographer invitees' names on the calendar event's photographer list 308, 804 i.e. on both the 'Assign Photographers' screen 300b, which is visible to the event owner, and the 'Assigned Photographers' screen 800a, which is visible to all the photographer invitees of the event. This response indicator would show if the photographer invitees have accepted (green circle), declined (red circle) or haven't yet responded (blank circle) to the event's photo/video sharing request.

'Pre-event Duration (hours)' 210—According to an embodiment of the present invention, as seen in FIG. 2A and FIG. 2B, an event owner will be able to use this option to request the photographer invitees to take pre-event photos/videos by providing the number of hours 222 that the 'Pre-event Duration' will be before the actual event. Default value will be '0' hours for this field and the maximum value allowed will be up to '12' hours. The following note/explanation will be added below the 'Pre-event Duration (hours)' field—"Assigned photographers will also be requested to share photos/videos during 'Pre-event Duration'"

'Post-event Duration (hours)' 212—According to an embodiment of the present invention, as seen in FIG. 2A and FIG. 2B, an event owner will be able to use this option to request the photographer invitees to take post-event photos/videos by providing the number of hours 224 that the 'Post-event Duration' will be after the actual event. Default value will be '0' hours for this field and the maximum value allowed will be up to '12' hours. The following note/explanation will be added below the 'Post-event Duration (hours)' field—"Assigned photographers will also be requested to share photos/videos during 'Post-event Duration'"

'Manual Upload Duration (hours)' 214—According to an embodiment of the present invention, as seen in FIG. 2A and FIG. 2B, an event owner will also be able to select a value for this 'Manual Upload Duration (hours)' field. This is the duration (in hours) 226 that comes after the 'Post-event Duration' and provides the photographer invitees a time-bound set opportunity to manually upload any remaining photos/videos before the event album might get shared with the event's invitees/attendees. Default value will be '5' hours, however the event owner would be allowed to select any value between '0' and '24' hours. The following note/explanation will be added below the 'Manual Upload Duration (hours)' field—"This duration will begin once the 'Post-event Duration' is complete and will provide an opportunity for the photographers to upload any remaining photos/videos to the event album." Note: All photographer invitees, including the event owner, would still be allowed to manually upload their photos/videos to the event album either before or after the 'Manual Upload Duration' is complete. However, the significance of the 'Manual Upload Duration' is that it provides a time-bound set opportunity for the photographer invitees to manually upload any outstanding photos/videos before the event album might get shared with the event's invitees/attendees.

'Owner's Upload Preference' 216—According to an embodiment of the present invention, as seen in FIG. 2A and FIG. 2B, this field only applies to an event owner. It allows the event owner to select either 'Auto', 'Double-check' or 'Manual', indicating their upload preference for the event's photos/videos. Note: 'Double-check' 228 is the default value for this field. Here is a detailed description for each of those selections—

'Auto'—When 'Auto' is selected,—An event owner agrees to instantly/automatically upload all photos/videos taken during the event, including the 'Pre-event Duration' and 'Post-event Duration', to the event's photo/video album. In other words, any photos/videos that are taken by the 'Camera' application of the event owner's device between the start of the event's 'Pre-event Duration' to the end of that event's 'Post-event Duration' would be automatically uploaded to the event's photo/video album.

Here are some exceptions to the 'Auto' functionality—Regardless of 'auto' selection in the "Owner's Upload Preference" field, an event owner can always go directly to the event's shared photo/video album (FIG. 14) on their supported operating system device and upload any additional photos/videos manually. Or an event owner can also install an app or client software on their unsupported (different operating system) devices, which would allow them to manually upload any photos/videos, existing on their unsupported devices, to the shared photo/video album of the supported operating system.

If the event owner takes a photo/video that has size more than the allowed/set limit for cellular data upload (for example: 100 Mb), then even though the upload preference might be set to 'Auto,' the photo/video would not be automatically uploaded, and the following notification would be sent to the event owner—"Since [photo/video file name] is more than [MbLimit] Mb, which is above the cellular data upload limit, you will need to manually upload this photo/video to the event album when your device is within the wifi range." (Note: Here [photo/video file name] would be replaced with the actual photo/video filename, and [MbLimit] would be replaced with the maximum value that's set for cellular data upload.)

Figure 10A:
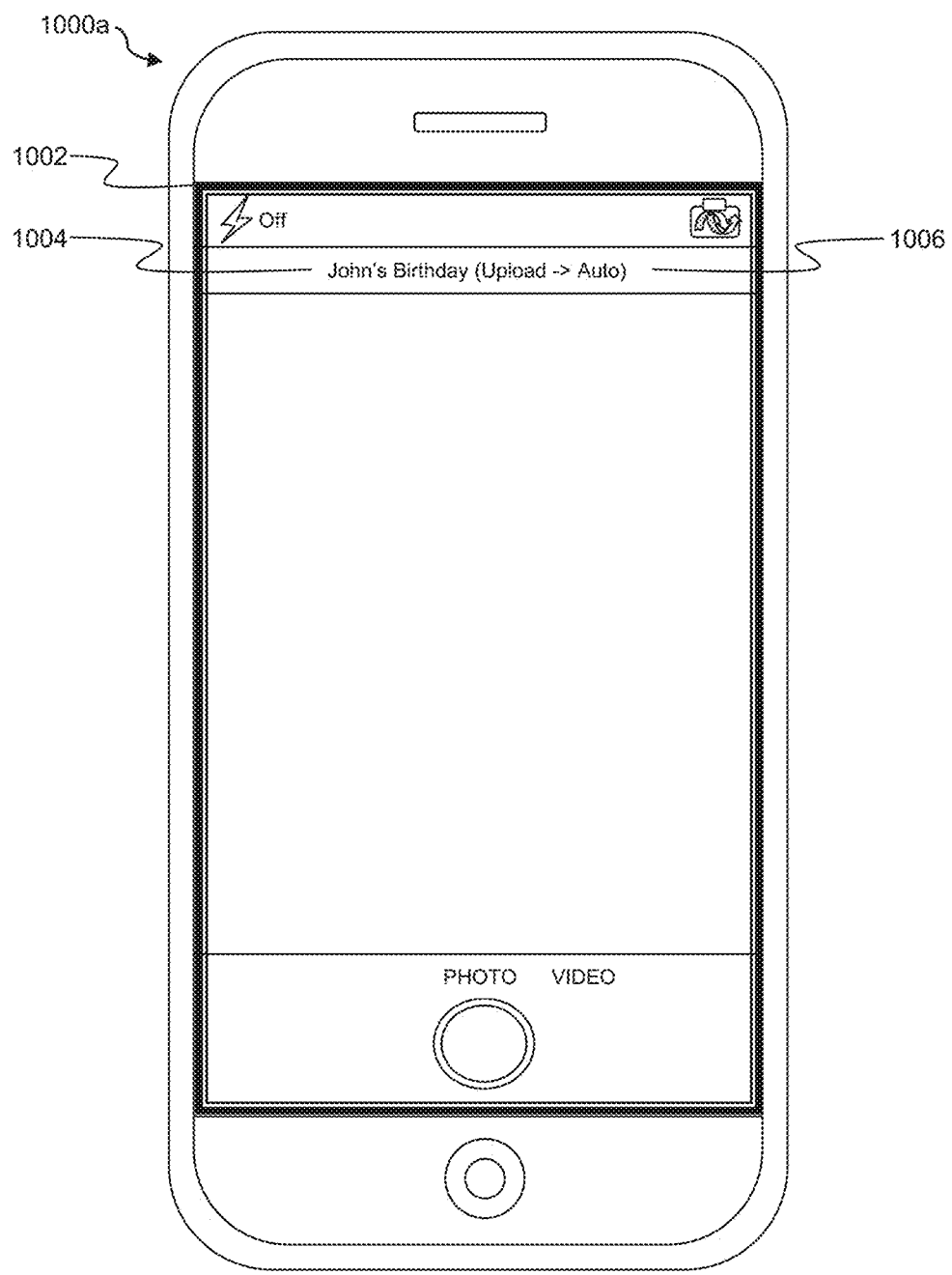
FIG. 10A illustrates an exemplary 'Camera' application of a mobile device, displaying a thin colored border frame as a visual indicator, and in addition, an event's name as well as the photographer invitee's latest photo/video upload preference (in this case, 'Auto') is also displayed on this screen.
Figure 10B:
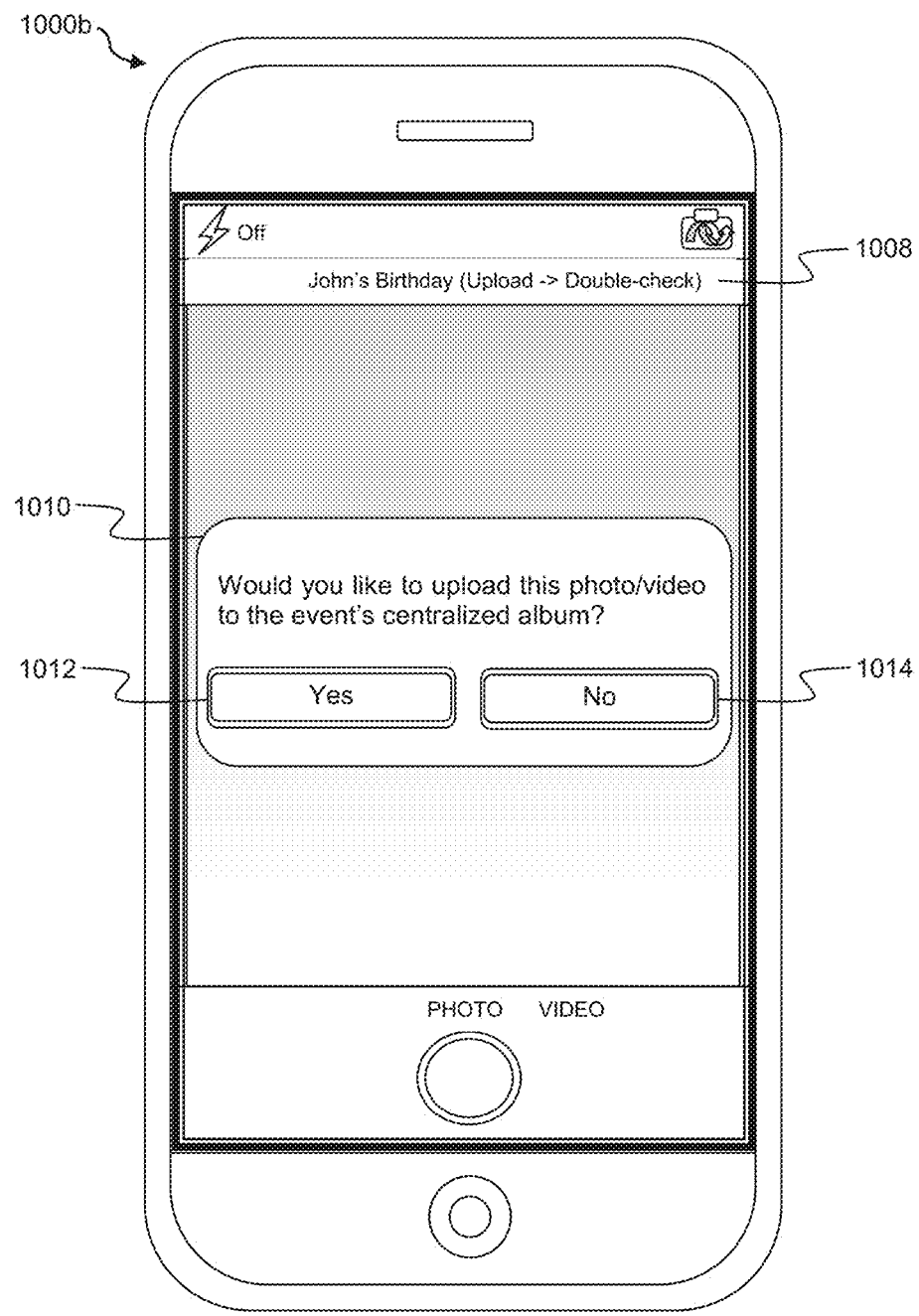
FIG. 10B illustrates an exemplary confirmation screen, which would be displayed on the 'Camera' application of a mobile device for those photographer invitees that have their event's photo/video upload preference selected as 'Double-check'. Confirmation screen would have the following message—"Would you like to upload this photo/video to the event's centralized album?"

'Double-check'—According to an embodiment of the present invention, when 'Double-check' is selected, as seen in FIG. 10B, after each photo or video is taken during the event, including the 'Pre-event Duration' and 'Post-event Duration', event owner will be prompted with a question 1010 to either upload or not to upload that photo/video to the event's album. (Note: Only the photos/videos that were taken using 'Camera' application of the event owner's device will be prompted for upload to the event's photo/video album.) If the event owner selects 'yes' 1012 to upload the photo/video, then that would be instantly uploaded to the event's photo/video album. If the event owner selects 'no' 1014 for uploading a photo/video, then no additional action would be taken for that photo/video rather than just storing it on the device's photo library i.e. that photo/video would not be uploaded to event's photo/video album.

Here are some exceptions to the 'Double-check' functionality—Regardless of 'Double-check' selection in the "Owner's Upload Preference" field, an event owner can always go directly to the event's shared photo/video album (FIG. 14) on their supported operating system device and upload any additional photos/videos manually. Or an event owner can also install an app or client software on their unsupported (different operating system) devices, which would allow them to manually upload any photos/videos, existing on their unsupported devices, to the shared photo/video album of the supported operating system.

If the event owner takes a photo/video that has size more than the allowed/set limit for cellular data upload (for example: 100 Mb), then even though the event owner might have the upload preference set to 'Double-check' and confirms to upload the photo/video, it would still not be automatically uploaded. In addition, the following popup would be displayed to the event owner—"Since [photo/video file name] is more than [MbLimit] Mb, which is above the cellular data upload limit, you will need to manually upload this photo/video to the event album when your device is within the wifi range." (Note: Here [photo/video file name] would be replaced with the actual photo/video filename, and [MbLimit] would be replaced with the maximum value that's set for cellular data upload.)

'Manual'—When 'Manual' is selected, An event owner agrees to manually select and upload photos/videos to the event's centralized album. In other words, rather than automatically/instantly uploading their photos/videos that are taken during the event, an event owner prefers to manually upload those photos/videos. It will also provide an opportunity to event owner to even upload those photos/videos that were initially saved to their device's photo library by possibly a third-party application on their device. Note: For the manual upload option, an event owner can also install an app or client software on their unsupported (different operating system) devices, which would allow them to manually upload any photos/videos, existing on their unsupported devices, to the shared photo/video album of the supported operating system.

By selecting this 'Manual' option, an event owner takes the responsibility to try and upload any photos/videos before the event's 'Manual Upload Duration' is complete. By doing so, an event owner's photos/videos would already be there on the event's album when that album notification is sent to the event guests. Note: In case if the event owner isn't able to upload their photos/videos within the 'Manual Upload Duration', then they will still be allowed to upload those at a later time. The only problem with that is if any guests try to view the album before the new photos/videos are uploaded, then they would not be able to view the new ones.

Here is an exception to the 'Manual' functionality—If the event owner tries to manually upload a photo/video that has size more than the allowed/set limit for cellular data upload (for example: 100 Mb), then that photo/video would not be uploaded, and the following notification would be sent to the event owner—"Since [photo/video file name] is more than [MbLimit] Mb, which is above the cellular data upload limit, you will need to later upload this photo/video to the event album when your device is within the wifi range." (Note: Here [photo/video file name] would be replaced with the actual photo/video filename, and [MbLimit] would be replaced with the maximum value that's set for cellular data upload.)

Figure 2C:
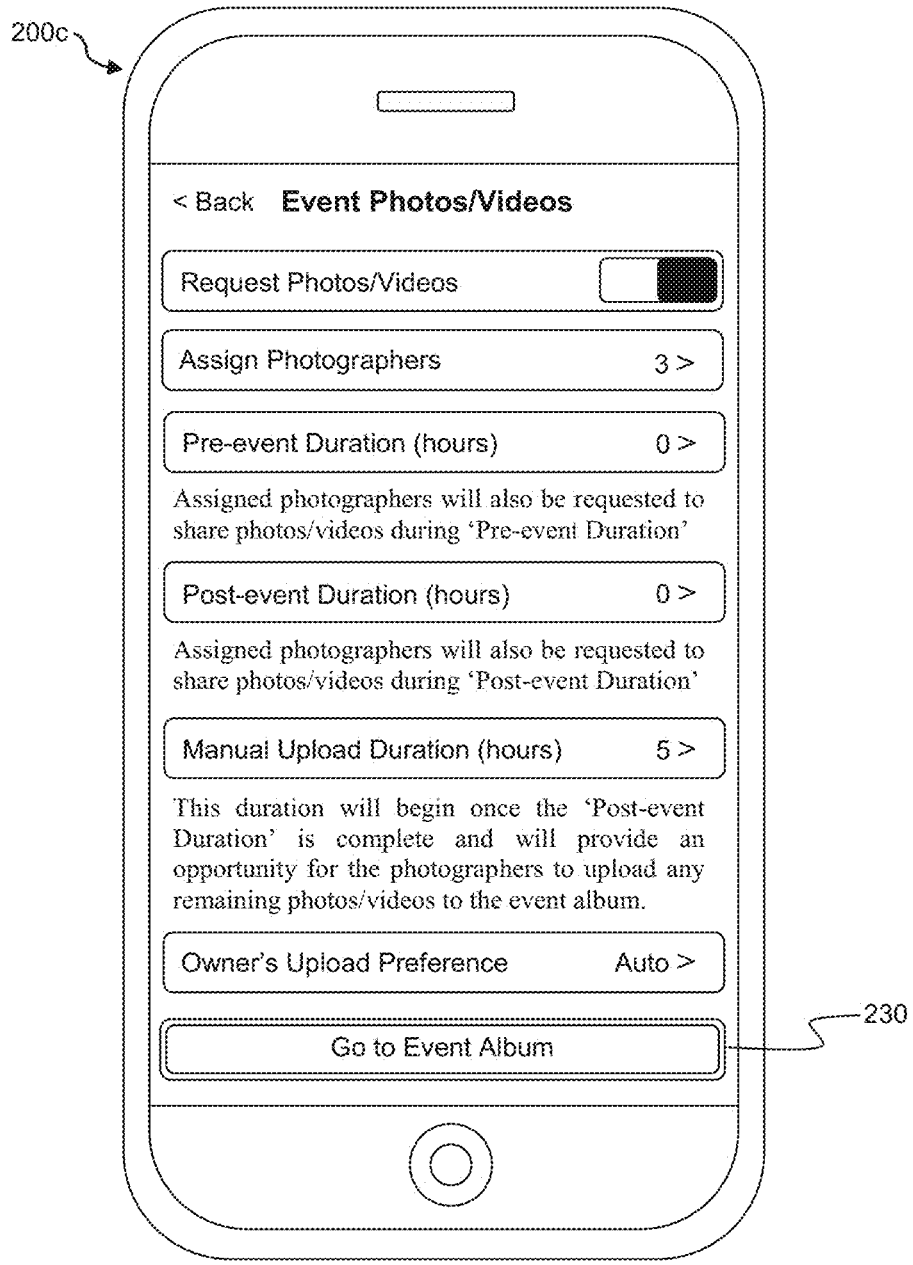
FIG. 2C illustrates an exemplary user interface of the 'Event Photos/Videos' screen of a calendar event, as seen by an event owner, displaying the 'Go to Event Album' button at the bottom of the screen since the event has been saved previously.

'Go to Event Album' button 230—According to an embodiment of the present invention, as seen in FIG. 2A—2C, this 'Go to Event Album' button wouldn't be visible/enabled initially on the 'Event Photos/Videos' screen until an event owner selects 'Yes' 218 for 'Request photos/videos' field 204, and in addition, also saves that entire event. It's only later that if the event owner goes back to the 'Event Photos/Videos' screen 200c of the calendar invite, then they would see the 'Go to Event Album' button 230 at the bottom of that screen.

An event owner would be able to click on this 'Go to Event Album' button 230 and go directly to the associated photo/video album 1400 (FIG. 1 4) for that event. Note: This 'Go To Event Album' button isn't visible/enabled initially since the event's album isn't even created until the calendar invite, along with the photo/video sharing request, is once saved by an event owner.

By using the 'Go to Event Album' button, an event owner can go to the associated event album to not only view, add or delete any photos/videos but can also go to the album to change any of the album settings/properties. For example: An event owner can use the 'Go to Event Album' button to go to the event album, and thereafter, change the album setting from a 'Public Album' to a 'Non-public Album'. Note: Once the 'Go to Event Album' button is added at the bottom of the 'Event Photos/Videos' screen, it would remain there until the album no longer exists or the event itself is deleted by the event owner. In other words, even if the event owner keeps changing their selection for 'Request photos/videos' field from 'Yes' to 'No' and vice versa, the 'Go to Event Album' button, which has been once added, would continue to remain on the 'Event Photos/Videos' screen to signify that an event album is/was associated with that event. (Note: This 'Go to Event Album' button on the 'Event Photos/Videos' screen is only visible to the event owner of that particular event.)

'Back' button (An option to go back to the previous screen). When this 'Back' button is clicked, it would take the event owner back to the main screen of the calendar invite.

Figure 4A:
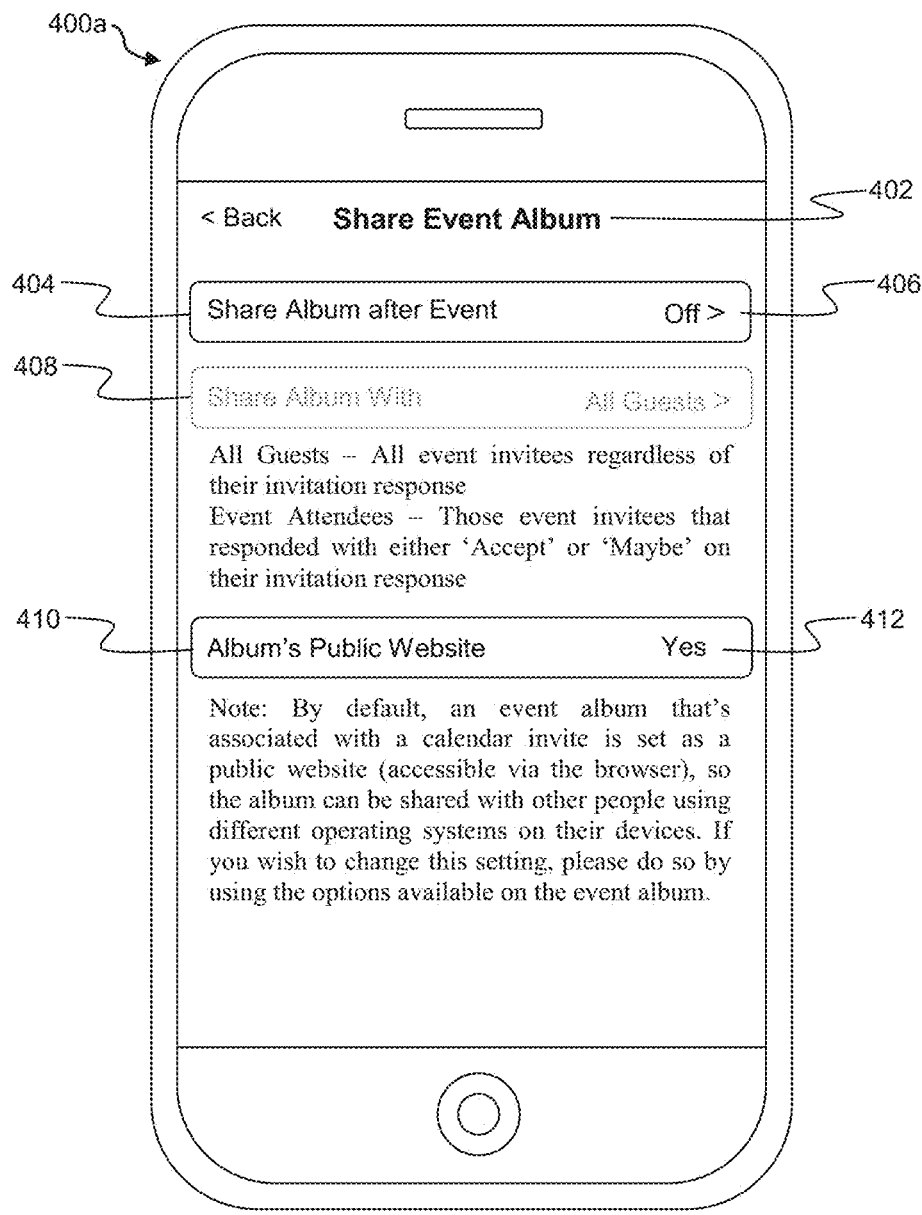
FIG. 4A illustrates an exemplary user interface of the 'Share Event Album' screen of a calendar event, as seen by an event owner. Using this screen, an event owner would be able to indicate if and how they wish to share the event's photo/video album with the selected set of guests once an event is complete.

'Share Event Album' Option and its Sub-Options on the Event Owner's Event Invite According to an embodiment of the present invention, as seen in FIG. 1A-1B and FIG. 4A, when the 'Share Event Album' option 104 is enabled and it's selected 110 by an event owner, a new window 400a with the same title 'Share Event Album' 402 will open up. On the 'Share Event Album' screen, the following options will be available (Note: even if the event is set up as a recurring event, the below options would remain the same on the event owner's screen)—

'Share Album after Event' 404—Using this field, an event owner would be able to set their preference whether or not they wish to share the event's photo/video album once that event is complete. (Note: 'Off' 406 would be the default value for this 'Share Album after Event' field.) An event owner would be able to change the 'Share Album after Event' field to either 'Auto', 'Manual' or 'Off' value. Upon selection of 'Auto' 414 on the 'Share Album after Event' field 404, the following would occur—

Figure 13A:
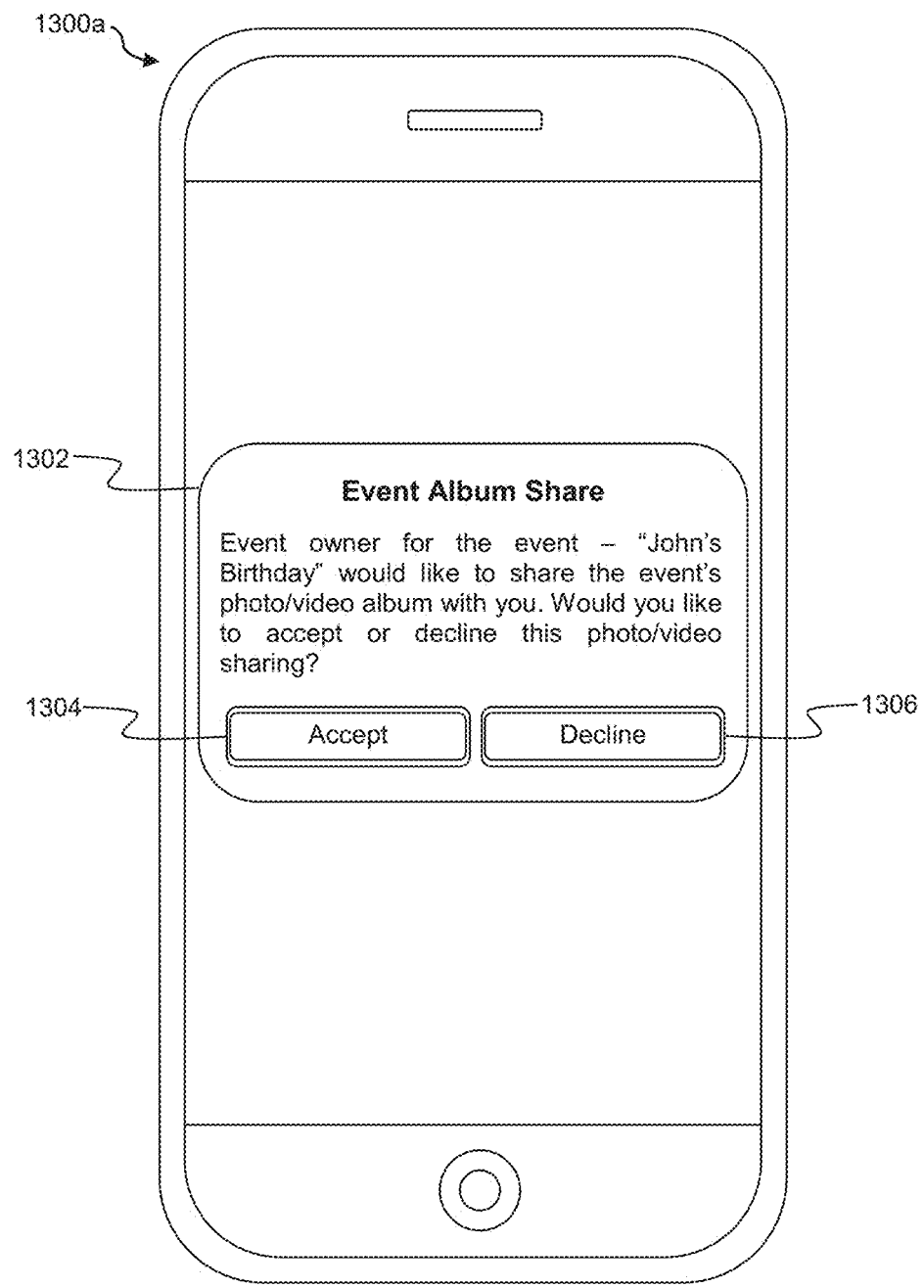
FIG. 13A illustrates an exemplary 'Event Album Share' confirmation screen, which would be displayed to those event invitees that were selected by an event owner for sharing the event's album, and in addition, have the same operating system on their devices as an event owner. Purpose of this confirmation screen is to inform the recipients that the event owner would like to share the event's album with them, and that they can either accept or decline the request.

Upon selection of 'Auto', when the event's total duration including the 'Post-event Duration' and the 'Manual Upload Duration' is complete, then the invitees selected 416 by an event owner on the 'Share Album With' field 408 would automatically receive a notification about the event's centralized photo/video album i.e. as seen in FIG. 13A, selected invitees that use the same operating system as the event owner would be directly sent the album sharing notification on their devices. On the other hand, as seen in FIG. 13B, selected invitees that don't use the same operating system as the event owner would be sent the album link via an email. Here are the details—

If the invitee has a device with the same operating system as the event owner, then the following would occur—They would automatically receive a request 1302 after the 'Manual Upload Duration' that the event owner would like to share [EventName] photo/video album with them. If the guest selects 'Accept' 1304 for the request, then they would be able to view the event album, and depending upon the permissions granted by the event owner, they might even be able to add any additional photos/videos to that album. However, if the guest selects 'Decline' 1306, then they wouldn't get access to the event's album. Note: When the album is about to be shared with the invitees, at that time if there were any photographer invitees that already had the photo/video sharing request accepted, then those photographer invitees would not receive the event's album sharing request again. This is because the event photographers anyways would have access to the event's photo/video album, and therefore, do not need to be notified again. (In other words, when the album is about to be shared with the invitees, only those invitees that don't have the photo/video sharing request accepted at that time would receive the event's album sharing request.)

If the invitee has a device with a different operating system than the event owner, then the following would occur—Invitees would automatically receive an email 1300b after the 'Manual Upload Duration' that the event owner would like to share [EventName] photo/video album with them. When the invitees click on the album link in the email, they would be able to view the event's photo/video album in the browser, but they would not be able to add any additional photos/videos or comments to that album until they login using the proprietary operating system's account. Any of those updates would be automatically published to all participants of the shared event album.)

When 'Auto' 414 is selected for the 'Share Album after Event' field 404, then the next field 'Share Album With' 408 would automatically/immediately get enabled (without requiring save on the calendar event) and allow the event owner to make their appropriate selection 416 for the guests that must receive the event's photo/video album. Note: In case if there were no photos/videos in the event's centralized album at the end of the event, the album would still be shared automatically with the recipients either via the device or via an email, and that would depend upon their recipients' device operating system.

According to an embodiment of the present invention, as seen in FIG. 13B, when an event album link is shared via email, all recipients' email addresses would be put in the bcc section of the email such that one recipient isn't able to view another recipient's email address. Note: Even though 'Auto' is selected on the 'Share Album after Event' field, an event owner would still be able to do the following—

Figure 4B:
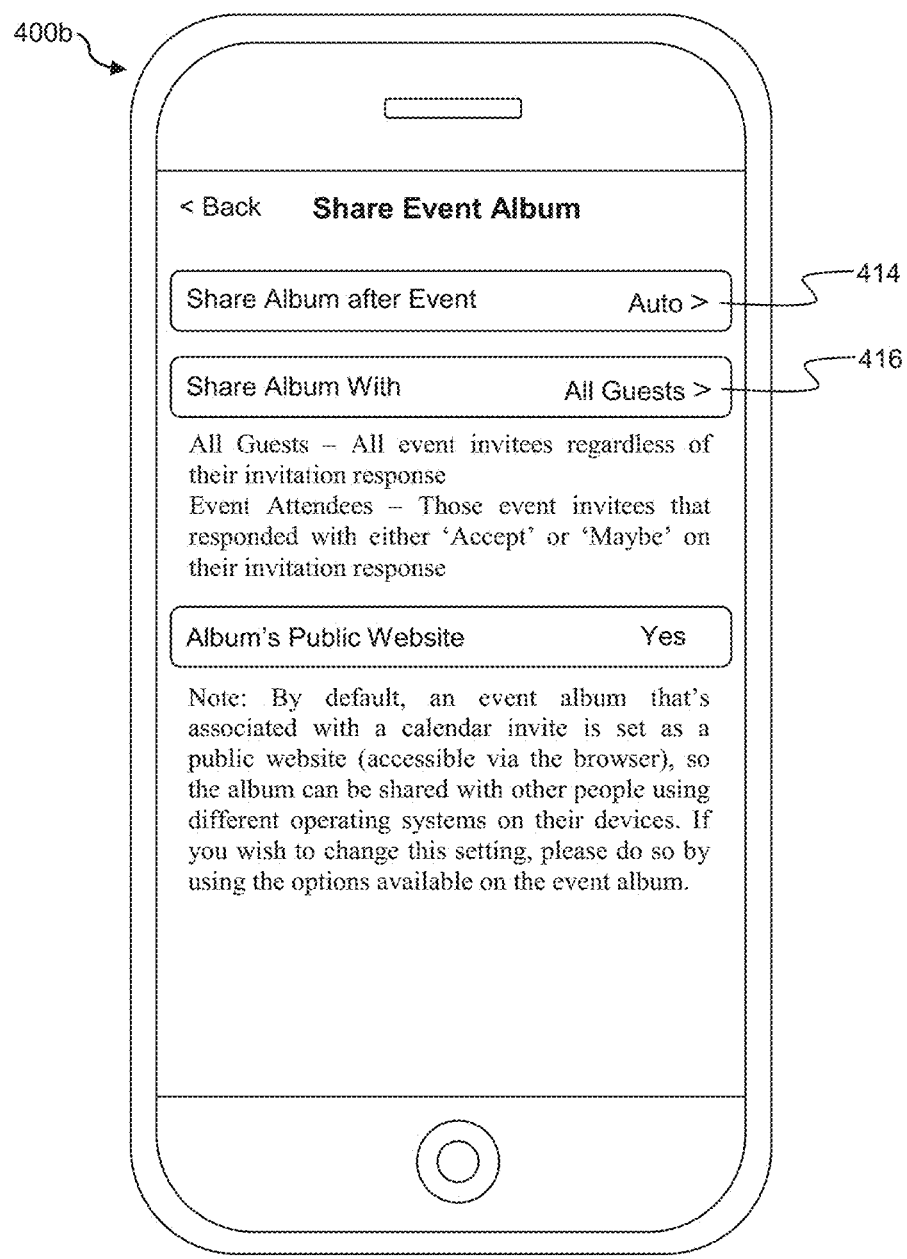
FIG. 4B illustrates an exemplary user interface of the 'Share Event Album' screen of a calendar event, as seen by an event owner, displaying how the 'Share Album With' field instantly becomes enabled when 'Share Album after Event' field is changed to either 'Auto' or 'Manual' by an event owner.
Figure 4C:
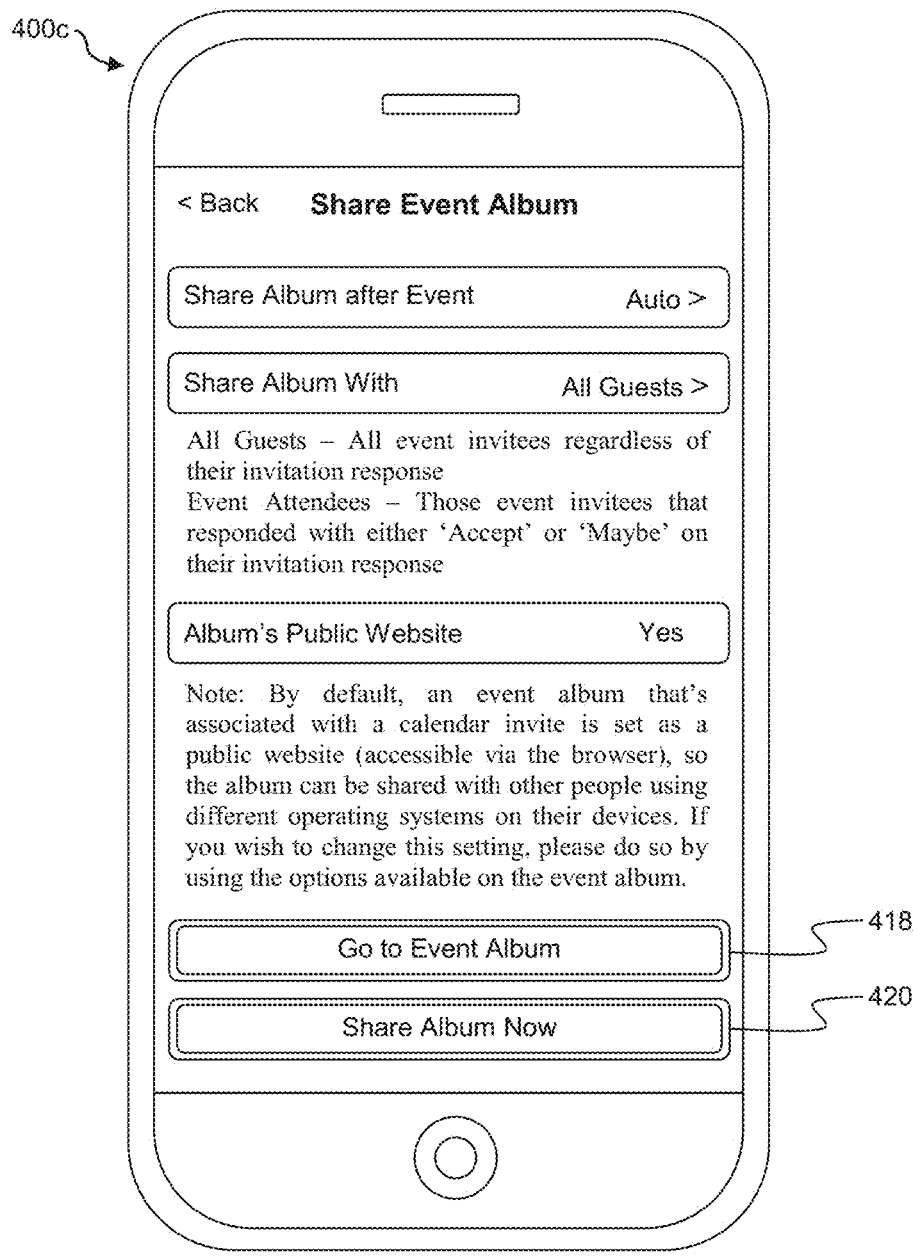
FIG. 4C illustrates an exemplary user interface of the 'Share Event Album' screen of a calendar event, as seen by an event owner, displaying the 'Go to Event Album' button at the bottom of the screen since the event has been saved previously. In addition, as the figure illustrates, the 'Share Album Now' button is also visible at the bottom of the screen.
Figure 5A:
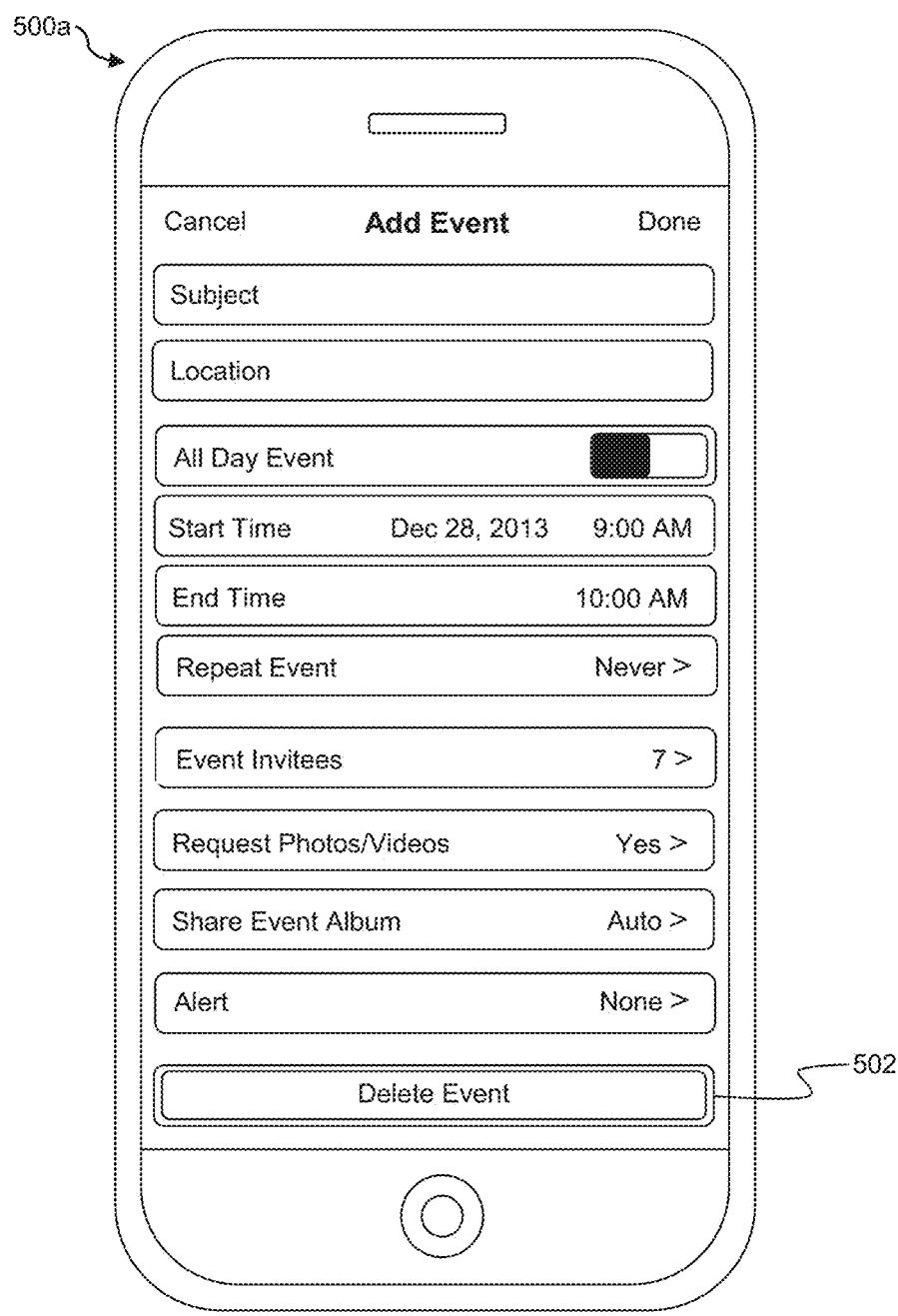
FIG. 5A illustrates an exemplary user interface of the main screen of a calendar event, as seen by an event owner, displaying the 'Delete Event' button at the bottom of the screen.
Figure 5B:
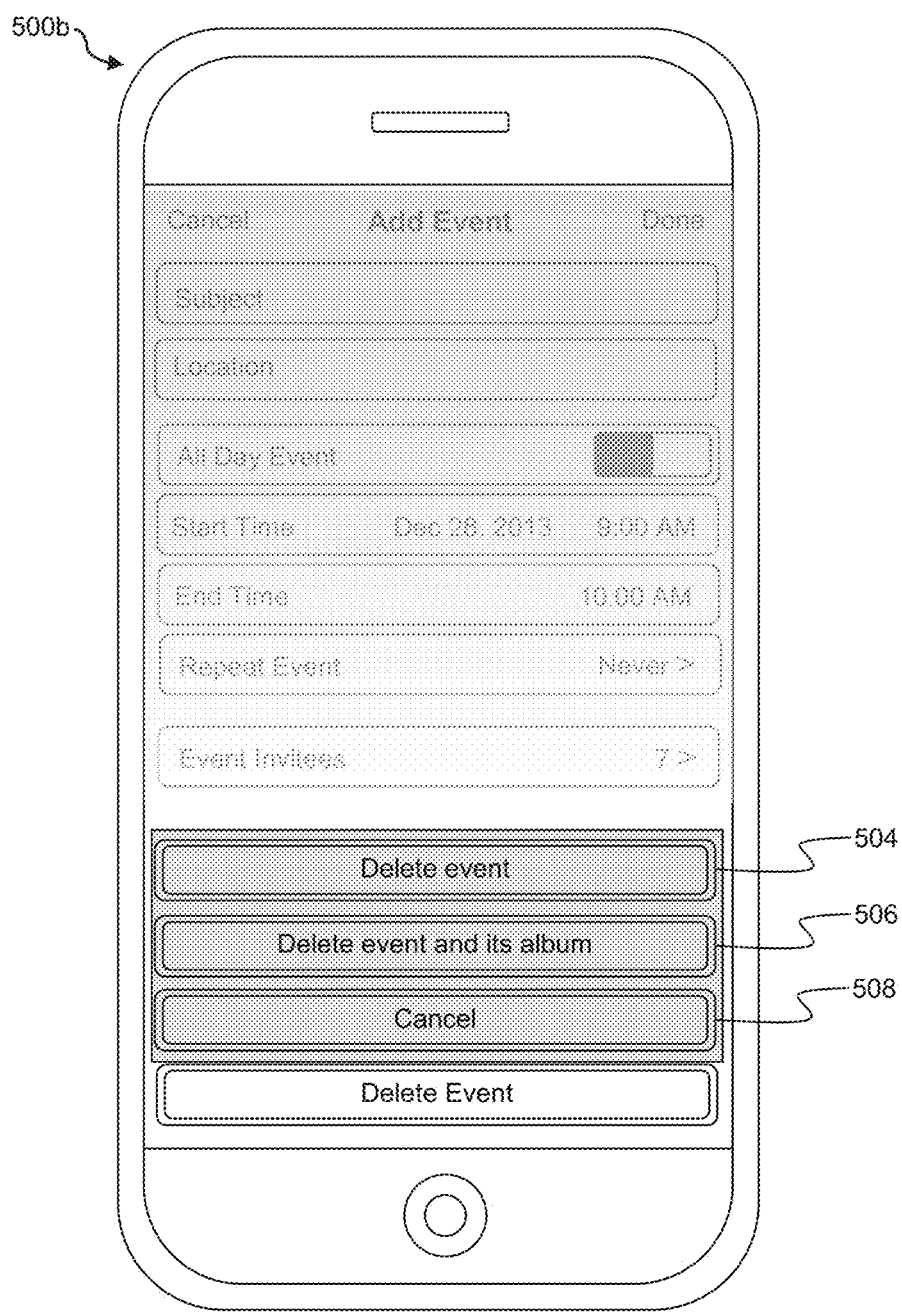
FIG. 5B illustrates an exemplary user interface of the main screen of a calendar event, as seen by an event owner, displaying the available options when 'Delete Event' button is clicked on that event, which has an associated photo/video album. Here is a list of those options—'Delete Event', 'Delete event and its album', 'Cancel'.
Figure 5C:
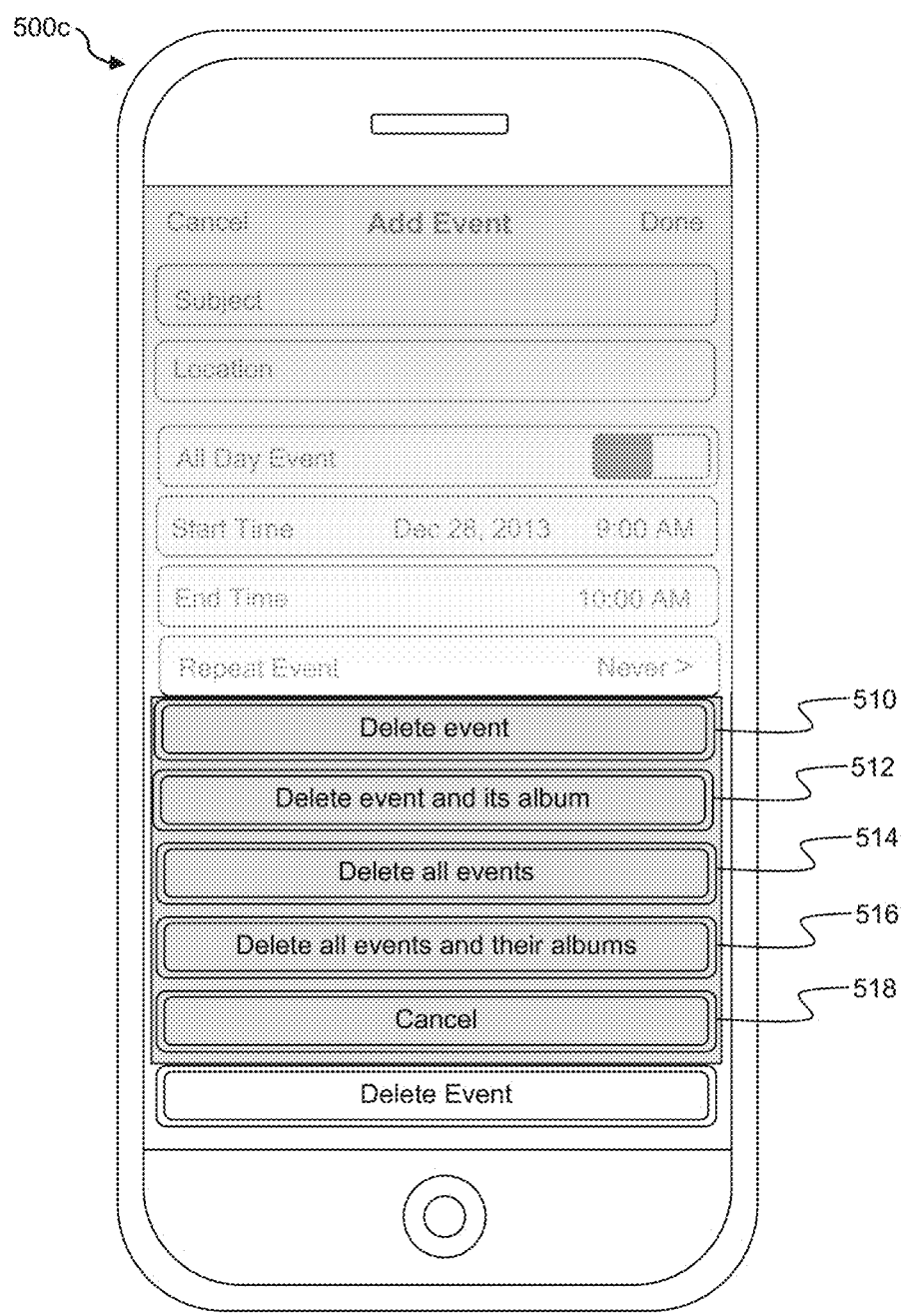
FIG. 5C illustrates an exemplary user interface of the main screen of a recurring calendar event, as seen by an event owner, displaying the available options when 'Delete Event' button is clicked on that recurring event.

According to an embodiment of the present invention, as seen in FIG. 4C, an event owner would be able to manually share the album directly with 'All Guests' or just the 'Event Attendees' using the 'Share Album Now' button 420 available on the 'Share Event Album' screen 400c of the event's calendar invite. Note: 'Share Album Now' button 420 would be enabled/visible on the screen only once the 'Manual Upload Duration' is complete for an event. In addition, this button is available only when 'Auto' or 'Manual' is selected on the 'Share Album after Event' field on the 'Share Event Album' screen.

According to an embodiment of the present invention, as seen in FIG. 15A, an event owner would also be able to manually share 1514 the album individually with any people that they want and at any time, regardless if that person is an event invitee or not, by using the options available on the event album's properties/settings screen 1500a. (Note: this feature of being able to manually sharing an event album with any individuals would be available regardless if 'Auto', 'Manual' or 'Off' is selected on the 'Share Album after Event' field on the 'Share Event Album' screen. More details about this feature is provided in the below sections as it's mainly used when 'Manual' or 'Off' might be selected on the 'Share Album after Event' field.)

Upon selection of 'Manual' on the 'Share Album after Event' field 404, the following would occur—When the event's total duration including the 'Post-event Duration' and the 'Manual Upload Duration' is complete, then the event owner would be informed that they can go ahead and review (edit/delete) the event's photos/videos and can also manually share the event album with people that they want.

An event owner would be able to manually share the album directly with 'All Guests' or just the 'Event Attendees' using the 'Share Album Now' button 420 available on the 'Share Event Album' screen of the event's calendar invite. Note: 'Share Album Now' button would be enabled/visible on the screen only once the 'Manual Upload Duration' is complete for an event.

According to an embodiment of the present invention, as seen in FIG. 15A, an event owner would also be able to manually share 1514 the album individually with any people that they want and at any time, regardless if that person is an event invitee or not, by using the options available on the event album's properties/settings screen 1500a.

When 'Manual' is selected on the 'Share Album after Event' field 404, then the next field 'Share Album With' 408 would automatically/immediately get enabled (without requiring save on the calendar event). This 'Share Album With' field would allow the event owner to make their appropriate selection 416 for the invitees that must receive the event's album when it's shared manually using the 'Share Album Now' button available on the 'Share Event Album' screen. (Note: 'Share Album Now' button is enabled on the screen only when 'Manual' or 'Auto' is selected on the 'Share Album after Event' field, and it provides an easy option for the event owner to share the event album with either 'All guests' or just the 'Event attendees'.) Note: When 'Manual' is selected for the 'Share Album after Event' field, an event owner would still be able to go to the event's photo/video album and do the following using the options available on the album's properties/settings screen—

According to an embodiment of the present invention, as seen in FIG. 15A—15B, using the options available on an event album 1504, 1520, an event owner would be able to share the album with any individuals that have the same proprietary operating system on their devices as the event owner's device (Note: such individuals also don't need to be an event invitee to be shared the album with them). Here is what would occur in this situation—Such invitees would receive a request that the event owner would like to share [EventName] photo/video album with them. If the invitee accepts the request, then they would be able to view the event album, and depending upon the permissions granted by the event owner, they might even be able to add any additional photos/videos to that album.

Note: When the album is about to be shared with the invitees, at that time if there were any photographer invitees that already had the photo/video sharing request accepted, then those photographer invitees would not receive the event's album sharing request again. This is because the event photographers anyways would have access to the event's photo/video album, and therefore, do not need to be notified again. (In other words, when the album is about to be shared with the invitees, only those invitees that don't have the photo/video sharing request accepted at that time would receive the event's album sharing request.)

Note: Even if there were no photos/videos in the event's album, the album would still be shared with the recipients that have the same operating system. (This is allowed because even though there are currently no photos/videos on the album, an event owner might have planned to add photos/videos later or the recipients themselves might want to add some new photos/videos to that album.)

According to an embodiment of the present invention, as seen in FIG. 15A, using the options available on an event album, an event owner would also be able to send the album link via email 1514 (either in advance or after the event is complete) to anyone that doesn't have the same proprietary operating system on their devices as the event owner's device. Here is what will happen when the album link is shared with any individuals—

Selected individuals would receive an email that the event owner would like to share the [EventName] photo/video album link with them.

When the invitees click on the album link in the email, they would be able to view the event's photo/video album in the browser, but they wouldn't be able to add any additional photos/videos or comments on that album until they login using the proprietary operating system's account.) Note: even if there were no photos/videos in the event's album, it would not restrict the event owner to be able to send the album link via email and also won't restrict the recipient to pull up the blank album. This is allowed because the event owner might want to send the album link in advance and later upload the photos.

According to an embodiment of the present invention, as seen in FIG. 15A and FIG. 13B, when an event album's website link is shared via email 1514, all recipients' email addresses would be put in the bcc section of the email 1300b such that one recipient isn't able to view another recipient's email address.

Upon selection of 'Off' 406 on the 'Share Album after Event' field 404, the following would occur—Note: 'Off' 406 is the default value for this 'Share Album after Event' 404 field.

It would mean that the event owner doesn't intend to share the event's photo/video album with any of the guests after an event is complete. Therefore, once an event is complete, including its 'post event duration' and the 'Manual Upload Duration', then the event owner would just be informed that all event's photos/videos have been uploaded to the event's album. However, they would not be asked to either review those photos/videos or to share the event album with any of the guests.

According to an embodiment of the present invention, as seen in FIG. 4A, when 'Off' is selected for the 'Share Album after Event' field, then the next field 'Share Album With' 408 wouldn't be enabled i.e. would not allow the event owner to make any advance selection for the guests that must receive the photo/video album link. In addition, 'Share Album Now' button also wouldn't be enabled since 'Off' is selected for the 'Share Album after Event' field.

Note: Even though 'Off' might be selected for the 'Share Album after Event' field, an event owner can still go directly to the event's photo/video album 1400 at any time and either review (edit/delete) photos/videos or share the album with anyone using the options available on the album's properties/settings screen 1500a, 1500b. (In short, this feature would be available regardless if an event owner selects 'Auto', 'Manual' or 'Off' for the 'Share Album after Event' field.) Depending upon whether the album recipients, with whom the album was shared, have the same operating system on their devices as the event owner's device or not, the following would Occur—

According to an embodiment of the present invention, as seen in FIG. 15A-15B, using the options available on an event album 1504, 1520, an event owner would be able to share the album with any individuals that have the same proprietary operating system on their devices as the event owner's device (Note: such individuals also don't need to be an event invitee to be shared the album with them). Here is what would occur in this situation—

Such invitees would receive a request that the event owner would like to share [EventName] photo/video album with them. If the invitee accepts the request, then they would be able to view the event album, and depending upon the permissions granted by the event owner, they might even be able to add any additional photos/videos to that album.

Note: When the album is about to be shared with the invitees, at that time if there were any photographer invitees that already had the photo/video sharing request accepted, then those photographer invitees would not receive the event's album sharing request again. This is because the event photographers anyways would have access to the event's photo/video album, and therefore, do not need to be notified again. (In other words, when the album is about to be shared with the invitees, only those invitees that don't have the photo/video sharing request accepted at that time would receive the event's album sharing request.)

Note: Even if there were no photos/videos in the event's album, the album would still be shared with the recipients that have the same operating system. (This is allowed because even though there are currently no photos/videos on the album, an event owner might have planned to add photos/videos later or the recipients themselves might want to add some new photos/videos to that album.)

According to an embodiment of the present invention, as seen in FIG. 15A, using the options available on an event album, an event owner would also be able to send the album link via email 1514 (either in advance or after the event is complete) to anyone that doesn't have the same proprietary operating system on their devices as the event owner's device. Here is what will happen when the album link is shared with any individuals—

Selected individuals would receive an email that the event owner would like to share the [EventName] photo/video album link with them. When the invitees click on the album link in the email, they would be able to view the event's photo/video album in the browser, but they wouldn't be able to add any additional photos/videos or comments on that album until they login using the proprietary operating system's account.) Note: even if there were no photos/videos in the event's album, it would not restrict the event owner to be able to send the album link via email and also won't restrict the recipient to pull up the blank album. This is allowed because the event owner might want to send the album link in advance and later upload the photos.

According to an embodiment of the present invention, as seen in FIG. 15A and FIG. 13B, when an event album's website link is shared via email 1514, all recipients' email addresses would be put in the bcc section of the email such that one recipient isn't able to view another recipient's email address.

Regardless if the event owner has 'Auto', 'Manual' or 'Off' selected on the 'Share Album after Event' field 404, when the album is actually shared (using the automated album sharing, or using the 'Share Album Now' option available on the calendar event, or the sharing options available on the album settings screen), the following scenarios could potentially take place—

When sharing an event album, depending upon whether the recipients are already on the event album's participant list or not, the following would occur—If the new album recipient didn't exist previously on the event album's participant list, then the following would occur—Album recipients that don't currently exist on an event album's participant list, however use same operating system on their device as the event owner's device, those people would be added as regular album participant on the event album's participant list 1532, and would receive an album sharing message directly on their devices. Album recipients that don't currently exist on an event album's participant list and also don't have same operating system on their devices as the event owner's device, those people would be sent the album's browser website link via email 1300b in order to share that album with those album recipients.

If the new album recipient already existed on the event album's participant list, then the following would occur—

| New album recipient already exists on the event album as - | New album recipient's previous/last response for event album subscribe | Action to take when the same participant is requested to be added again as regular album participant |
|---|---|---|
| Photographer Album Participant | Yes | Don't add them again and let the event owner know that the participant already has access to event album |
| Photographer Album Participant | No | Add them again on the event album, however, this time as a regular album participant (So, there would be two entries for that individual on the album's participant list, one as a photographer album participant and another as a regular album participant) |
| Photographer Album Participant | No Response | Add them again on the event album, however, this time as a regular album participant (So, there would be two entries for that individual on the album's participant list, one as a photographer album participant and another as a regular album participant) |
| Regular Album Participant | Yes | Don't add them again and let the event owner know that the participant already has access to event album |
| Regular Album Participant | No | Change the album participant's last subscribe response to blank and inform the participant to respond again. |
| Regular Album Participant | No Response | Change the album participant's last subscribe response to blank and inform the participant to respond again. |

'Share Album With' 408—According to an embodiment of the present invention, as seen in FIG. 4A-4C, 'Share Album With' field would be initially disabled when the 'Share Album after Event' field 404 has 'Off' 406 selected on it. However, when an event owner selects either 'Auto' or 'Manual' on the 'Share Album after Event' field, then the 'Share Album With' field 408 would be automatically/immediately enabled (without requiring save on the calendar event). An event owner will be able to set the 'Share Album With' field to either of the following values—'Event attendees', 'All guests'. Note: 'All guests' 416 will be the default value for this field.

The following note/explanation will be added below the 'Share Album With' field on the 'Share Event Album' screen—

"All Guests—All event invitees regardless of their invitation response. Event Attendees—Those event invitees that responded with either 'Accept' or 'Maybe' on their invitation response." When 'Event attendees' is selected on the 'Share Album With' field—It would mean that the event owner wishes to only send the event's photos/videos album to those invitees that respond with either 'Accept' or 'Maybe' on their invitation response.

When 'All Guests' is selected on the 'Share Album With' field—It would mean that the event owner wishes to send the event's photos/videos album to all invitees regardless of their invitation response.

'Album's Public Website' 410—According to an embodiment of the present invention, as seen in FIG. 4A-4C, this read-only field would display if the associated album would be accessible via a browser webpage or not. Here are the possible values for this field—'Yes' or 'No'. (Note: Since the photo/video album is associated with a calendar invite, the default value for this "Album's Public Website' field would always be 'Yes' 412. Its reason is that the event invite could have a set of invitees using different devices/operating systems, and when the album is shared, some of those invitees might only be able to access the event album via the browser website.)

The following note would be added below the "Album's Public Website" field on the 'Share Event Album' screen—"Note: By default, an event album that's associated with a calendar invite is set as a 'public' website, so it can be shared with other people that use different operating systems on their devices. If you wish to change this default setting, please do so by going directly to the options available on the event album."

'Go to Event Album' button 418—According to an embodiment of the present invention, based on FIG. 4C and FIG. 2A, this button won't be visible/enabled on the 'Share Event Album' screen 400c until an event owner once selects 'Yes' 218 for 'Request photos/videos' field 204 on the 'Event Photos/Videos' screen 200a and saves that entire event. Thereafter, if an event owner ever goes back to the 'Share Event Album' screen 400c of the calendar invite, then they would see the 'Go to Event Album' button 418 at the bottom of that screen as long as the event album still exists.

Note: This 'Go To Event Album' button isn't visible/enabled initially since the event's album isn't even created until the calendar invite, along the photo/video sharing request, is once saved by an event owner. An event owner would be able to click on this 'Go to Event Album' button and go directly to the associated photo/video album 1400 for that event. By using the 'Go to Event Album' button, an event owner can go to the associated event album to not only view, add or delete any photos/videos but can also go to the album to change any of the album settings/properties. For example: An event owner can use the 'Go to Event Album' button to go to the event album, and thereafter, change the album setting from a 'Public Album' to a 'Non-public Album'.

Suppose that an event owner changes 'Request Photos/Videos' field 204 to 'No' 206 on the 'Event Photos/Videos' screen 200a, then 'Share Event Album' option/screen 104 itself would no longer be enabled i.e. 'Go to Event Album' button wouldn't even be accessible. However, if the event owner again changes 'Request Photos/Videos' field 204 to 'Yes' 218 on the 'Event Photos/Videos' screen 200a, then the 'Share Event Album' option/screen 104, 400c would be immediately enabled without even requiring save of the changes. And if the earlier album still existed, then the 'Go to Event Album' button 418 would still be present on that 'Share Event Album' screen 400c before even the event owner saves the entire calendar event.

'Share Album Now' 420—According to an embodiment of the present invention, based on FIG. 4C and FIG. 4A, this button would only be visible/enabled on the 'Share Event Album' screen 400c once the 'Manual Upload Duration' is complete for an event and as long as the value for 'Share Album after Event' field 404 has been selected as either 'Auto' or 'Manual'.

For further clarification, depending upon the selection made on the 'Share Album after Event' field (either 'Auto', 'Manual' or 'Off') on the 'Share Event Album' screen, the 'Share Album Now' button 420 would either be enabled or disabled—If 'Off' 406 is selected on the 'Share Album after Event' field 404, the following would occur—'Share Album Now' button 420 at the bottom of the 'Share Event Album' screen 400c wouldn't be enabled either before or after the event.

If either 'Auto' or 'Manual' is selected on the 'Share Album after Event' field 404, the following would occur—'Share Album Now' button 420 wouldn't be enabled on the 'Share Event Album' screen 400*c* before an event ends, including its 'Post-event Duration' and the 'Manual Upload Duration'. However, after the 'Manual Upload Duration' is complete for an event, the 'Share Album Now' button 420 would be automatically enabled/visible at the bottom of the 'Share Event Album' screen 400*c*.

If the 'Share Album Now' button 420 is clicked, then the following confirmation screen would be displayed to the event owner along with the 'Yes/No' buttons—"Are you sure you would like to share the event album with [LatestSelectionOnShareAlbumWithField]?" (Note: [LatestSelectionOnShareAlbumWithField] would be replaced with either 'All Guests' or 'Event Attendees' depending upon the latest selection on the 'Share Album With' field.) If the event owner selects 'Yes' on the confirmation screen, then the event's album would be shared with the guests 416 listed on the 'Share Album With' 408 field. If the event owner selects 'No' on the confirmation screen, then no action would be taken i.e. the event's album wouldn't be shared at this time.

Note: Suppose that an event owner decides to change their selection for 'Share Album With' field 408 after the completion of 'Manual Upload Duration' for the event, however without saving those changes, they immediately click on the 'Share Album Now' button 420. In this situation, the event's album would be shared with the guests 416 that were just selected by an event owner on the 'Share Album With' field 408. To avoid any confusion, when an event owner makes such a change on 'Share Album With' field and without saving that change, if they click on 'Share Album Now' button, then they would be prompted with the following popup message along with 'Yes/No' buttons—"Are you sure you would like to share the event album with [LatestSelectionOnShareAlbumWithField]?" (Note: [LatestSelectionOnShareAlbumWithField] would be replaced with either 'All Guests' or 'Event Attendees' depending upon the latest selection on the 'Share Album With' field.) If the event owner selects 'Yes' on the pop-up screen, then the event's album would be shared with the guests that were just selected on the 'Share Album With' field. If the event owner selects 'No' on the pop-up screen, then no other action would be taken i.e. the event's album wouldn't be shared at this time.

Back' button (An option to go back to the previous screen) When this 'Back' button is clicked, it would take the event owner back to the main screen of the calendar invite.

Event's Photo/Video Album and its Settings as Seen by an Event Owner

Once the calendar event is sent out (saved) by an event owner, which also includes the request for photo/video sharing, then the first thing that would occur is the auto-creation of the event's album. When an event owner goes to such an album and clicks on 'Album Settings' button 1404, then the album's settings screen as shown in FIG. 15A would open with the below listed options enabled/visible. (Please note that in order to explain the new functionality related to event's photo/video sharing, some of the currently existing options on a photo/video albums' settings screen are also described below.)—

'Album Participants' 1502—According to an embodiment of the present invention, as seen in FIG. 15A, this 'Album Participants' option on the album settings screen would display the total count 1504 of the regular album participants as well as the photographer album participants for an event album. If the event owner clicks on this 'Album Participants' option, as seen in FIG. 15B, a new screen 1500*b* with the same name 'Album Participants' would open, listing all the assigned regular as well as the photographer album participants. Here are all the fields/options that would be available on this screen 1500*b*—

Using the 'Add' button 1520 available next to the 'Regular Album Participants' field on the album settings screen, an event owner would also be able to add any new regular album participants to the event album.

Right below the 'Regular Album Participants' field, the following text 1522 would be displayed in order to remind that the photographer album participants can only be added via the options available on the calendar event invite—"Note: If you wish to add 'Photographer Album Participants', then please go to the associated calendar event and assign the photographer invitees there."

Figure 15C:
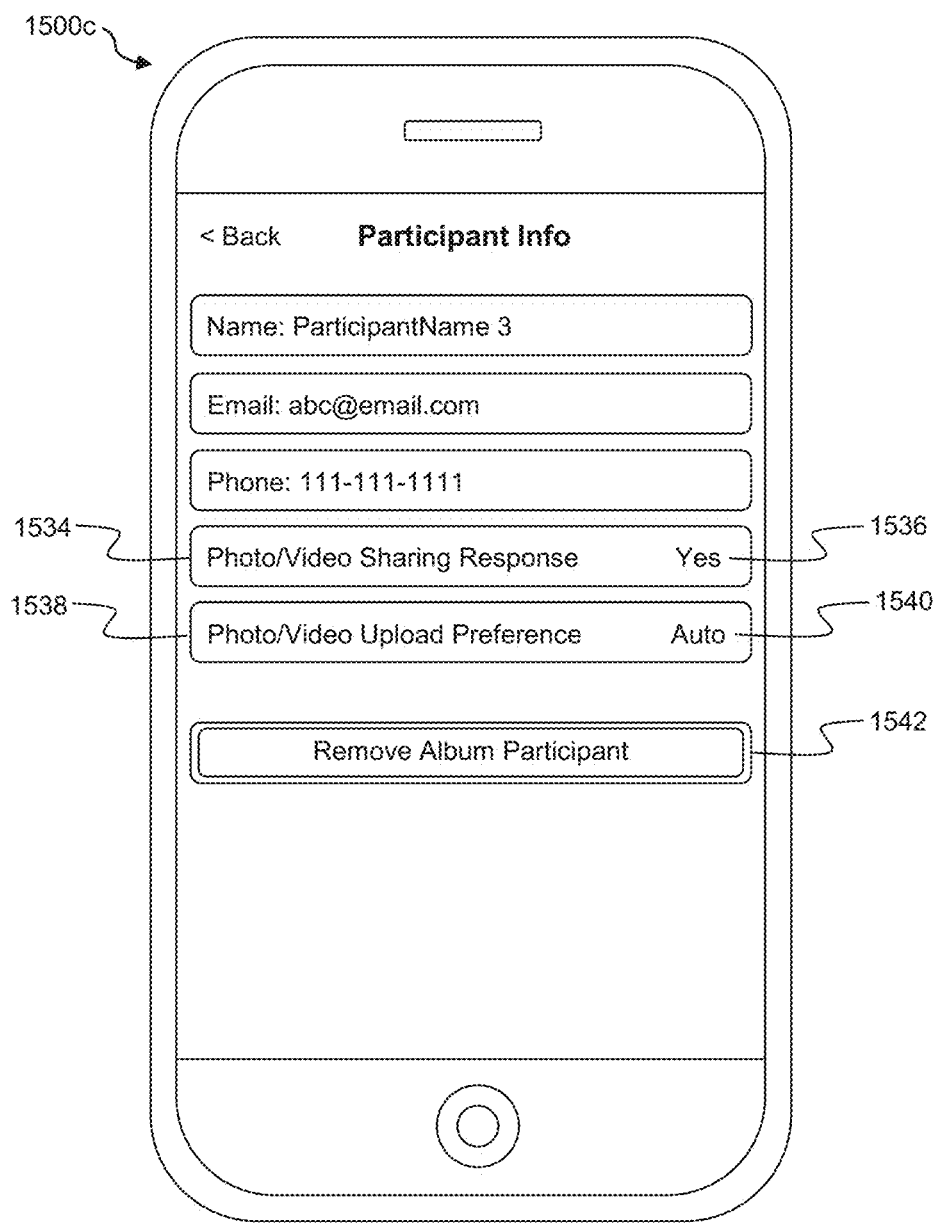
FIG. 15C illustrates an exemplary user interface of the 'Participant Info' screen of an event album, as seen by its event owner, displaying not only the contact details (Name, Email, Phone) of a photographer album participant but also their photo/video sharing response as well as their photo/video upload preference for the event. In addition, 'Remove Album Participant' button would also be enabled on this screen, which would allow an event owner to remove that photographer album participant from the participant list of an event's album.

All the assigned album participants 1532 including the regular as well as the photographer album participants 1524 would be displayed on this screen. (Note: the photographer album participant's name on the participant list (regardless of the photo/video sharing response) would be displayed in bold and would also have (P) next to their name in the suffix 1526. This would help to distinguish between regular album participants and the photographer album participants.) In addition, depending upon the photographer album participant's photo/video sharing response, an indicator 1528 would be displayed next to their names on the event album participant list, indicating if the photographer invitees have either accepted (green circle), declined (red circle) or haven't yet responded (blank circle) to the event's photo/video sharing request. If an event owner clicks on top of any of the album participant 1530, then as seen in FIG. 15C, a new screen 'Participant Info' 1500*c* would open, comprising of the following fields—

'Name' field—This field would display the name of the album participant. Note: If the album participant's name isn't available/known, then their email address or phone number would just be repeated on this 'Name' field. This would be a read-only field.

'Email' field—This field would display the album participant's email address. (if available). This would be a read-only field.

'Phone' field—This field would display the album participant's phone number. (if available). This would be a read-only field.

'Photo/Video Sharing Response' field 1534—This field would only be visible when looking at a photographer album participant's profile. In other words, for regular album participants, this field wouldn't display. This field would display the latest response ('Yes', 'No') 1536 of the photographer invitee i.e. the photographer album participant to indicate if they would share their photos/videos taken during the event or not. (Note: This field would only display the latest response even though a photographer invitee might have changed their response multiple times.) This would be a read-only field.

'Photo/Video Upload Preference' field 1538—This field would only be visible when looking at a photographer album participant's profile. In other words, for regular album participants, this field wouldn't display. Even when the profile is of a photographer album participant, this field would only be visible only if the above field 'Photo/Video Sharing Response' 1534 is set to 'Yes'.

If the 'Photo/Video Upload Preference' field 1538 is visible, it would display the photographer album participant's latest selection ('Auto', 'Double-check', 'Manual') 1540 for photos/videos upload preference. (Note: This field would only display the latest photo/video upload preference even though a photographer invitee might have changed their photos/videos upload preference multiple times.) If visible, this would be a read-only field.

'Remove Album Participant' button 1542—this button would assist to remove an album participant. If an individual to be deleted is a photographer album participant, who was previously assigned via a calendar event, then the following would occur when the 'Remove Album Participant' button 1542 is clicked by the event owner—

Deleted photographer album participant would no longer remain on the photographer list of the event's calendar invite i.e. the deleted photographer album participant would be removed from the 'Assign Photographers' screen 300b, which is visible to the event owner. In addition, the deleted photographer album participant would also be removed from the 'Assigned Photographers' screen 800a, which is visible to the other active photographer invitees of an event.

Deleted photographer album participant would no longer receive any notifications or reminders related to being a photographer i.e. event's photo/video sharing.

Deleted photographer album participant would also no longer remain on the participant list 1532 of the event album i.e. both the event owner and the other active photographer album participants would no longer see the deleted photographer album participant on the event album's participant list. In other words, photographer invitee would lose their access to view, add, edit or delete any photo/videos on the event's album.

Deleted photographer album participant would no longer see the 'Share Event Photos/Videos' option 602 on their event's calendar invite 600a. A notification would be sent to the deleted photographer album participant that the event owner has removed their photographer as well as the album participant permissions i.e. they would neither have photo/video sharing abilities for the event nor access to the event's album. Note: A deleted photographer album participant would still continue to remain on the event's invitee list.

If an individual to be deleted is a non-photographer (regular album participant), who was previously assigned via the options available on the event album, then the following would occur when the 'Remove Album Participant' button 1542 is clicked by the event owner—

Deleted regular album participant would no longer remain on the participant list 1532 of the event album. In other words, the regular album participant would lose their access to view, add, edit or delete any photo/videos on the event's album.

A notification would be sent to the deleted regular album participant that the event owner has removed their album participant permissions from the event album.

'Back' button (An option to go back to the previous screen)—When this 'Back' button is clicked, it would take the event owner back to the 'Album Participants' screen.

'Photos/Videos Posting Allowed' 1506—As seen in FIG. 15A, the default value for this field would be 'Yes' 1508 i.e. any of the album participants including the event owner would be able to add/post or delete photos/videos on the event album as long as this field is set to 'Yes'.

'Album's Public Website' 1510—In this case, since the photo/video album is associated with a calendar invite, the default value for this "Album's Public Website' field 1510 would be 'Yes' 1512 i.e. the associated event album would be accessible via a browser webpage.

The following note would be added below the "Album's Public Website" field on the album settings screen—"If an album's public website is turned on, then the album can be accessed via a browser and can be shared with other people using different operating systems on their devices."

'Send Album Website Link via Email' button 1514—When this button is clicked, it would allow to send the event album's website link via an email to anyone. This button would remain enabled on the album's settings screen 1500a as long as the "Album's Public Website" field 1510 is set to 'Yes' 1512. In other words, this 'Send Album Website Link via Email' button 1514 on the album's settings screen 1500a would no longer be enabled if the "Album's Public Website" field is changed from 'Yes' to 'No'.

'Go to Associated Calendar Event' button 1516—When this button is clicked, it would take the event owner from the event album's settings screen 1500a to the associated calendar event 100b. (Note: This button would be automatically disabled (not visible) if the associated calendar event no longer exists.)

'Delete Album' button 1518—When this button is clicked by an event owner, it would not only delete the event album but also since this album was associated with a calendar event, any of the photo/video sharing related options on the calendar invite would be automatically reset to no photo/video sharing. (More details provided in a later section describing the associated impact.)

Photo/Video Sharing Related Options on the Main Screen of the Photographer Invitee's Event Invite Once the calendar event is sent out (saved) by the event owner and its associated event album is created, thereafter, all the event invitees would receive a regular invitation about the event. However, the photographer invitees, excluding the event owner, would receive an additional notification to take and upload photos/videos for the event, and in addition, they would also see the following options/additions on their calendar invitation request 600a (Note: Even if it is a recurring event, the photographer invitees would still see the same options)—

Figure 6A:
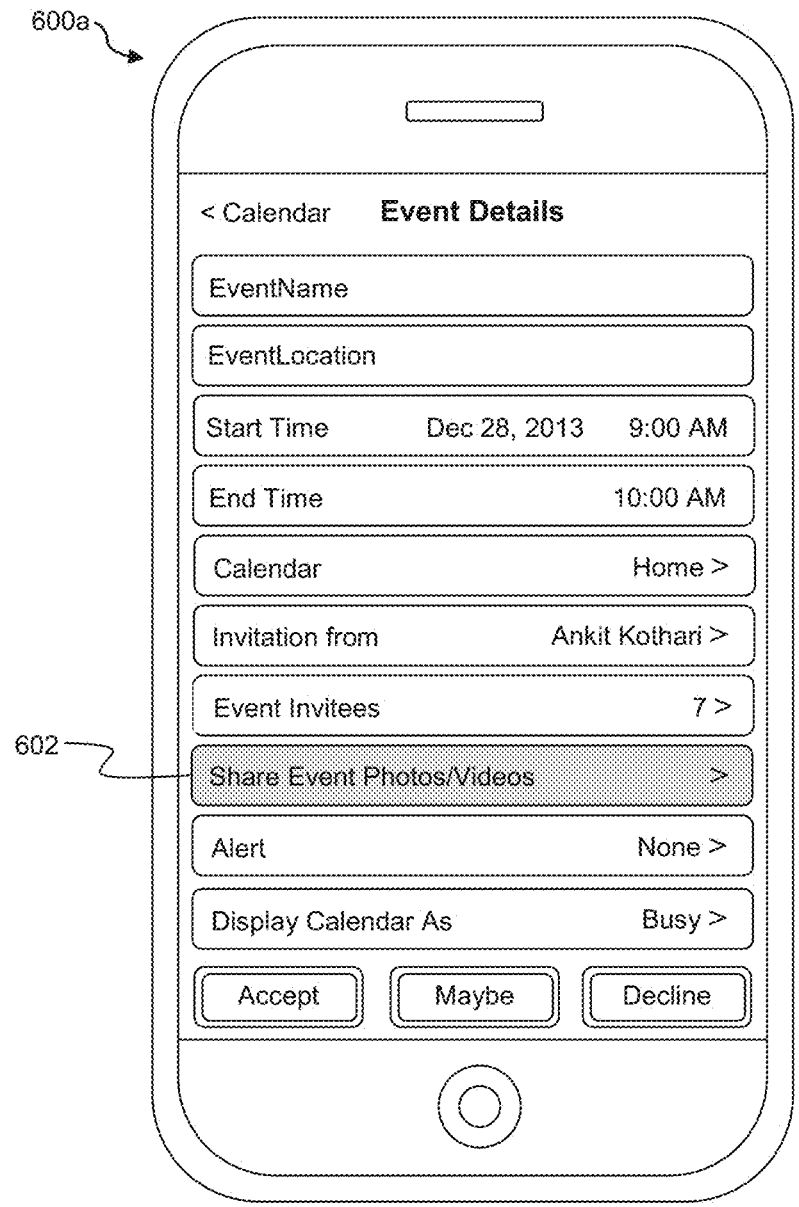
FIG. 6A illustrates an exemplary user interface of the main screen of a calendar event invite, as seen by a photographer invitee, displaying the following additional photo/video sharing related options/sub-options—'Share Event Photos/Videos'.
Figure 7A:
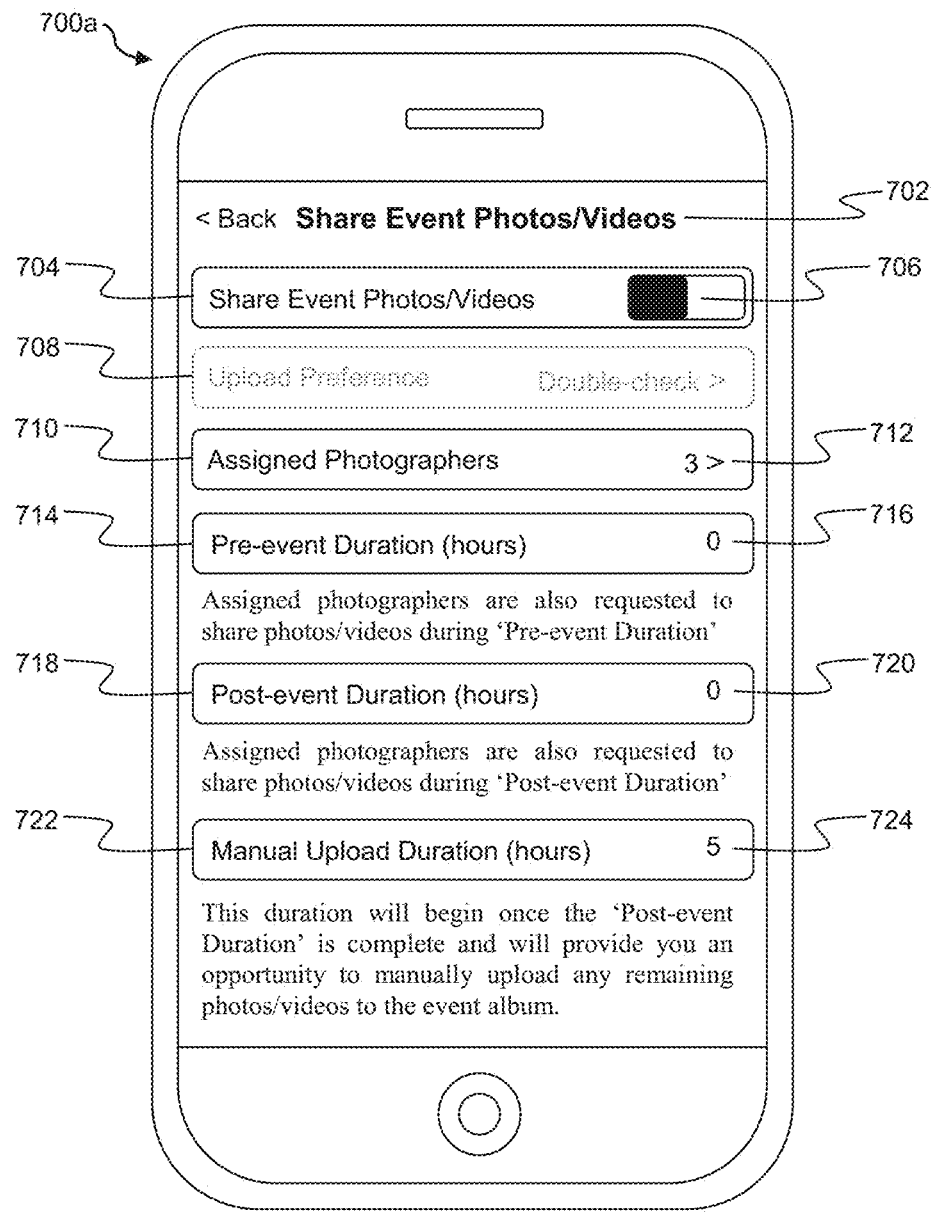
FIG. 7A illustrates an exemplary user interface of the 'Share Event Photos/Videos' screen of a calendar event invite, as seen by a photographer invitee. Using this screen, a photographer invitee would be able to indicate if they wish to accept or decline the event's photo/video sharing request.

According to an embodiment of the present invention, as seen in FIG. 6A, a new option called 'Share Event Photos/Videos' 602 would be available on the invitation details screen 600a for the photographer invitees, highlighted in a different color to remind invitees to either accept or decline the photo/video sharing request. If an invitee selects this 'Share Event Photos/Videos' field, as seen in FIG. 7A, a new screen with the same title 'Share Event photos/Videos' 702 will open up. (Reminder: this 'Share Event photos/Videos' option/screen will only be available/visible to those photographer invitees that have been requested by the event owner to share photos/videos for the event.)

Figure 6B:
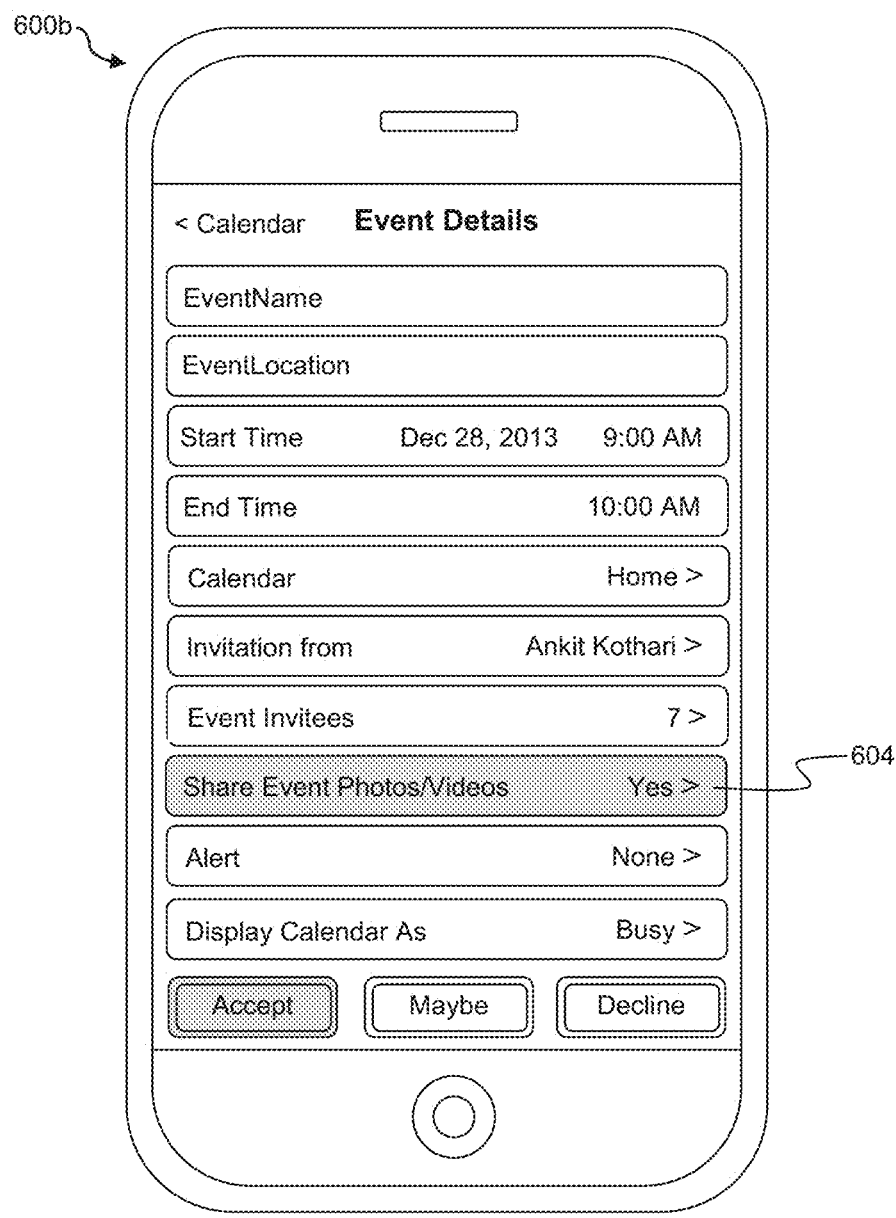
FIG. 6B illustrates an exemplary user interface of the main screen of a calendar event invite, as seen by a photographer invitee, displaying a 'Yes' value next to the 'Share Event Photos/Videos' option indicating that the photographer invitee has accepted the photo/video sharing request for the event.

Note: According to an embodiment of the present invention, as seen in FIG. 6A, the 'Share Event Photos/Videos' option 602 will initially have no default value listed on the main screen of the calendar invite 600a. In other words, if the photographer invitee hasn't yet made a selection on the 'Share Event Photos/Videos' field, then no value would be displayed to the right of the 'Share Event Photos/Videos' option on the main screen of the calendar event. However, as seen in FIG. 6B, if the photographer invitee selects a value on the 'Share Event Photos/Videos' field i.e. either 'Yes' or 'No', then that selected value 604 would be displayed to the right of the 'Share Event Photos/Videos' option on the main screen of the calendar event.

Note: For clarification, any photographer invitees, excluding the event owner, would see the following option related to event's photo/video sharing on their main screen of the calendar invite—'Share Event Photos/Videos' 602. On the other hand, an event owner of the event would see the following option(s) related to event's photo/video collection and sharing on their main screen of the calendar invite—'Request Photos/Videos' 102, 'Share Event Album' 104.

Note: An event owner would not receive the event invitation like the other photographer invitees for accepting or declining the photo/video sharing request i.e. they would be automatically confirmed as one of the event photographers to take photos/videos for the event. In addition, depending on the event owner's previous selection for the "Owner's Upload Preference" field 216, they would also be able to upload their photos/videos to the event's photo/video album.

Figure 7B:
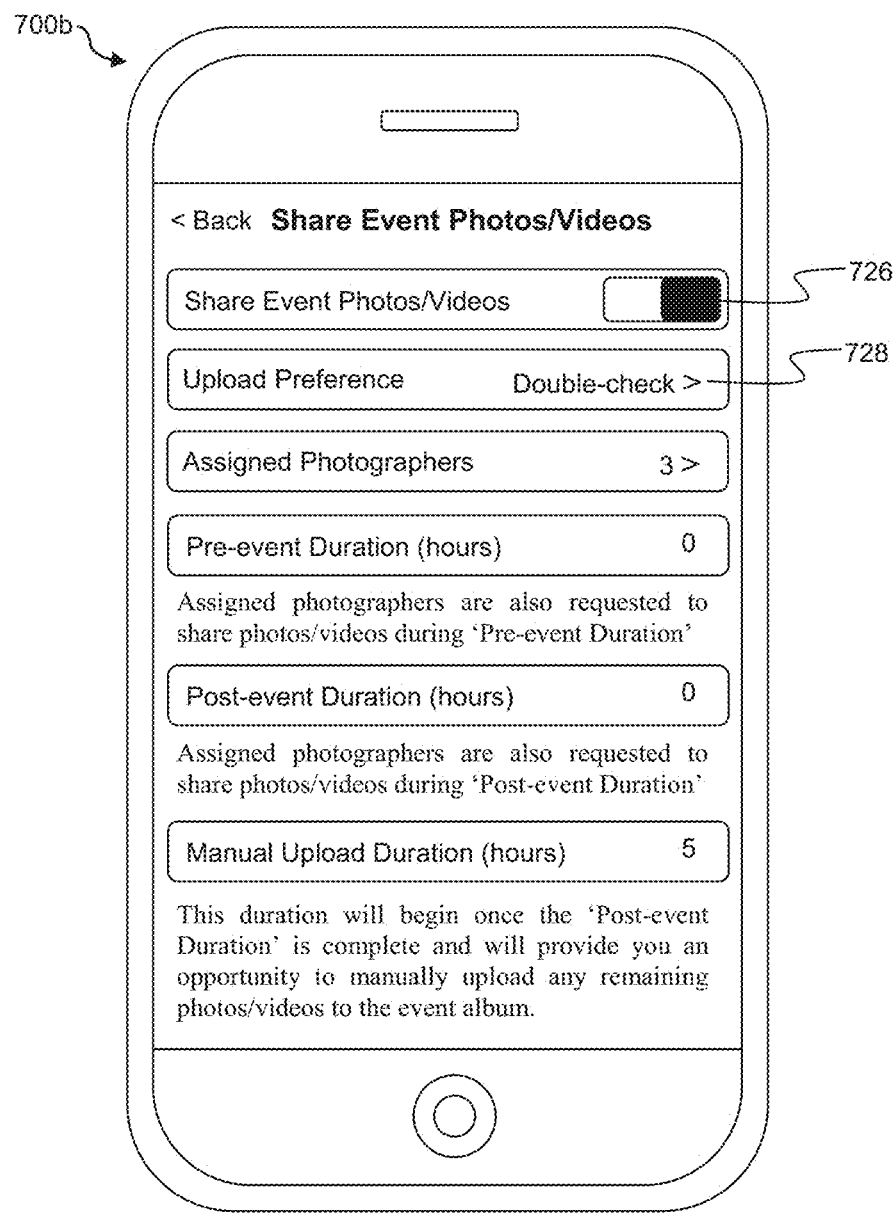
FIG. 7B illustrates an exemplary user interface of the 'Share Event Photos/Videos' screen of a calendar event invite, as seen by a photographer invitee, displaying how the 'Upload Preference' field is instantly enabled when the 'Share Event Photos/Videos' field is changed to 'Yes' by a photographer invitee.
Figure 7C:
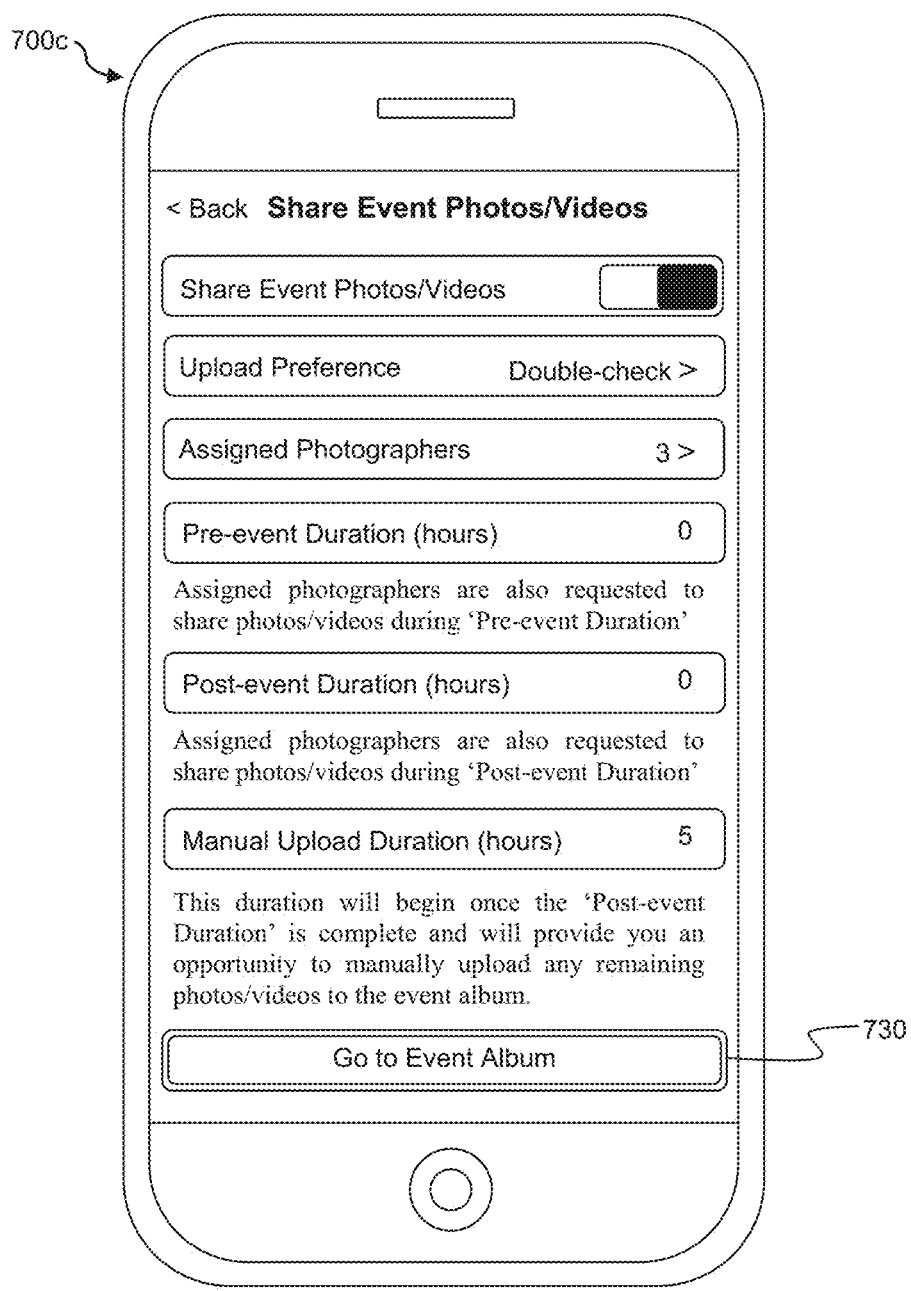
FIG. 7C illustrates an exemplary user interface of the 'Share Event Photos/Videos' screen of a calendar event invite, as seen by a photographer invitee, displaying the 'Go to Event Album' button at the bottom of the screen.

'Share Event Photos/Videos' Option and its Sub-Options on the Photographer Invitee's Event Invite According to an embodiment of the present invention, as seen in FIG. 7A-7C, photographer invitees would see the following photo/video sharing related options on the 'Share Event Photos/Videos' screen of their calendar invite (Note: Even if it's a recurring event, the photographer invitees would still see the same options and their response would apply to all the recurring events)—

'Share Event Photos/Videos' 704—Photographer invitees will be able to select either 'Yes' 726 or 'No' 706 for this field i.e. agree or disagree for taking and sharing of the event's photos/videos.

If the invitee selects 'Yes' 726, then it means that the invitee agrees to take and share photos/videos for that event, and the following would occur—As seen in FIG. 7B, 'Upload Preference' field on the 'Share Event Photos/Videos' screen would be enabled for selection.

According to an embodiment of the present invention, as seen in FIG. 15B and FIG. 16B, an indicator 1528 on the event album's participant list would display a green circle next to the photographer invitee's name to indicate that the photographer invitee has accepted the photo/video sharing request. Note: the photographer invitee's name on the album participant list (regardless of their photo/video sharing response) would be displayed in bold and would also have (P) next to their name in the suffix 1526. This would help to distinguish between regular album participants and the assigned photographer participants.

According to an embodiment of the present invention, as seen in FIG. 3B and FIG. 8A, similar to the event album participant list, a green circle indicator would also be displayed next to the photographer invitee's name on the calendar event's photographer lists i.e. on both the 'Assign Photographers' screen 300b, which is visible to the event owner, as well as the 'Assigned Photographers' screen 800a, which is visible to all the photographer invitees of the event.

According to an embodiment of the present invention, as seen in FIG. 7C, once a photographer invitee saves their changes and later goes back to the calendar invite, then they would also see the 'Go to Event Album' button 730 at the bottom of the 'Share Event Photos/Videos' screen 700c.

If the invitee selects 'No' 706, then it means that the invitee has declined to take and share photos/videos for that event. In this case, the following would occur—As seen in FIG. 7A, 'Upload Preference' field on the 'Share Event Photos/Videos' screen would remain grayed out i.e. wouldn't be enabled for selection.

According to an embodiment of the present invention, as seen in FIG. 15B and FIG. 16B, an indicator 1528 on the event album's participant list would display a red circle next to the photographer invitee's name to indicate that the photographer invitee has declined the photo/video sharing request. Note: even though the photographer invitee declined the photo/video sharing request, their name would still be listed on the album participant list (regardless of their photo/video sharing response) in bold and would also have (P) next to their name in the suffix 1526. This would help to distinguish between regular album participants and the assigned photographer participants.

According to an embodiment of the present invention, as seen in FIG. 3B and FIG. 8A, similar to the event album participant list, a red circle indicator would also be displayed next to the photographer invitee's name on the calendar event's photographer lists i.e. on both the 'Assign Photographers' screen 300b, which is visible to the event owner, as well as the 'Assigned Photographers' screen 800a, which is visible to all the photographer invitees of the event. 'Go to Event Album' button wouldn't be available at the bottom of the 'Share Event Photos/Videos screen.

'Upload Preference' 708—This field would be immediately enabled for selection when the photographer invitee selects 'Yes' 726 for 'Share Event Photos/Videos' field 704, which is also available on the 'Share Event Photos/Videos' screen. A photographer invitee will be able to edit this field and select either 'Auto', 'Double-check' or 'Manual' 728. The default value will be 'Double-check' for this field. (Note: Functionality of these 'Auto', 'Double-check' or 'Manual' options would be same as the functionality mentioned earlier for the 'Owner's Upload Preference' options on the event owner's 'Event photos/videos' screen on the event invite.

'Assigned Photographers' 710—According to an embodiment of the present invention, as seen in FIG. 7A, 'Assigned Photographers' option on the 'Share Event Photos/Videos' screen 700a would display the total count of the photographers assigned 712 by the event owner for that event. Thereafter, if the photographer invitees clicks on this 'Assigned Photographers' option, then a new screen 800a with the same title 'Assigned Photographers' 802 would open, listing all the assigned photographers 804 for the event individually. (Note: Unlike an event owner, a regular photographer invitee would just be able to see an existing list and wouldn't be able to add any new photographers using this 'Assigned Photographers' screen.)

According to an embodiment of the present invention, as seen in FIG. 8A, a photo/video sharing response indicator 806 would be displayed next to each photographer invitee's name on the calendar event's photographer list 804 on the 'Assigned Photographers' screen 800a, which is visible to all the photographer invitees of the event. This response indicator would show if the photographer invitees have accepted (green circle), declined (red circle) or haven't yet responded (blank circle) to the event's photo/video sharing request.

Figure 8B:
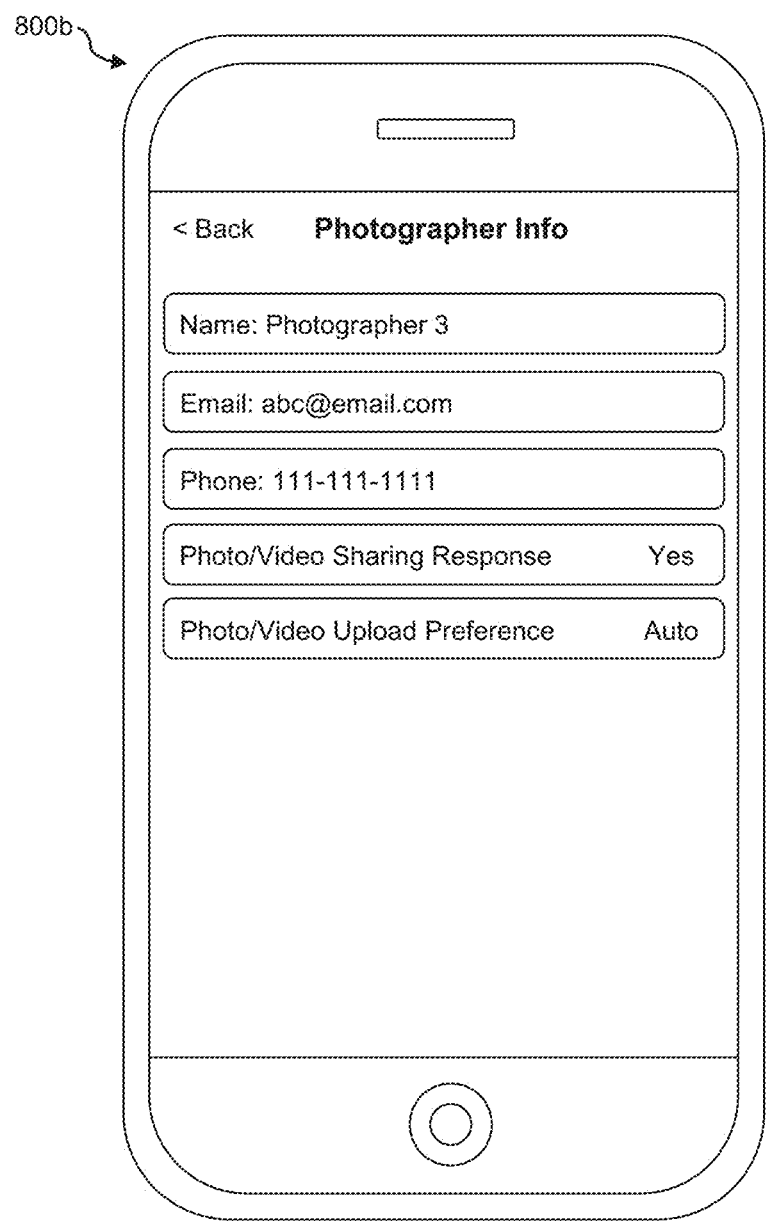
FIG. 8B illustrates an exemplary user interface of the 'Photographer Info' screen of a calendar event invite, as seen by a photographer invitee, displaying not only the contact details (Name, Email, Phone) of the selected photographer invitee but also their photo/video sharing response as well as their photo/video upload preference for the event.

According to an embodiment of the present invention, as seen in FIG. 8A-8B, if the photographer invitee clicks on any of the photographer invitee's name 808 that are listed on the 'Assigned Photographers' screen 800a, then a new screen 'Photographer Info' 800b would open, comprising of the following fields (Note: Unlike an event owner, a regular photographer invitee wouldn't see the 'Remove Photographer' button on their 'Photographer Info' screen)—

'Name' field—This field would display the name of the photographer invitee, who was invited to act as one of the photographers for the event. Note: If the photographer invitee's name isn't available/known, then their email address or phone number would just be repeated on this 'Name' field. This would be a read-only field.

'Email' field—This field would display the photographer invitee's email address. (if available). This would be a read-only field.

'Phone' field—This field would display the photographer invitee's phone number. (if available). This would be a read-only field.

'Photo/Video Sharing Response' field—This field would display the latest response of the photographer invitee if they would share their photos/videos taken during the event or not. (Note: This field would only display the latest response even though a photographer invitee might have changed their response multiple times.) This would be a read-only field.

'Photo/Video Upload Preference' field. This field would only be visible if the above field 'Photo/Video Sharing Response' is 'Yes'. If the 'Photo/Video Upload Preference' field is visible, it would display the photographer invitee's latest selection for photos/videos upload preference. (Note: This field would only display the latest photo/video upload preference even though a photographer invitee might have changed their photos/videos upload preference multiple times.) If visible, this would be a read-only field.

'Back' button (An option to go back to the previous screen). When this 'Back' button is clicked, it would take the photographer invitee back to the 'Assigned Photographers' screen.

'Pre-event Duration (hours)' 714—According to an embodiment of the present invention, as seen in FIG. 7A, photographer invitees would be able to view the value 716 for this 'Pre-event Duration (hours)' field 714 on their 'Share Event Photos/Videos' screen, however, they wouldn't be able to edit this field i.e. field would be grayed out (read-only) on their screens.

The following note/explanation will be added below the 'Pre-event Duration' field on the 'Share Event Photos/Videos' screen—"Assigned photographers are also requested to share photos/videos during 'Pre-event Duration'"

'Pre-event Duration' is the amount of time (in hours) before the start of the actual event. This field can only be set/updated by an event owner and allows requesting the photographer invitees to also share their photos/videos of the pre-event activities.

'Post Event Duration (hours)' 718—According to an embodiment of the present invention, as seen in FIG. 7A, photographer invitees would be able to view the value 720 for this 'Post-event Duration (hours)' field 718 on their 'Share Event Photos/Videos' screen, however, they wouldn't be able to edit this field i.e. field would be grayed out (read-only) on their screens.

The following note/explanation will be added below the 'Post-event Duration' field on the 'Share Event Photos/Videos' screen—"Assigned photographers are also requested to share photos/videos during 'Post-event Duration'"

'Post-event Duration' is the amount of time (in hours) after an actual event has completed. This field can only be set/updated by an event owner and allows requesting the photographer invitees to also share their photos/videos of the post-event activities.

'Manual Upload Duration (hours)' 722—According to an embodiment of the present invention, as seen in FIG. 7A, photographer invitees would be able to view the value 724 for this 'Manual Upload Duration (hours)' field 722 on their 'Share Event Photos/Videos' screen, however, they wouldn't be able to edit this field i.e. field would be grayed out (read-only) on their screens.

The following note/explanation will be added below the 'Manual Upload Duration' field on the 'Share Event Photos/Videos' screen—"This duration will begin once the 'Post-event Duration' is complete and will provide you an opportunity to manually upload any remaining photos/videos to the event album."

'Manual Upload Duration' is the amount of time (in hours) after the 'Post-event Duration' is complete for an event. This duration provides an opportunity for the photographer invitees to manually upload any of their remaining photos/videos to the event album. Note: This 'Manual Upload Duration' field can only be set/updated by an event owner.

'Go to Event Album' button 730—According to an embodiment of the present invention, as seen in FIG. 7A-7B, this 'Go to Event Album' button won't be visible/enabled initially on the 'Share Event Photos/Videos' screen. However, as seen in FIG. 7C, it's only when a photographer invitee selects 'Yes' for 'Share Event Photos/Videos' field and saves the event, and thereafter, if that photographer invitee goes back to the 'Share Event Photos/Videos' screen of the calendar invite, then they would see the 'Go to Event Album' button 730 at the bottom of that screen.

A photographer invitee would be able to click on this 'Go to Event Album' button 730 and go directly to the associated photo/video album 1400 for that event.

Note: Suppose that the photographer invitee selects 'Yes' for 'Share Event Photos/Videos' field and saves the event, which adds the 'Go to Event Album' button at the bottom of the 'Share Event Photos/Videos' screen. Later if the photographer invitee again changes their selection for 'Share Event Photos/Videos' field to 'No' and saves the event, then the 'Go to Event Album' button would then no longer be visible/enabled on the 'Share Event Photos/Videos' screen.

'Back' button (An option to go back to the previous screen). When this 'Back' button is clicked, it would take the invitee back to the main screen of the calendar invite.

Display of the Reminder Message to the Photographers about the Start of the Event and an Opportunity to Change any of the Previous Selections for Event's Photo/Video Sharing Photographer invitees, who select 'Yes' on the 'Share Event Photos/Videos' screen and also select 'Accept' or 'Maybe' on the overall event invitation, will receive the below reminder message at the beginning of the 'Pre-event Duration' of an event. (Note: Pre-Event start time is the event's start time minus the 'Pre-event Duration', which are both specified by the event owner while setting up the event. For example: If the event was going to start at 4:00 pm, and 'Pre-event Duration' was specified by the event owner as 1 hour, then the Pre-Event start time would be 3:00 pm.) Therefore, regardless if it's one of the recurring events or a regular event, an automated reminder message would be displayed to the photographer invitee at the start of the pre-event duration. (Note: An event owner would also be displayed with a similar message/options since they are also one of the event's mandatory photographers)—

Figure 9:
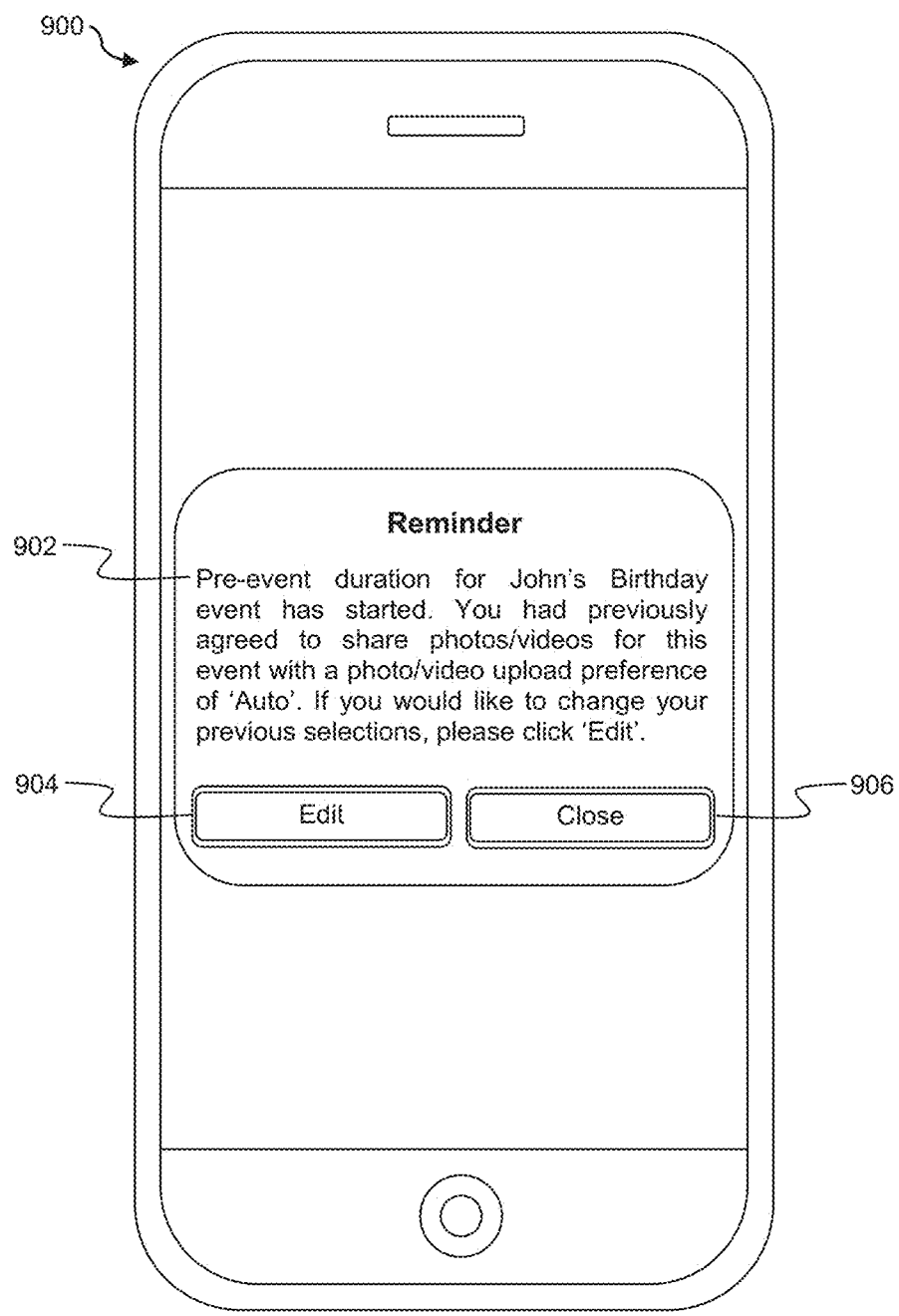
FIG. 9 illustrates an exemplary reminder message that would be displayed to all photographer invitees as well as an event owner at the start of the pre-event duration of an event, and also an ability to edit the original selections.

According to an embodiment of the present invention, as seen in FIG. 9, as long as the 'Pre-event Duration' field was set to a value greater than 0 hours on the event's calendar invite, then the following reminder message 902 would be sent to the photographer invitee at the beginning of the pre-event duration—"Pre-event duration for [EventName] has started. You had previously agreed to share photos/videos for this event with a photo/video upload preference of [UploadPreference]. If you would like to change your previous selections, please click 'Edit'." (Note: [EventName] would be replaced with the actual name of the event and [UploadPreference] would be replaced with the photographer invitee's previously selected photo/video upload preference of 'Auto', 'Double-check', or 'Manual'.)

If the 'Pre-event Duration' field was set to 0 hours on the event's calendar invite, then rather than the above reminder, the following reminder message would be sent to the photographer invitee at the beginning of the event—"Event—[EventName] has started. You had previously agreed to share photos/videos for this event with a photo/video upload preference of [UploadPreference]. If you would like to change your previous selections, please click 'Edit'." (Note: [EventName] would be replaced with the actual name of the event and [UploadPreference] would be replaced with the photographer invitee's previously selected photo/video upload preference of 'Auto', 'Double-check', or 'Manual'.)

As mentioned above, photographer invitees would be given an option on the reminder screen to either acknowledge the message using the 'Close' button 906 or edit their photo/video sharing preference for the event using an 'Edit' button 904.

If a photographer invitee selects the 'Close' button 906, they would simply acknowledge the automated message, and based on their previously selected photo/video upload preference, they would begin to start sharing their photos/videos accordingly.

If a photographer invitee selects the 'Edit' button 904, they would be taken to the 'Share Event Photos/Videos' screen 700c and would be allowed to do either of the following—Be able to change the photo/video sharing preference from 'Yes' to 'No'; Be able to change the photos/videos upload preference from their previous selection to a new selection (Here is the list of possible values that can be selected—'Auto', 'Double-check', 'Manual').

Note: If an event owner, who is also one of the photographer invitees for the event, clicks 'Edit' button 904 on their reminder message, then they would be taken to the 'Event Photos/Videos' screen 200c, and not the 'Share Event Photos/Videos' screen (other photographer invitees would be taken here). Also note that an event owner would not be able to remove themselves from the photographer list of an event.

Note: Even if a photographer invitee doesn't select neither 'Close' button 906 nor 'Edit' button 904 on the photo/video sharing reminder screen 900a, their photo/video sharing features (based on their previous selection of photo/video upload preference) would still be turned on as soon as they receive the reminder about the start of the pre-event or the event itself.
Upload of Event's Photos/Videos to an Event Album, and in Addition, Details about the Reminder Messages Displayed at the Completion of an Event Once the photo/video sharing reminder is received by the invitee or an event owner (who is also one of the photographers for the event), the following will occur (Note: for recurring events, all the below listed steps would remain the same for each event)—

According to an embodiment of the present invention, as seen in FIG. 10A, on the 'Camera' application 1000a of the invitee's device, a thin border frame as a visual indicator 1002 that the device is in sharing mode, and also the event's name 1004 and the invitee's photo/video upload preference ('Auto', 'Double-check' or 'Manual') 1006 would be constantly displayed for the duration of the event, including the 'Pre-event Duration' and the 'Post-event Duration'. This would act as a reminder for the photographer invitee that the event is currently going on and that they had previously agreed to share photos/videos for this event. A visual indicator may also be an icon displayed anywhere on the screen, a visual filter over all or part of the screen, a visible bar placed horizontally or vertically on the screen, a watermark, or some other visual indicator.

Here is an example of how the event's name 1004 and the invitee's photo/video upload preference 1006 would be displayed on the 'Camera' application—"John's Birthday (Upload→Auto)." Note: If the event's name is much longer than the allowed space, then just a part of the event's name would be displayed on the 'Camera' application along with ' . . . ' in the suffix.

Note: Once the event, including the post event duration, is complete, then the visual indicator 1002 along with the event's name 1004 and the invitee's photo/video upload preference 1006 would be automatically removed from the 'Camera' application 1000a of the photographer invitee's device.

When an invitee takes any photos/videos using their device's camera application, then based on the upload preferences selected by the invitee ('Auto', 'Double-check' or 'Manual'), the following will occur—

Photo/Video upload preference—'Auto' 1006—All photos/videos taken by the invitee during the event, including the 'Pre-event Duration' and 'Post-event Duration', will be instantly uploaded to the event's centralized photo/video album.

Photo/Video upload preference—'Double-check' 1008—As seen in FIG. 10B, for each photo/video taken by the invitee during the event, including the 'Pre-event Duration' and 'Post-event Duration', they will be prompted with a question 1010 to either upload or not to upload those photos/videos to the event's centralized photo/video album. (Note: Invitees will be prompted with the question after each photo/video is taken.)

If the invitee selects 'yes' 1012 to upload the photo/video, then it would be instantly uploaded to the event's photo/video album. If the invitee selects 'no' 1014 for uploading a photo/video, then no additional action would be taken for that photo/video rather than just storing it on the device's photo library i.e. that photo/video would not be uploaded to event's centralized photo/video album.

Figure 10C:
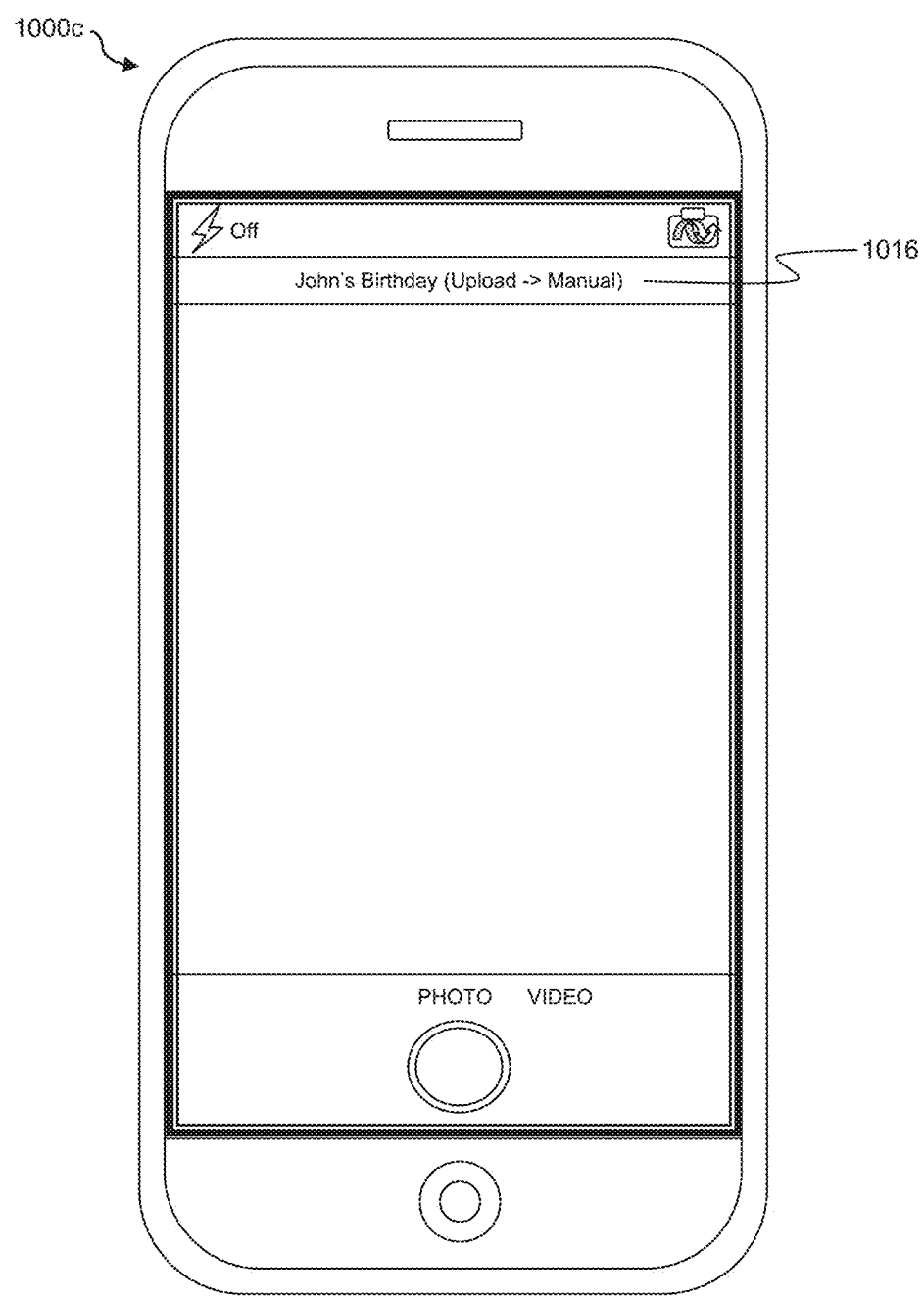
FIG. 10C illustrates an exemplary 'Camera' application of a mobile device, displaying a thin colored border frame as a visual indicator, and in addition, an event's name as well as the photographer invitee's latest photo/video upload preference (in this case, 'Manual') is also displayed on this screen.

Photo/Video upload preference—'Manual' 1016—As seen in FIG. 10C, when invitee's photo/video upload preference is 'Manual' 1016, it means that the invitee doesn't wish to automatically/instantly upload their photos/videos that are taken during the event, including the 'Pre-event Duration' and 'Post-event Duration', to the event's photo/video album. Rather, the invitee agrees to manually select and upload photos/videos to the event's centralized photo/video album 1400 sometime before the 'Manual Upload Duration' is complete for the event.

When 'Manual' option is selected for 'Photo/Video Upload preference', it provides the following—Gives invitee an opportunity to even upload those photos/videos that were initially saved to their device's photo library by possibly a third-party application existing on their device.

An invitee would also get an option to upload any photos/videos that were taken by a different operating-system device or even a traditional camera by using one of the following methods—

Method 1: An invitee can first copy other devices' photos/videos on their operating system supported device, and then manually upload them to the event's shared photo/video album. (note: copying the photos/videos from an unsupported device to a supported device would be done by the invitees using their own tools.)

Method 2: An invitee can install an app or client software on their unsupported (different operating system) devices, which would allow them to upload any photos/videos existing on their unsupported devices to the shared photo/video album of the supported operating system device. (Note: only the photographer invitee that has an account with the proprietary operating system device would be able to authenticate and connect with the shared photo/video album, and upload their photos/videos using the app/client software.)

Note: An invitee must try to upload their manual photos/videos within the 'Manual Upload Duration' set by the event owner. By doing so, invitee's photos/videos will already be there on the event's photo/video album when that album's notification/link is sent to the event guests. In case if the invitee isn't able to upload their photos/videos within the 'Manual Upload Duration', then they will still be allowed to upload those at a later time. However, since the 'Manual Upload Duration' is complete, an event owner might decide to go ahead and send the album notification/link to the event guests and anyone who views the album at that time might not see the photos/videos that weren't uploaded yet.

Suppose that a photographer invitee wants to fix/edit the photos/videos that they took during an event, then in this situation, depending upon the photographer invitee's earlier selection on the 'Upload Preference' field 708, the following options would be available—

If the photographer invitee had previously selected 'Auto' on the 'Upload Preference' field 708, then they would have the following options—Since the photos/videos are automatically uploaded under the 'Auto' selection, photographer invitee wouldn't get an opportunity to fix/edit the photos/videos before they are uploaded on the event album. However, once the photos/videos are uploaded on the event album, a photographer invitee would be able to go directly to the event album and make any fixes/edits and save the changes.

If the photographer invitee had previously selected 'Double-check' on the 'Upload Preference' field 708, then they would have the following options—Similar to the 'Auto' selection, a 'Double-check' selection also wouldn't allow a photographer invitee to make any fixes/edits to the photos/videos before those are uploaded to the event's album (Note: the only exception is that if the photographer invitee chooses not to upload a particular photo/video immediately, then they would be able to make fixes/edits on such photo/video, and thereafter, manually upload it to the event album.)

On the other hand, once the photos/videos are uploaded on the event album, a photographer invitee would be able to go directly to the event album and make any fixes/edits and save the changes.

If the photographer invitee had previously selected 'Manual' on the 'Upload Preference' field 708, then they would have the following options—Under the 'Manual' selection, a photographer invitee would get an opportunity to make any fixes/edits both before and after the photos/videos are uploaded to the event's album i.e. before uploading the photos/videos, a photographer invitee would be able to make any fixes/edits on those photos/videos in their local photo library, and also once they are uploaded on the event's album, a photographer invitee would still be able to go directly to the event album and make any fixes/edits and save the changes.

Either during an event or after an event is complete, if a photographer invitee wanted to delete a photo/video that they previously uploaded on the event's centralized photo/video album, then they would be able to do so as long as the following conditions are met—Photographer invitee must still have the permission to view, add or delete photos/videos from the event's centralized photo/video album i.e. either the event owner or the invitee themselves must not have removed the invitee's photo/video sharing permissions for the event.

A regular photographer invitee would only be able to delete those photos/videos that they themselves uploaded previously on the event's photo/video album. Note: In case of an event owner (who is also one of the photographers for the event), they would be able to delete any photos/videos, either uploaded by them or by others, at any time as long as the event's photo/video album exists.

Once an event, including its 'Post-event Duration', is complete, then the following reminder message would be displayed to the photographer invitees depending upon the value 226 set for the 'Manual Upload Duration' field 214 by the event owner. (Note: An event owner would also be displayed with a similar message since they are also one of the event's mandatory photographers)—

Figure 11:
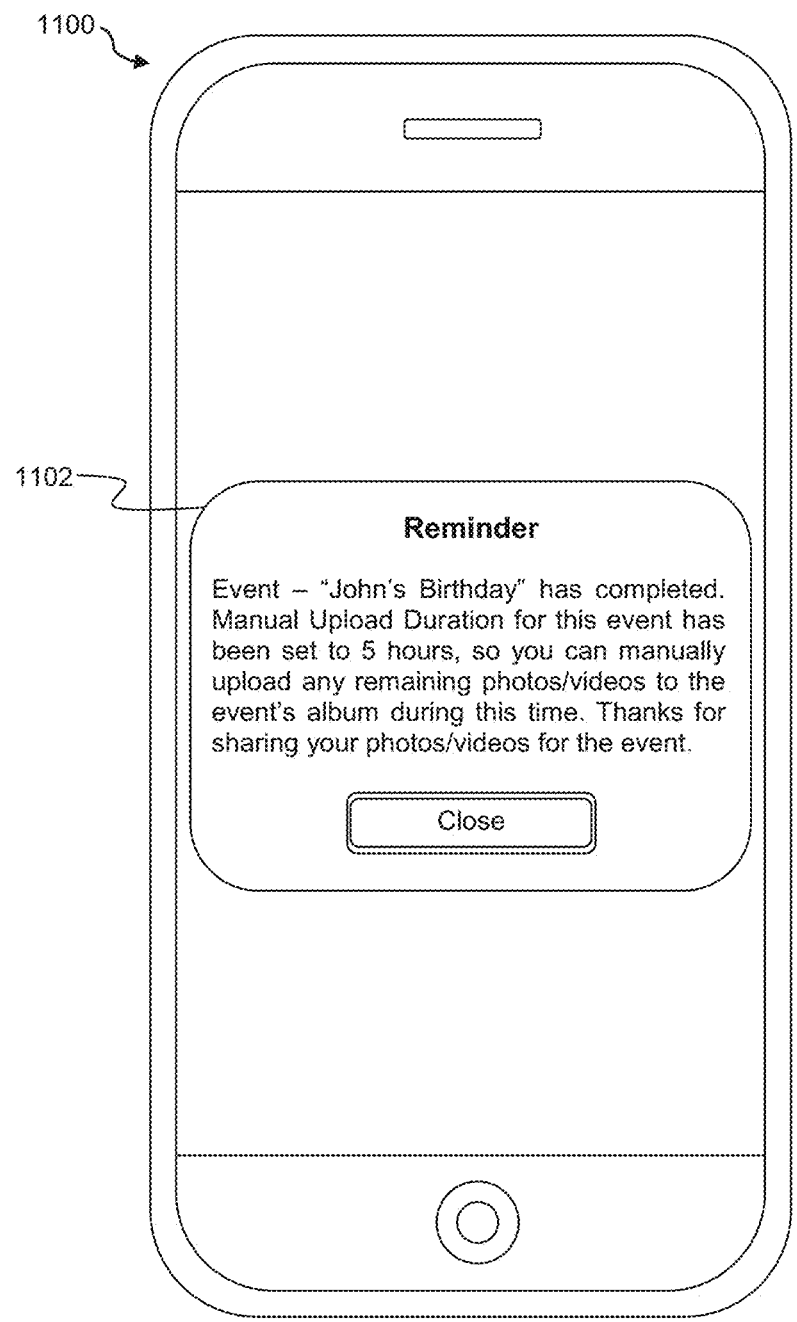
FIG. 11 illustrates an exemplary reminder message, where as long as the event's 'Manual Upload Duration' isn't set to 0, then this message would be displayed to all photographer invitees as well as an event owner at the end of an event, including its 'Post-event Duration'.

As seen in FIG. 11, as long as the 'Manual Upload Duration' field was set to a value greater than 0 hours on the event's calendar invite, then the following reminder message 1102 would be sent to the photographer invitees at the completion of the 'Post-event Duration' of an event—"Event—[EventName] has completed. Manual Upload Duration for this event has been set to [ManualUploadDurationHours] hours, so you can manually upload any remaining photos/videos to the event's album during this time. Thanks for sharing your photos/videos for the event." (Note: [EventName] would be replaced with the actual name of the event and [ManualUploadDurationHours] would be replaced with the value that was set on the 'Manual Upload Duration' field of the event's calendar invite.)

If the 'Manual Upload Duration' field was set to 0 hours on the event's calendar invite, then rather than sending the above reminder, the following reminder message would be sent to the photographer invitees at the completion of the 'Post-event Duration' of an event—"Event—[EventName] has completed. For your reference, there is no 'Manual Upload Duration' time set for this event. Thanks for sharing your photos/videos." (Note: [EventName] would be replaced with the actual name of the event)

If the 'Manual Upload Duration' field 214 was set to a value 226 greater than 0 hours on the event's calendar invite, then the following message would also be sent to the photographer invitees at the completion of such 'Manual Upload Duration'. (Note: An event owner would also be displayed with a similar message since they are also one of the event's mandatory photographers)—

Figure 12:
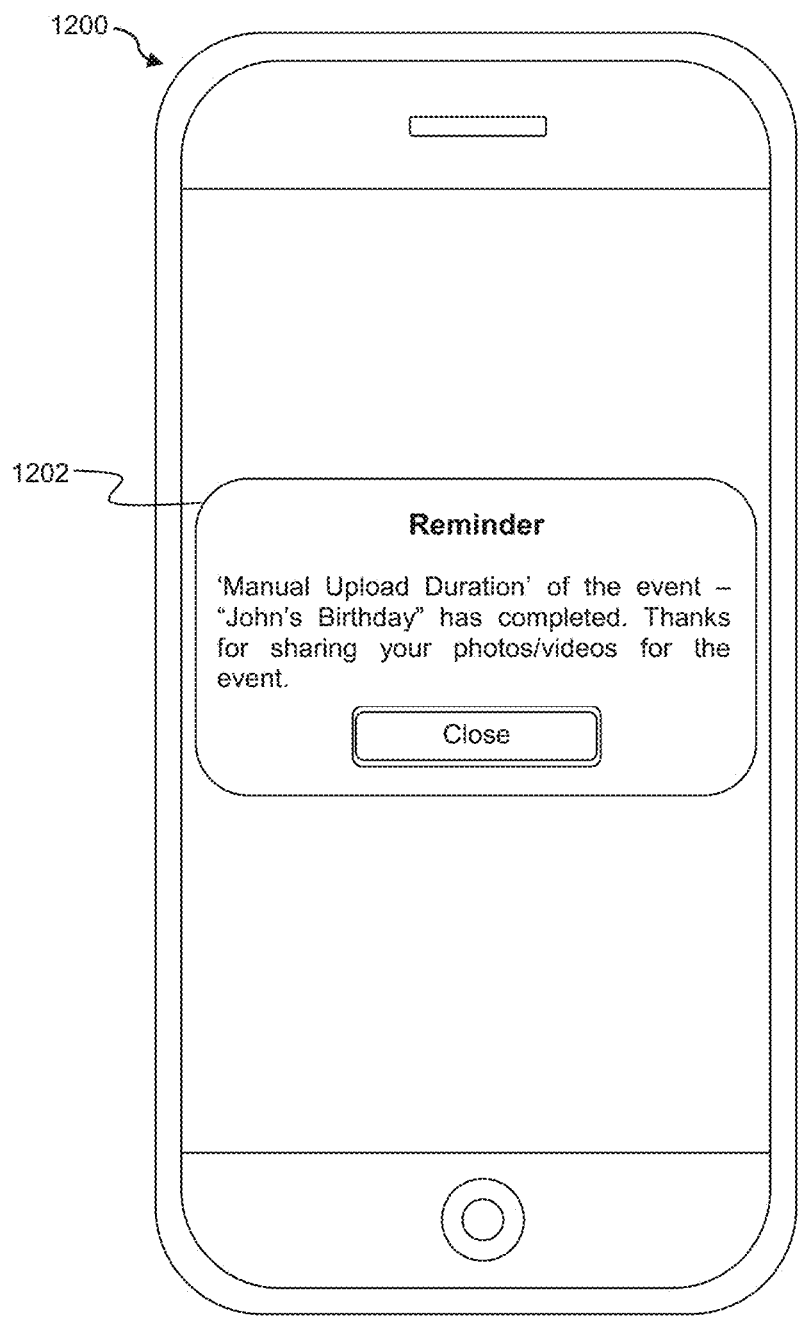
FIG. 12 illustrates an exemplary reminder message, where once the 'Manual Upload Duration' timeframe completes for an event, then this message would be displayed to all photographer invitees as well as an event owner. This reminder message would inform its recipients that the 'Manual Upload Duration' for the event has completed and thank them for sharing their photos/videos for the event.

According to an embodiment of the present invention, as seen in FIG. 12, the following reminder message 1202 would be sent to the photographer invitees at the completion of the 'Manual Upload Duration' of an event—"'Manual Upload Duration' of the event—[EventName] has completed. Thanks for sharing your photos/videos for the event." (Note: [EventName] would be replaced with the actual name of the event.)

Note: In case if the 'Manual Upload Duration' field was set to 0 hours on the event's calendar invite, then a message would have already been sent to the photographer invitees previously that the event has completed, so there would be no need to send an additional message (like the one mentioned above) again.

Sharing of an Event Album with the Invitees after an Event is Complete

Once an event, including its 'Post-event Duration' and the 'Manual Upload Duration' is complete, then depending upon the event owner's selection of either 'Auto', 'Manual' or 'Off' on the event invite's "Share Album after Event" field 404, the system would automatically decide if it should share the event's album with event's guests or not. In this case, event's guests would be either 'All Guests' or 'Event Attendees'. (Note: For details about functionality of 'Auto', 'Manual' or 'Off' options of the 'Share Album after Event' field, please refer to the details provided earlier under the section of 'Share Event Album' screen that's visible to an event owner.)

Miscellaneous Notes

Whether an event has a duration of couple of hours or an entire day or even multiple days, all the processes related to requesting the photos/videos for the event, assigning the photographer(s), reminding the photographers to take photos/videos, automatic or manual upload of photos/videos as well as automatic or manual sharing of event album would all remain the same regardless of the duration of the event.

If a photographer invitee is granted the edit/delete permissions on an event album, such permissions are only for those photos/videos that they previously uploaded themselves. On the other hand, an event owner would have access to edit/delete any of the photos/videos that might exist on the entire event album, regardless of who uploaded them.

For an event album that's associated with a calendar event, other than the event owner, any of the other album participants wouldn't have permission to either edit or delete any album settings i.e. they would just be allowed to view those album settings as read-only. In addition, such album participants also wouldn't be allowed to delete the event album or add/remove any other album participants (buttons associated with these functions wouldn't even be visible to such album participants.) Note: An exception is that an album participant would still have the permission to delete/remove themselves from an event album's participant list. Especially if it's a photographer album participant that removes themselves from an event album's participant list, then they would also lose their photo/video sharing permissions for the associated calendar event.

For an event album that's associated with a calendar event, 'Go to Associated Calendar Event' button would always be enabled/visible on the album's setting screen to either the photographer album participants or an event owner. This button would allow them to easily go back to the associated calendar event as long as that event still exists. (Note: Regular album participants wouldn't be able to view this 'Go to Associated Calendar Event' button, so it's just the photographer album participants, including the event owner, who will be able to view this button on an album's settings screen.)

For one of the recurring events, if some settings are changed on its associated album, then those changes would only be applicable to that particular recurring event. In other words, update to a specific album would not get applied to all recurring events' albums.

Suppose that an event owner initially sets up a recurring calendar event along with requesting photos/videos from certain invitees for the recurring events. However, the event owner later decides to make some changes to either one of those recurring events or to all the recurring events. In this situation, the following would occur—

An event owner will be allowed to make the changes to either one of the recurring events or apply those changes to all the recurring events. However, keep in mind that any changes will only take effect when the event owner saves (selects 'Done') the entire event.

After making the changes when the event is saved ('Done') by the event owner, they would be prompted to select one of the following three options—'Apply changes to just this event,' 'Apply changes to all future events,' or 'Cancel.'

Therefore, if an event owner decides to make some changes (for example: increase the 'Pre-event Duration' for one of the recurring events i.e. not apply those changes to all recurring events), then they can do so by directly going to that particular event, make the changes and upon save, select to apply those changes just to that particular event. On the contrary, if the event owner wants to apply their changes to all recurring events, then they can also do so by selecting the option to apply to all (future) recurring events.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A Computer implemented method for sharing photos and/or videos related to an event comprising:
   creating a scheduled event, using said computer, wherein said event is to be photographed and/or video recorded;
   sending invitations for said event to one or more invitees using said computer, wherein said invitations include a request to take photos and/or videos of said event;
   receiving an acceptance from one or more of said invitees to take photos and/or videos during said event;
   assigning an event creator and one or more of said accepting invitees as photographers, wherein said photographers are identified in said computer, prior to said event, by name, e-mail address, or phone number;
   defining a pre-event period and a post-event period;
   sending to said assigned photographers, via said computer, a request to take photos and/or videos during said pre-event period;
   sending to said assigned photographers a reminder to take photos and/or videos during said event;
   sending to said assigned photographers, via said computer, a request to take photos and/or video during said post-event period;
   sending at least one reminder to said assigned photographers to share photographs and/or videos taken during said pre-event period, said event, and said post-event period;
   aggregating said pre-event, event, and post-event photos and/or videos in said computer;
   sharing one or more of said pre-event, event, and post-event photos and/or videos.

2. The computer implemented method of claim 1 further comprising the step of:
   receiving, at said computer, a photographer response to said requests to take photos and/or videos.

3. The computer implemented method of claim 2 further comprising the step of:
   displaying, on said computer, a list of said photographers, and each of said photographer's response.

4. The computer implemented method of claim 1 further comprising the steps of:
   creating on said computer a digital album for aggregating said photos and/or videos corresponding to said event;
   displaying, on a screen of a computing device used to take said photos and/or videos, a visual indicator to visually indicate to said photographer that said photos and/or videos taken during said event are designated for automatic upload, wherein said visual indicator is displayed for the duration of the event, pre-event, and post event periods;
   uploading photos and/or videos from said computing device to a central server.

5. The computer implemented method of claim 4 wherein said visual indicator is a border frame displayed on the screen of said computing device.

6. The computer implemented method of claim 4 further comprising the step of:
   limiting said photos and/or videos which are uploaded to photos and/or videos taken during said pre-event period, said event, and said post event period.

7. The computer implemented method of claim 4 further comprising the step of:
   uploading from a supported computing device said photos and/or videos which were taken using an unsupported photo or video taking device and transferred to said supported computing device.

8. The computer implemented method of claim 4 further comprising the step of:
providing said event creator with a selectable option to share said digital album with one of the following: (a) all event invitees, (b) event attendees only; or (c) nobody.

9. The computer implemented method of claim 4 further comprising the step of:
sharing said digital album before the end of said event using said computer.

10. The computer implemented method of claim 4 wherein at least one of
a) creating an event,
b) creating a digital album, or
c) taking photos and/or videos
is accomplished, at least in part, by integrating with a separately installed program on said device.

11. The computer implemented method of claim 1 further comprising the steps of:
providing said photographers a plurality of upload options for selecting an upload preference, said options comprising (a) automatic upload, (b) manual upload, and (c) upload with confirmation; and
providing said photographers the option to change said upload preference at a later time.

12. The computer implemented method of claim 1 further comprising the step of:
converting said request to share into an invitation to said event when said request to share is forwarded to another person.

13. The computer implemented method of claim 1 further comprising the step of:
generating recurring event invitations, including requests to share, for recurring events.

14. A computer implemented method for sharing photos and/or videos related to an event comprising:
sending invitations for said event to one or more invitees using said computer, wherein said invitations include a request to take photos and/or videos of said event;
receiving an acceptance from one or more of said invitees to take photos and/or videos during said event;
assigning an event creator and one or more of said accepting invitees as photographers, wherein said photographers are identified in said computer, prior to said event, by name, e-mail address, or phone number;
defining a pre-event period and a post-event period;
sending to said assigned photographers, via said computer, a request to take photos and/or videos during said pre-event period;
sending to said assigned photographers a reminder to take photos and/or videos during said event;
sending to said assigned photographers, via said computer, a request to take photos and/or video during said post-event period;
entering a sharing mode on a user device wherein photos or videos taken while in sharing mode are automatically uploaded to a central server;
displaying a visual indicator on the screen of said user device to visually indicate to a user that photos and/or videos taken during said event are designated for automatic upload, wherein said visual indicator is displayed for the duration of the event, pre-event, and post event periods;
sharing one or more uploaded photos and/or videos taken during said event.

15. The computer implemented method of claim 14 wherein said visual indicator is a border frame displayed on the screen of said device.

16. The computer implemented method of claim 14 wherein said sharing mode is entered at a predetermined time according to a scheduled event.

17. A computer implemented method for sharing photos and/or videos related to an event comprising:
creating a digital album for collecting photos and/or videos corresponding to said event;
sending invitations for said event to one or more invitees using said computer, wherein said invitations include a request to take photos and/or videos of said event;
receiving an acceptance from one or more of said invitees to take photos and/or videos during said event;
assigning an event creator and one or more of said accepting invitees as photographers, wherein said photographers are identified in said computer, prior to said event, by name, e-mail address, or phone number;
defining a pre-event period and a post-event period;
sending to said assigned photographers, via said computer, a request to take photos and/or videos during said pre-event period;
sending to said assigned photographers a reminder to take photos and/or videos during said event;
sending to said assigned photographers, via said computer, a request to take photos and/or video during said post-event period;
sending at least one reminder to said assigned photographers to share photographs and/or videos taken during said pre-event period, said event, and said post-event period;
providing an option to upload photographs and/or videos taken during said pre-event period, said event, and said post-event period either automatically without individual confirmation, or automatically upon individual confirmation;
uploading to a central server photos and/or videos taken during said pre-event period, said event, and said post-event period;
sharing, from said central server, said photos and/or videos taken during said pre-event period, said event, and said post-event period.

18. The computer implemented method of claim 17 further comprising the step of:
providing an option to upload files by manual selection.

19. A Computer implemented method for sharing photos and/or videos related to an event comprising:
creating an online calendar event;
defining a pre-event period and a post-event period;
attaching to said event a request to share photos and/or videos taken during said pre-event period, said event, and said post-event period;
notifying one or more of said event invitees of said event;
receiving an acceptance from one or more of said invitees to share photos and/or videos taken during said event;
assigning an event creator and one or more of said accepting invitees as photographers, wherein said photographers are identified in said computer, prior to said event, by name, e-mail address, or phone number;
sending to said assigned photographers, via said computer, a request to take photos and/or videos during said pre-event period;
sending to said assigned photographers a reminder to take photos and/or videos during said event;

sending to said assigned photographers, via said computer, a request to take photos and/or video during said post-event period;

sharing said photos and/or videos taken during said pre-event period, said event, and said post-event period.

20. The computer implemented method of claim 19 further comprising:
   integrating calendar, camera and photo album applications in order to request, take, upload and share photos and/or videos for said event.

21. The computer implemented method of claim 19 further comprising the steps of:
   uploading to a central location photos and/or videos taken during said pre-event period, said event, and said post-event period;
   providing, through a network, remote access to said photos and/or videos taken during said pre-event period, said event, and said post-event period.

\* \* \* \* \*